(12) United States Patent
Gohary et al.

(10) Patent No.: US 11,171,826 B2
(45) Date of Patent: Nov. 9, 2021

(54) METHODS AND SYSTEMS FOR FORMING A WIRELESS SENSOR NETWORK

(71) Applicant: MAPLE MICROSYSTEMS INC., Ottawa (CA)

(72) Inventors: Ramy Helmy Gohary, North Gower (CA); Mohamed Samy Hosny, Ottawa (CA); Maged E. Beshai, Maberly (CA)

(73) Assignee: Ramy Helmy Gohary, North Gower (CA)

( * ) Notice: Subject to any disclaimer, the term of this patent is extended or adjusted under 35 U.S.C. 154(b) by 558 days.

(21) Appl. No.: 16/015,382

(22) Filed: Jun. 22, 2018

(65) Prior Publication Data

US 2018/0375722 A1 Dec. 27, 2018

Related U.S. Application Data

(60) Provisional application No. 62/523,741, filed on Jun. 22, 2017.

(51) Int. Cl.
*H04L 12/24* (2006.01)
*H04W 16/28* (2009.01)
*H04W 84/18* (2009.01)

(52) U.S. Cl.
CPC ......... *H04L 41/0806* (2013.01); *H04W 16/28* (2013.01); *H04W 84/18* (2013.01)

(58) Field of Classification Search
CPC .... H04L 41/0806; H04W 16/28; H04W 84/18
USPC ........................................................ 370/254
See application file for complete search history.

(56) References Cited

U.S. PATENT DOCUMENTS

| | | | |
|---|---|---|---|
| 9,591,645 B2 | 3/2017 | Seol et al. | |
| 9,712,394 B2 | 7/2017 | Abe et al. | |
| 9,817,106 B2 | 11/2017 | Matsumura | |
| 9,836,956 B2 | 12/2017 | Shearer | |
| 9,924,342 B2 | 3/2018 | Logue et al. | |
| 9,924,385 B2 | 3/2018 | Lysejko et al. | |
| 2014/0347223 A1* | 11/2014 | Hyde | H01Q 3/00 342/385 |
| 2016/0118716 A1* | 4/2016 | Stephenne | H01Q 3/34 342/372 |
| 2019/0097922 A1* | 3/2019 | Chakraborty | H04J 3/0638 |

* cited by examiner

*Primary Examiner* — Ricky Q Ngo
*Assistant Examiner* — Ellen A Kirillova
(74) *Attorney, Agent, or Firm* — IP-MEX Inc.; Victoria Donnelly

(57) ABSTRACT

Sensor nodes each equipped with a directional antenna configured to form a set of beams of predefined directions, with respect to a global reference direction, during beam cycles timed according to a global time reference form a sensor network. An electronic compass determines the global reference direction and a Global-Positioning-System (GPS) receiver provides the global time reference. The directional antenna is implemented as a phased-array antenna. During each beam period within a beam cycle, a phased-array controller determines a phase vector as a function of the geometrical arrangement of antenna elements and angular displacement of a reference direction of a node from the global reference direction. The phase vector is supplied to phase shifters coupled to the antenna elements to form a beam of a specified direction. During each beam period, all sensor nodes form beams of a same direction thus guaranteeing inter-nodal communication among neighboring nodes.

20 Claims, 57 Drawing Sheets

| Beam | B0 | B1 | B2 | B3 | B4 | B5 | B6 | B7 |
|---|---|---|---|---|---|---|---|---|
| Beam direction $\Phi$ | $\Gamma$ | $\Gamma + \pi/4$ | $\Gamma + \pi/2$ | $\Gamma + 3\pi/4$ | $\Gamma + \pi$ | $\Gamma + 5\pi/4$ | $\Gamma + 3\pi/2$ | $\Gamma + 7\pi/4$ |

Phase shift →

Antenna-1: $(2\pi A/\lambda) \cos(\Phi)$

Antenna-2: $(2\pi A/\lambda) \sin(\Phi)$

Antenna-3: $-(2\pi A/\lambda) \cos(\Phi)$

Antenna-4: $-(2\pi A/\lambda) \sin(\Phi)$

FIG. 10

| Upstream Beam | B0 | B1 | B2 | B3 | B4 |
|---|---|---|---|---|---|
| Downstream Beam | $\Omega 2$ or $\Omega 3$ | $\Omega 3$ or $\Omega 4$ | $\Omega 4$ or $\Omega 0$ | $\Omega 0$ or $\Omega 1$ | $\Omega 1$ or $\Omega 2$ |

| Upstream Beam | B0 or B1 | B1 or B2 | B2 or B3 | B3 or B4 | B4 or B0 |
|---|---|---|---|---|---|
| Downstream Beam | $\Omega 3$ | $\Omega 4$ | $\Omega 0$ | $\Omega 1$ | $\Omega 2$ |

2500
Dual beams:
five-beam cycle

4800 Distributed network-formation tracking

| Joining node | Identifier | Radius | Upstream beam utilization ||||||||||||
|---|---|---|---|---|---|---|---|---|---|---|---|---|---|
| | | | A | B | C | D | E | F | G | H | P | Q | W |
| D | 1 | 1 | | | | 1 | | | | | | | |
| B | 2 | 1 | | 1 | | 1 | | | | | | | |
| C | 3 | 1 | | 1 | 1 | 1 | | | | | | | |
| P | 4 | 2 | | 1 | 1 | 2 | | | | | 1 | | |
| E | 5 | 2 | | 2 | 1 | 2 | 1 | | | | 1 | | |
| Q | 6 | 2 | | 2 | 1 | 3 | 1 | | | | 1 | 1 | |
| W | 7 | 2 | | 2 | 1 | 4 | 1 | | | | 1 | 1 | 1 |
| H | 8 | 3 | | 3 | 1 | 4 | 2 | | | 1 | 1 | 1 | 1 |
| A | 9 | 2 | 1 | 4 | 1 | 4 | 2 | | | 1 | 1 | 1 | 1 |

FIG. 48

5500 Multiple invitations

Multiple responses to a request from an outer node

| Index of Reception Beam | 0 | 1 | 2 | 3 | 4 | 5 | 6 | 7 |
|---|---|---|---|---|---|---|---|---|
| Identifiers of Inviting Inner Nodes | 11 | 11 | – | – | 22 | 37 | – | 64 |
| | 25 | | | | 29 | 29 | | |
| | | | | | 42 | | | |
| | | | | | 59 | | | |
| | | | | | 61 | | | |

METHODS AND SYSTEMS FOR FORMING A WIRELESS SENSOR NETWORK

CROSS-REFERENCE TO RELATED APPLICATIONS

The present application claims the benefit of provisional application 62/523,741 filed on Jun. 22, 2017, titled "METHODS AND SYSTEMS FOR BEAM FORMING IN WIRELESS SENSOR NETWORK", the entire content of which is incorporated herein by reference.

FIELD OF THE INVENTION

The present invention relates to a wireless sensor network interconnecting a plurality of sensor nodes. In particular the invention is directed to methods and systems for spatial-temporal internodal beam alignment.

BACKGROUND

A wireless sensor network typically includes a collection of sensor nodes each having a sensor for detecting state changes and reporting respective quantifiers to a selected node herein referenced as the "collector. A sensor node may communicate directly with the collector or may communicate with the collector through other nodes. The nodes are equipped with relatively low-power transmitters and receivers and communicate through wireless links. Since the network is localized, control of the network may be based on signal exchange among the nodes following rules tailored to the specific application of the network. Otherwise standardized network-control methods, such as the standard under IEEE802.15.4, may be applied.

One of the applications of a sensor network is monitoring a smart grid is a modern electric power grid infrastructure to improve efficiency, reliability and safety. The smart grid integrates renewable and alternative energy sources using automated control and modern communication facilities. In the smart grid, accurate information of the power grid becomes an important factor for reliable delivery of power from the power generation equipment to the end users. Electrical-power downtime may be reduced by power system condition monitoring and rapid diagnostics.

An efficient reliable sensor network may play a major role in this area.

There is a need to explore improved methods and systems for forming agile and efficient sensor networks for a variety of industrial and societal applications.

SUMMARY

A sensor network providing adaptive paths between a collector node and a plurality of sensor nodes, where the adaptive paths are formed as coordinated narrow beams, is disclosed.

In accordance with an aspect, the invention provides a method of forming a wireless network. The method comprises providing a plurality of directional antennas and forming at each directional antenna N transmission beams of different directions and corresponding N reception beams during a beam cycle of N beam periods, N>1. Each transmission beam, and each reception beam, is formed according to a specified beam width. Each directional antenna is coupled to a respective node of a plurality of nodes. The beam-formation process ensures that during each beam period of each beam cycle, transmission beams and reception beams of all directional antennas of the entire network are spatially aligned. Additionally, the transmission beams formed during each beam cycle at each directional antenna are spatially distributed to cover a planar angle of $2\pi$ radians. Consequently, the reception beams formed during each beam cycle at each directional antenna are spatially distributed to cover a planar angle of $2\pi$ radians.

To realize spatial alignment of transmission beams of all directional antennas during a beam period, the N transmission beams are formed during each beam cycle to bear predefined angular displacements from a global reference direction which is acquired from an electronic compass. The transmission beam and reception beam formed at a node during a beam period are of the same direction.

To enable temporal alignment of beam cycles at all directional antennas, each beam cycle starts at an instant of time determined from a global cyclic saw-tooth time indicator derived by recognizing onset of repetitive patterns of time indications acquired from a Global-Positioning-System receiver.

More specifically, one way to realize temporal alignment is to start beam cycles at instants of time determined as onset times of a repetitive pattern of time indications acquired from a Global-Positioning-System receiver. Within the duration of the repetitive pattern, multiple cyclic saw-tooth time indicators are generated. The starting times of the beam cycles are the starting times of the saw-tooth time indicators. The cyclic saw-tooth time indicators are generated by supplying time indications acquired from a Global-Positioning-System receiver to a frequency synthesizer. The output signal of the frequency synthesizer may be of the form of timing pulses, separated by equal time divisions, which trigger a cyclic counter of a period equal to a predefined beam-cycle duration. The process of timing the beam cycles is simplified by selecting the repetitive pattern to be a power of 2, selecting each beam cycle to be a power of 2 of time divisions;

selecting the number N of beam periods per beam cycle to be a power of 2; and selecting each beam period as $2^\alpha$ of time divisions, $\alpha \geq 0$;

determining a start time of each beam to correspond to a cyclic saw-tooth time indicator where each of a least-significant bits is a zero.

To ensure full spatial coverage of all transmission beams (hence all reception beams) formed at a directional antenna, the central direction of each transmission beam is selected to have an angular displacement of $2\pi/N$ radians from the central direction of each immediately neighboring beam and the beam width is determined to equal or exceed $2\pi/N$ radians.

The process of network formation starts with designating one node of the plurality of nodes as a collector with the remaining nodes establishing a path to the collector in a hierarchical fashion where each remaining node within reach of the collector joins the wireless network as a first-stratum node. Due to power limitation and possibly environmental conditions, it may not be feasible for each node to connect to the collector directly over a single beam. Thus, each remaining node within reach of any first-stratum node joins the wireless network as a second-stratum node; and so on with each remaining node within reach of any $m^{th}$-stratum node joining the wireless network as an $(m+1)^{th}$-stratum node, m>1.

In accordance with another aspect, the invention provides a system for wireless communication. The system comprises a plurality of nodes with each node comprising (1) a plurality of antenna elements, (2) a plurality of phase shifters, (3) an electronic compass, (4) a GPS (Global Positioning System) receiver, (5) a reference-time circuit, (6) a beam-orientation circuit, (7) a phased-array controller, (8) a node transmitter, (9) a node receiver, and (10) a node controller.

Each phase shifter is coupled to an antenna element. The electronic compass determines node orientation as an angular displacement of a node reference direction from Earth's magnetic north. The reference time circuit generates periodic sawtooth signals defining beam cycles aligned according to pivotal reference time indications acquired from a Global-Positioning-System receiver. The beam-orientation circuit determines phase-shift values supplied to the plurality of phase shifters according to the node orientation and requisite beam directions. The phased-array controller cyclically updates the phase-shift values during each beam period of a beam cycle comprising N beam periods, N>1. The node controller comprises a hardware processor and a memory device storing processor executable instructions causing the processor to simultaneously activate the phased-array controller, the node transmitter, and the node receiver.

The reference-time circuit comprises (i) a circuit for detecting time-indication transitions of timing data acquired from the Global-Positioning-System receiver and identifying the pivotal reference time indications, (ii) a frequency synthesizer for generating pulses at a timing rate determined as a specified integer multiple of a rate of time-indication transitions, and (iii) a cyclic counter of the pulses for generating the sawtooth signals.

The phase-shift values are determined according to (A) placement of each antenna element with respect to the node reference direction, (B) the node orientation, which is the angular displacement of the node reference direction from Earth's magnetic north, and (C) a specified beam direction. A beam direction is specified for each beam duration within the beam cycle. During a beam period of index j, 0≤j<N, within the beam cycle, the specified beam direction is determined as: $\Gamma+2\times\pi\times j/N$, $\Gamma$ being the node orientation.

To establish the system, one node of the plurality of nodes is designated as a collector and the objective is to provide a wireless path from each node to the collector. As mentioned above, it may not be feasible for each node to connect to the collector directly over a single beam. Thus, each remaining node within reach of the collector joins the wireless network as a first-stratum node. Subsequently, each remaining node within reach of any $m^{th}$-stratum node joins the wireless network as an $(m+1)^{th}$-stratum node, m>0.

In accordance with a further aspect, the invention provides a wireless network. The network comprises a plurality of directional antennas where each directional antenna is coupled to a respective node of a plurality of nodes. Each directional antenna comprises a plurality of antenna elements, a plurality of phase-shifters, an electronic compass, a reference-time circuit coupled to a Global-Positioning-System receiver, and a phased-array controller.

Each phase shifter is coupled to a respective antenna element. The compass is used for determining an angular displacement of a reference direction of the respective node from Earth's magnetic north. The reference-time circuit is configured to detect global time-indication transitions and determine instants of time for starting beam cycles of N beam periods each, N>1, and instants of time for starting beam periods within each beam cycle. The phased-array controller is configured to determine a phase-shift value for each phase shifter during each beam period so that the plurality of antenna elements form N transmission beams and N reception beams of predefined angular displacements from Earth's magnetic north. Thus, each node has time-limited wireless links along N planar directions.

Each node of the wireless network comprises (1) a buffer holding outgoing baseband data, (2) a node transmitter for modulating a carrier signal with the outgoing baseband data, (3) a node receiver for detecting incoming baseband data, (4) a processor coupled to the phased-array controller, the node transmitter, and the node receiver, and (5) a memory storing processor-executable instructions causing the processor to align transmission time windows and reception time windows with respective beam cycles.

The reference-time circuit comprises (i) a circuit for detecting time-indication transitions of timing data acquired from the Global-Positioning-System receiver, (ii) a frequency synthesizer for detecting time-indication transitions at a basic rate from the Global-Positioning-System receiver and producing pulses at an integer multiple of the basic rate, and (iii) a cyclic counter for producing a saw-tooth signal defining duration of the beam cycle.

The phase shift value for each phase shifter is determined as a function of geometrical arrangement of antenna elements, angular displacement of a reference direction of the respective node from Earth's magnetic north, and requisite beam direction.

In one implementation, the directional antenna comprises four antenna elements placed at relative coordinates {A, 0}, {0, A}, {−A, 0}, and {0, −A} with respect to node-specific reference directions. With eight beams per beam cycle (N=8), the requisite beam direction during beam period j, 0≤j<N, is $\Phi_j=(\Gamma+j\pi/4)$. The phase-shift values for phase shifters coupled to the four antenna elements are respectively determined as $h\times\cos(\Phi_j)$, $h\times\sin(\Phi_j)$, $-h\times\cos(\Phi_j)$, and $-h\times\sin(\Phi_j)$, where $h=2\pi A/\lambda$, $\lambda$ being a common wavelength.

To form the wireless network, one node of the plurality of nodes is designated as a collector. Each remaining node within reach of the collector joins the wireless network as a first-stratum node. Each remaining node that is within reach of any $m^{th}$-stratum node joins the wireless network as an $(m+1)^{th}$-stratum node, m>0.

BRIEF DESCRIPTION OF THE DRAWINGS

Embodiments of the present invention will be further described with reference to the accompanying exemplary drawings, in which:

FIG. 10 illustrates phase-shift determination for individual antennas of the exemplary phased-array antenna of FIG. 6, in accordance with an embodiment of the present invention;

FIG. 48 illustrates the steps of formation of the exemplary network of FIG. 47 and tracking upstream utilization of each node;

TERMINOLOGY

Figure 1:
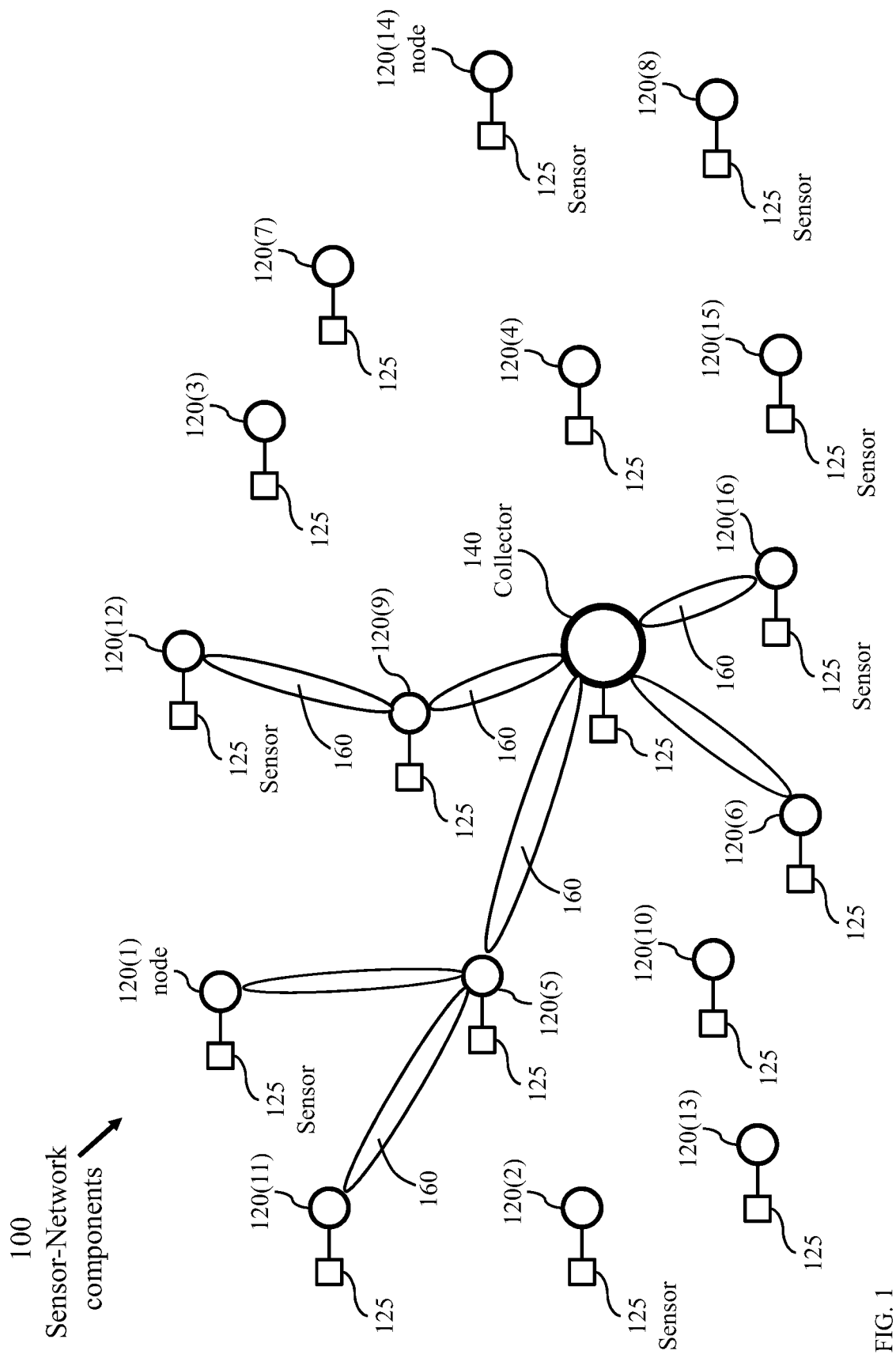
FIG. 1 illustrates a plurality of sensor nodes and a collector node of a wireless sensor network.

Sensor node: A node equipped with a sensor is referenced as a "sensor node".
Collector node: A node designated to collect data from other nodes of a network is referenced as a collector node. A collector node may be equipped with a sensor. A collector node is also referenced as a collector.
Outer node: A node that has not yet established a path to the collector is referenced as an "outer node".
Inner node: A node that has established a path to the collector is referenced as an "inner node". The objective of a network-formation process is to transform each outer node to an inner node.
Node orientation: The angular displacement of a line defining a reference direction of a node and a global reference direction (such as Earth's magnetic north) is referenced as the node's orientation. Uncoordinated spatially distributed identical nodes would have different node orientations.
Beam central direction: A beam's radial line corresponding to the highest radiation power may define a beams central direction.
Beam width: A planar angle between two half-power radial-lines, of opposite sides of a central direction of a beam, may define the beam's width.
Beam cycle: A beam cycle is an interval of time during which a predefined number of beams of different directions may be formed.
Beam period: The duration of a single beam formed during a beam cycle is a "beam period".
Beam duty cycle: The duty cycle of a specific beam is a time window allocated to the specific beam within a beam cycle.
Upstream utilization: The upstream utilization of a specific inner node may be defined as the number of inner nodes (including the specific node) that may communicate with the collector through an upstream beam of the specific inner node directed towards the collector.
Topological radius: The topological radius, also referenced as "radius", of an inner node is the number of concatenated beams connecting the inner node to the collector. The collector has a topological radius of zero.
Node stratum: The nodes of the network considered herein are naturally grouped into multiple strata; in this case the stratum of a node is the radius of the node.
Dual beam: A dual beam constitutes a beam from a first node to a second node and a beam from the second node to the first node. In the wireless network considered herein, the two directional beams of a dual beam are activated during different time intervals.
Cluster-tree network: In a "cluster-tree" network, each node has only one dual link to the collector or to another node en route to the collector. Multiple nodes may have a dual link each to the collector or to another node en route to the collector. Thus, a node of radius r, r>0, has only one dual link to the collector or to a node of radius (r−1) and may have multiple dual links from nodes of radii less than r. At least one node is a "leaf" node having no links from or to a node of larger radius.

DETAILED DESCRIPTION

The invention provides methods and apparatus for forming a wireless sensor network.

FIG. 1 illustrates a plurality of sensor nodes 120, individually referenced as 120(1) to 120(16), and a collector node 140 interconnected through beams 160 to form a wireless sensor network 100. Each sensor node 120 may be coupled to a sensor 125. Likewise, the collector node 140 may be coupled to a sensor 125. The collector node 140 receives sensor data from each sensor node 120. For brevity, the collector node is referenced as a "collector" and a sensor node 120 is referenced as a "node" with the plurality of sensor nodes referenced as the "plurality of nodes". A sensor is a physical device configured to detect measurable conditions in the vicinity of the sensor and generate corresponding data. For the purpose of synthesizing a wireless sensor network 100 in accordance with the present invention, a sensor is simply treated as a data source. The wireless sensor network may be configured as a "cluster-tree" network where each node 120 has only one dual link to the collector or to another node 120 en route to the collector. In a cluster-tree network, multiple nodes may have a dual link each to the collector or to another node en route to the collector. FIG. 1 illustrates a partial cluster-tree network in which each of four nodes 120(5), 120(6), 120(9), and 120(16) has a dual link to the collector, and each of nodes 120(1) and 120(11) has a dual link to node 120(5) which has one dual link to the collector. A cluster-tree network may reduce to a star network where each node has one dual link to the collector.

Each node 120 that is coupled to a sensor directs its sensor data to the collector node through a wireless link. Due to desirable power limitations and possibly regulatory limitations, a wireless link from a node 120 to the collector may not be feasible. For this reason, each node of the plurality of nodes 120 is preferably configured to function as a transit node in addition to hosting a sensor. Optionally, some nodes may be configured to function as transit nodes without hosting sensors and some other nodes may not function as transit nodes.

Each node is equipped with a directional antenna. Likewise, the collector is equipped with a directional antenna. A node communicates with the collector or with another node having a path to the collector through directional beams 160. The nodes may be positioned in the field in an ad hoc manner and none of the nodes has prior knowledge of the position of the collector or the position of any other node. In fact, for some applications, the nodes may be mobile. The main challenge in forming a network under this condition is determining a beam direction and beam activation time period (duty cycle). To enable forming the network, the directional antennas of the node, as well as the directional antenna of the collector, are configured as rotating antennas.

Figure 2:
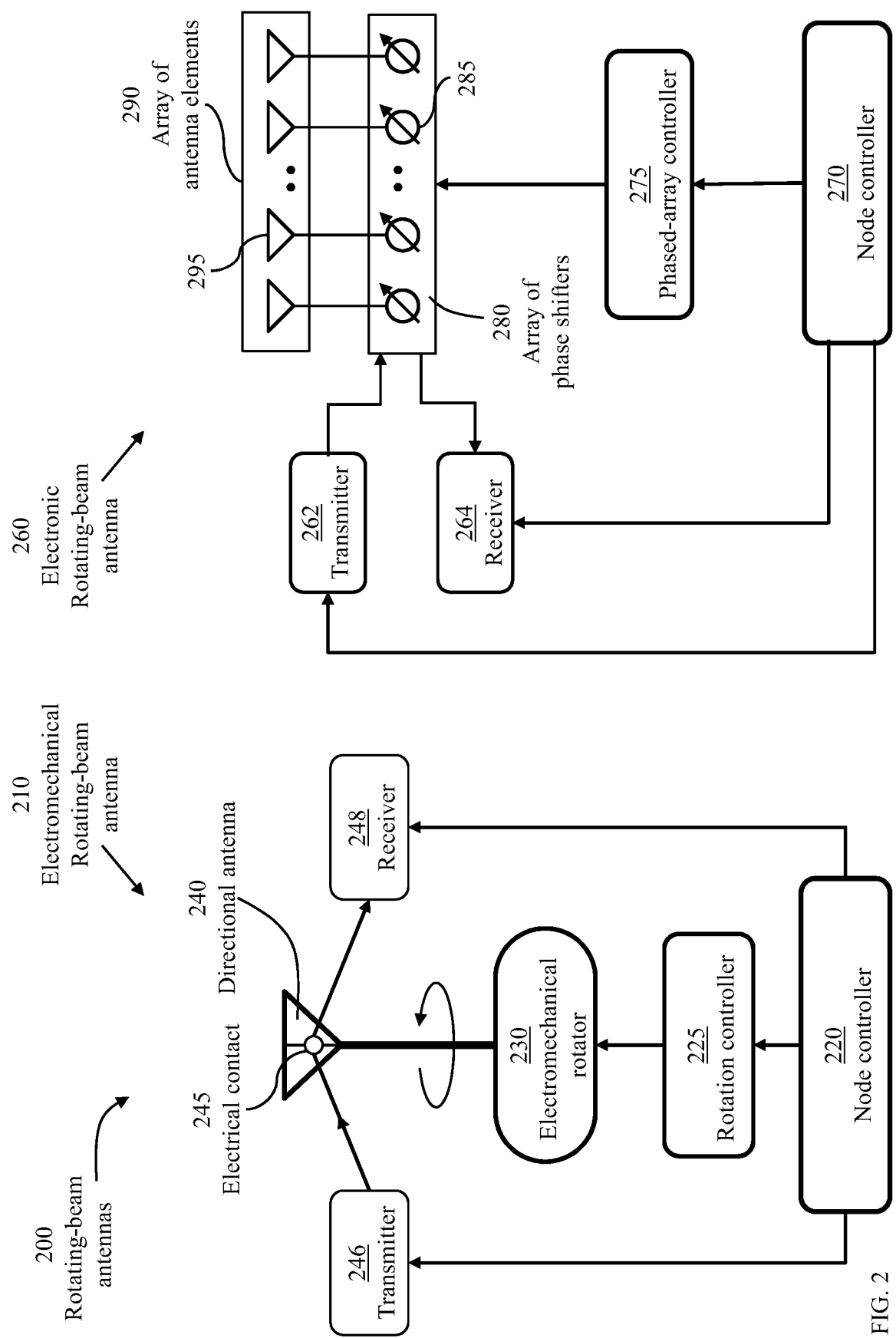
FIG. 2 illustrates exemplary rotating directional antennas for use in an embodiment of the present invention.

Rotating antennas are well known in the art. FIG. 2 illustrates exemplary rotating directional antennas 200.

In one implementation, an electromechanical rotating-beam antenna 210 may be based on mounting a directional antenna 240 on an electromechanical rotator 230. A rotation controller 225 determines the direction, speed, and initial position of each rotation cycle under control of a node controller 220. The rotating directional antenna 240 connects to the transmitter 246 and receiver 248 through a special contact 245. The node controller 220 is coupled to transmitter 246 and receiver 248.

Alternatively, an electronic rotating-beam antenna 260 may be implemented as a phased-array antenna comprising an array 280 of phase shifters 285. Each phase shifter 285 is coupled to a respective antenna element 295 of an array 290 of antenna elements. The number of phase shifters and the values of phase shifts applied to individual phase shifters are design parameters determined according to the requisite beam direction and beam width defining the half-power beam boundaries. To generate N beams of predefined directions and beam widths, N>1, N phase-shift vectors are precomputed. With an array of q phase shifters, q>1, a phase-shift vector $P(\Theta_j, \omega_j)$, $0 \le j < N$, of q scalar phase-shift values is precomputed for each directional beam of direction $\Theta_j$ and beam width $\omega_j$. The phased-array controller 275 generates the N phase-shift vectors based on control data received from a node controller 270. A transmitter 262 and a receiver 264 connect to array 280 of phase shifters.

Either of the electromechanical rotating beam antenna or the electronic rotating-beam antenna may be employed for beam-forming in accordance with the present invention.

Employing an electromechanical rotating beam antenna, the node controller 220 coupled to rotation controller 225, transmitter 246, and receiver 248 may be configured to coordinate timing of signal transmission for a specified transmission-beam direction and to coordinate timing of signal reception for a specified reception-beam direction.

Employing an electronic rotating-beam antenna, node controller 270 coupled to a phased-array controller 275, transmitter 262, and receiver 264 may be configured to coordinate timing of signal transmission for a specified transmission-beam direction and to coordinate timing of signal reception with a specified reception-beam direction.

Figure 3:
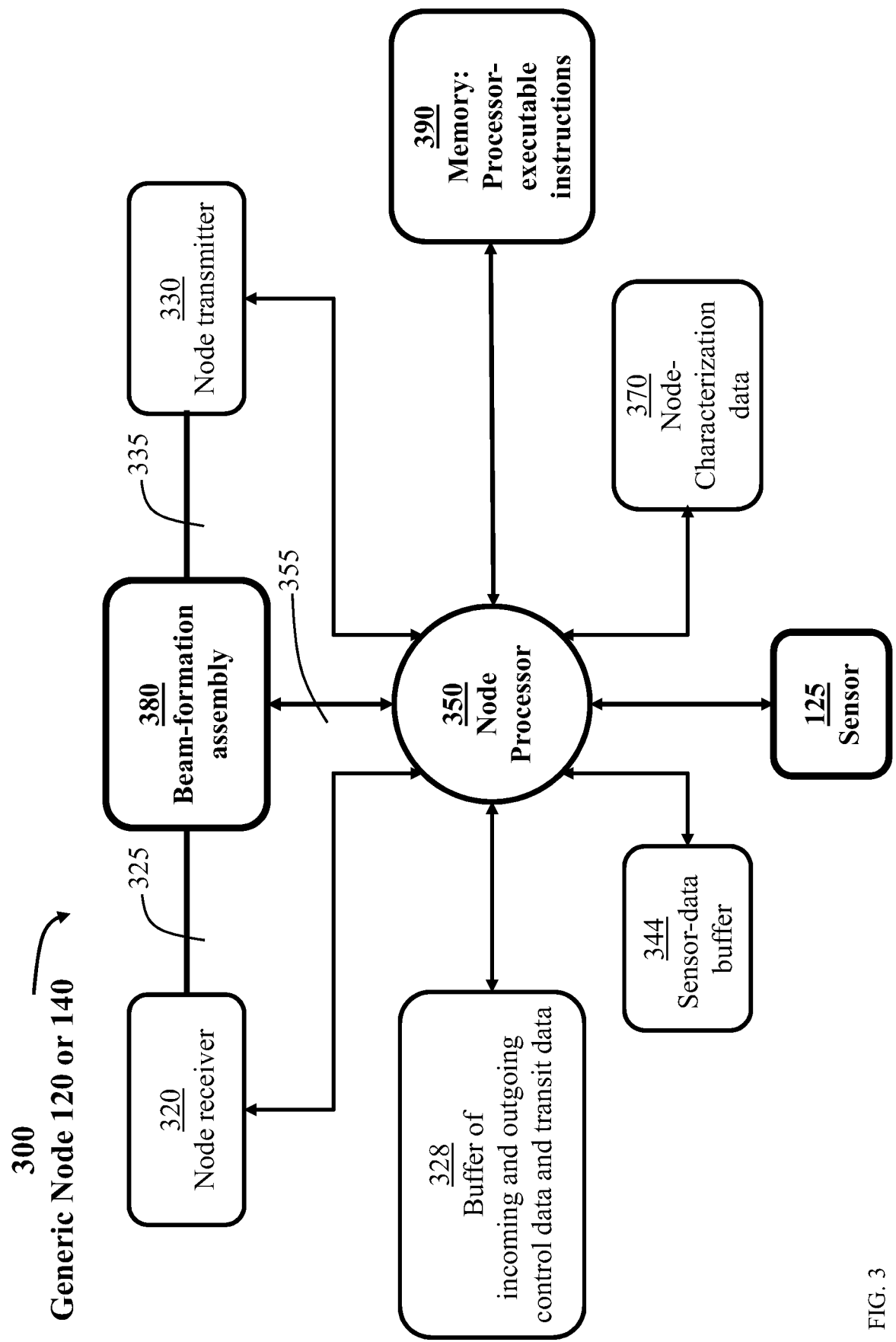
FIG. 3 illustrates a generic node which may be configured as a sensor node or a collector node, in accordance with an embodiment of the present invention.

FIG. 3 illustrates a generic node 300 which may be configured as a sensor node 120 or a collector node 140. The generic node 300 comprises a hardware node processor 350 coupled to:

a sensor 125;
a node transmitter 330;
a node receiver 320;
a beam-forming assembly 380;
a sensor-data buffer 344;
a memory device 328 storing control data and transit sensor data,
a memory device 370 storing node characterization data; and
a storage medium 390 holding software instructions.

Buffer 344 stores local sensor data to be transmitted to the collector 140 or to another node 120 (transit node 120) to be forwarded to the collector 140. Memory device 328 stores control data and sensor data received from another node through node receiver 320 to be forwarded to the collector 140 or to an intermediate node 120 through node transmitter 330. Memory 370 stores node-characterization data which identifies a node as an "inner node" having a path to the collector or an "outer node" which may be looking for a path to the collector. An outer node and an inner node follow distinctly different rules in network formation as will be described below.

Memory device 390 stores processor-executable instructions which cause node processor 350 to implement beam forming processes and network synthesis processes according to node characterization data acquired from memory device 370.

Channels 325, 335, and 355 connect the beam-formation assembly to the node receiver 320, the node transmitter 330, and the node processor 350, respectively.

Using an Electronic Compass to Provide a Global Reference Direction

Figure 4:
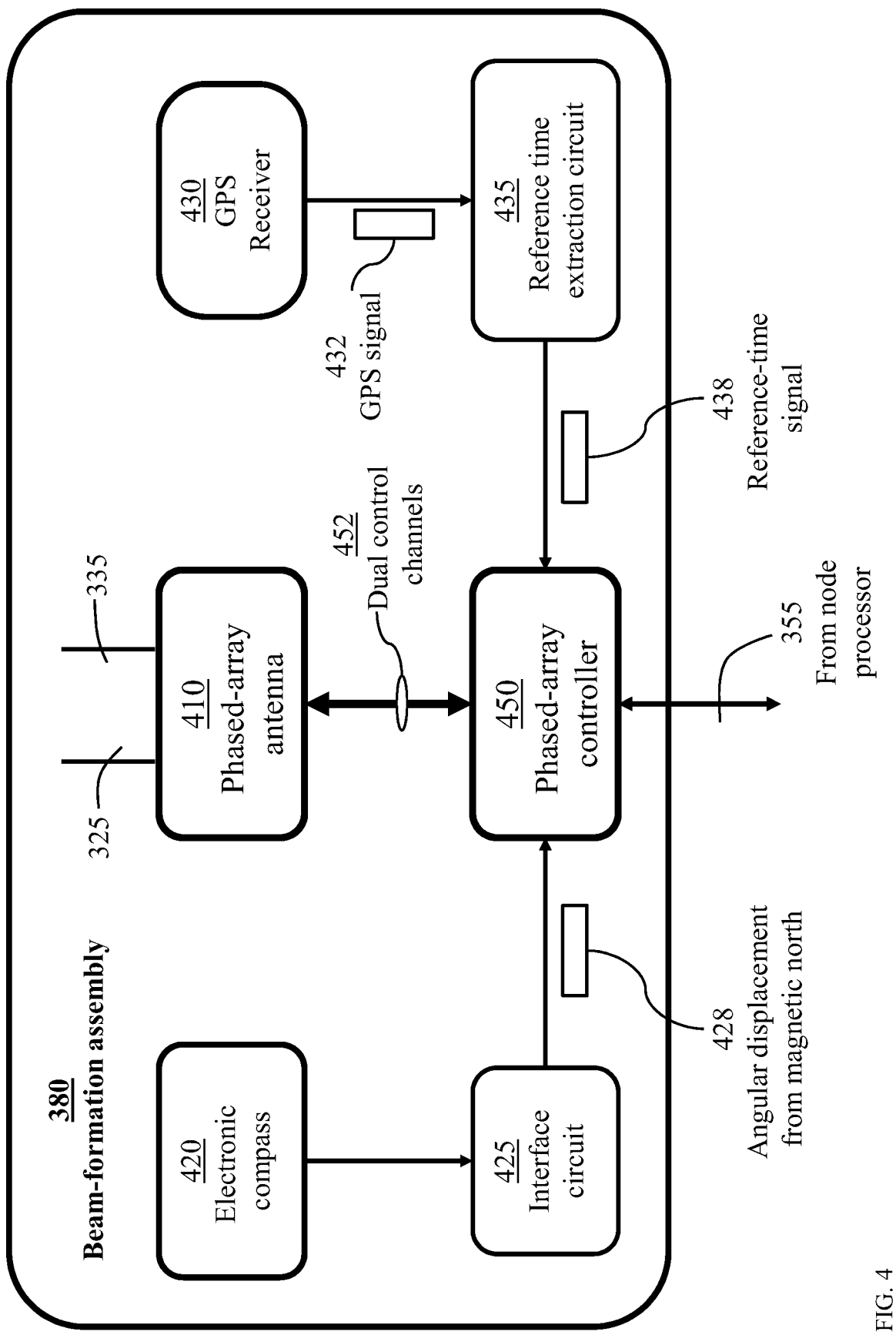
FIG. 4 illustrates a beam-formation assembly belonging to the generic node of FIG. 3.

FIG. 4 illustrates the beam-forming assembly 380 of the generic node of FIG. 3. The beam-forming assembly 380 comprises a phased-array controller 450, a phased array antenna 410, an electronic compass 420, and a GPS (Global Positioning System) receiver 430.

An interface circuit 425 couples the phased-array controller 450 to the electronic compass 420 processes output of the electronic compass 420 to produce a signal 428 indicating an angular displacement a local reference direction of a node from Earth's Magnetic North.

A reference-time extraction circuit 435 processes a signal 432 acquired from the GPS receiver 430 to produce a reference-time signal 438 to be supplied to the phased-array controller 450. The phased-array controller 450 receives beam-formation control data from processor 350 through a dual control channel 355. The beam-formation control data comprise phase-shift vectors as described above with reference to FIG. 2 and further detailed in FIG. 5 and FIG. 6 below.

Figure 5:
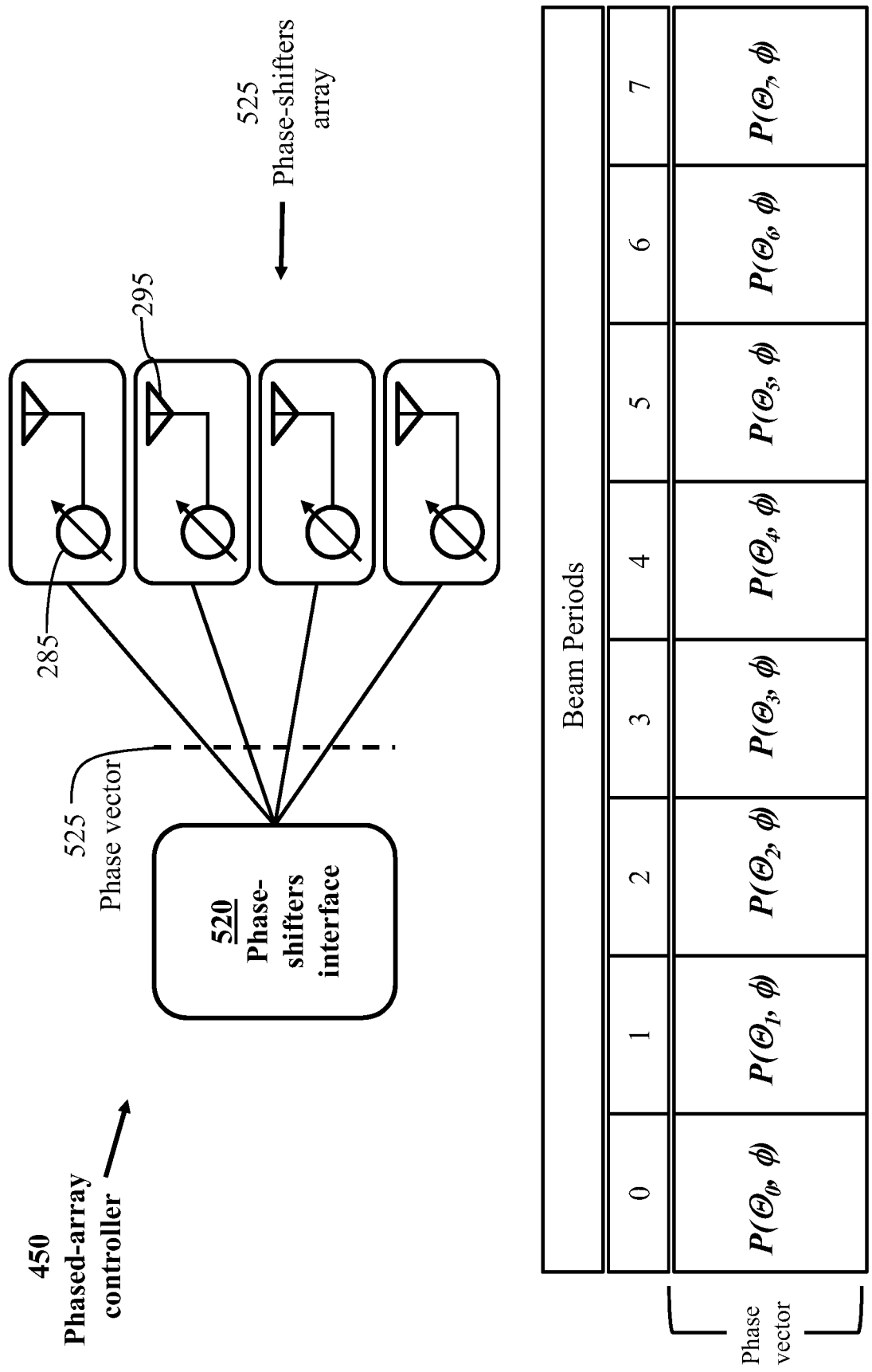
FIG. 5 illustrates a phased-array controller of the beam-formation assembly of FIG. 4.

FIG. 5 details the phased-array controller 450 of the beam-formation assembly 380. The phase-shifters interface 520 supplies signals 525 representing phase-shift values of a phase-shift vector to individual phase shifters 285. The phase-shift vector is updated during each beam duration. During a beam period, N phase-shifted replica of a modulated carrier signal received from node transmitter 330 are individually supplied to the N antenna elements 295 to form a transmitted beam of a specified orientation and beam width. Conversely, during the beam period, N modulated carrier signals received from the N antenna elements are individually phase-shifted differently and combined to form a beam of a specified orientation and beam width.

The node transmitter may be activated during each beam period of a beam cycle or may be activated during selected beam periods depending on the status of the node during the network formation process. An outer node may transmit a connection request during each beam period and may be activated to receive signals during each beam period in anticipation of an invitation from an inner node (or directly from the collector). An inner node that has already secured an upstream path towards the collector may receive sensor data from subordinate inner nodes during designated beam periods and may also be activated to receive signals during other beam periods in anticipation of connection requests from outer nodes.

The N beam periods of a beam cycle are herein indexed as 0 to (N−1). The N beams of a beam cycle may be oriented in arbitrary directions and beams formed during successive beam periods need not be spatially adjacent. However, the successive N beams are preferably formed to be successively spatially adjacent. Thus, the central radial lines of the N beams formed during a beam cycle are equally spaced with an angular displacement of (2π/N) radians of each beam with respect to a preceding beam.

As described above, a phase-shift vector $P(\Theta_j, \omega_j)$, $0 \leq j < N$, of q scalar phase-shift values. q>1, is precomputed for each directional beam of a target direction $\Theta_j$ and beam width $\omega_j$. Preferably, all beams are formed to be of the same beam width so that $\omega j = \phi$, for $0 \leq j < N$, and $(\Theta_j - \Theta_{(k-1)}) = 2\pi/N$, with $\Theta_j > \Theta_{(j-1)}$, $0 < j < N$. This condition may apply to all nodes of the network. However, even if all nodes are phase locked to ensure exactly equal clock rates and time aligned to ensure that the beam cycles of all nodes start at exactly the same global reference time, the nodes may still be unable to communicate through directional beams since the value of $\Theta_0$ is relevant to a given beam-formation assembly and the nodes may not be physically coordinated at the installation phase. The value of $\Theta_0$ for a given beam-formation assembly 380 is used as the local reference direction and the phase-shift vectors are determined to direct the central line of the first beam of the beam cycle accordingly. In the example of FIG. 5, the value of $\Theta_0$ for a given beam-formation assembly is arbitrarily set to zero and the phase-shift vectors for eight beams (N=8) are respectively denoted P(0, φ), P(π/4, φ), P(π/2, φ), P(3π/4, φ), P(π, φ), P(5π/4, φ), P(3π/2, φ), and P(7π/4, φ).

To realize a networkwide reference direction, each node may employ an electronic compass 420 as illustrated in FIG. 4 (for a single node). With the local reference direction (setting $\Theta_0$ to zero) well defined for each node, the phase-shift vectors $P(\Theta_j, \omega_j)$, $0 \leq j < N$, would be identical for each node. Conveniently, the common phase-shift vectors can be provided at the manufacturing stage and placed, together with the local reference direction $\eta_0$, in the memory device 370 storing the node characterization data. At the manufacturing stage, the electronic compass may be positioned to provide the value of the angular displacement, denoted Γ, of the local reference direction from the magnetic north of Earth. However, this angular displacement for a given node may vary as the node is physically moved and, hence, adaptive phase shift vectors need be computed automatically whenever a node moves. With a typical commercial processor, the computation time would be of the order of a fraction of a millisecond which is quite adequate.

Figure 6:
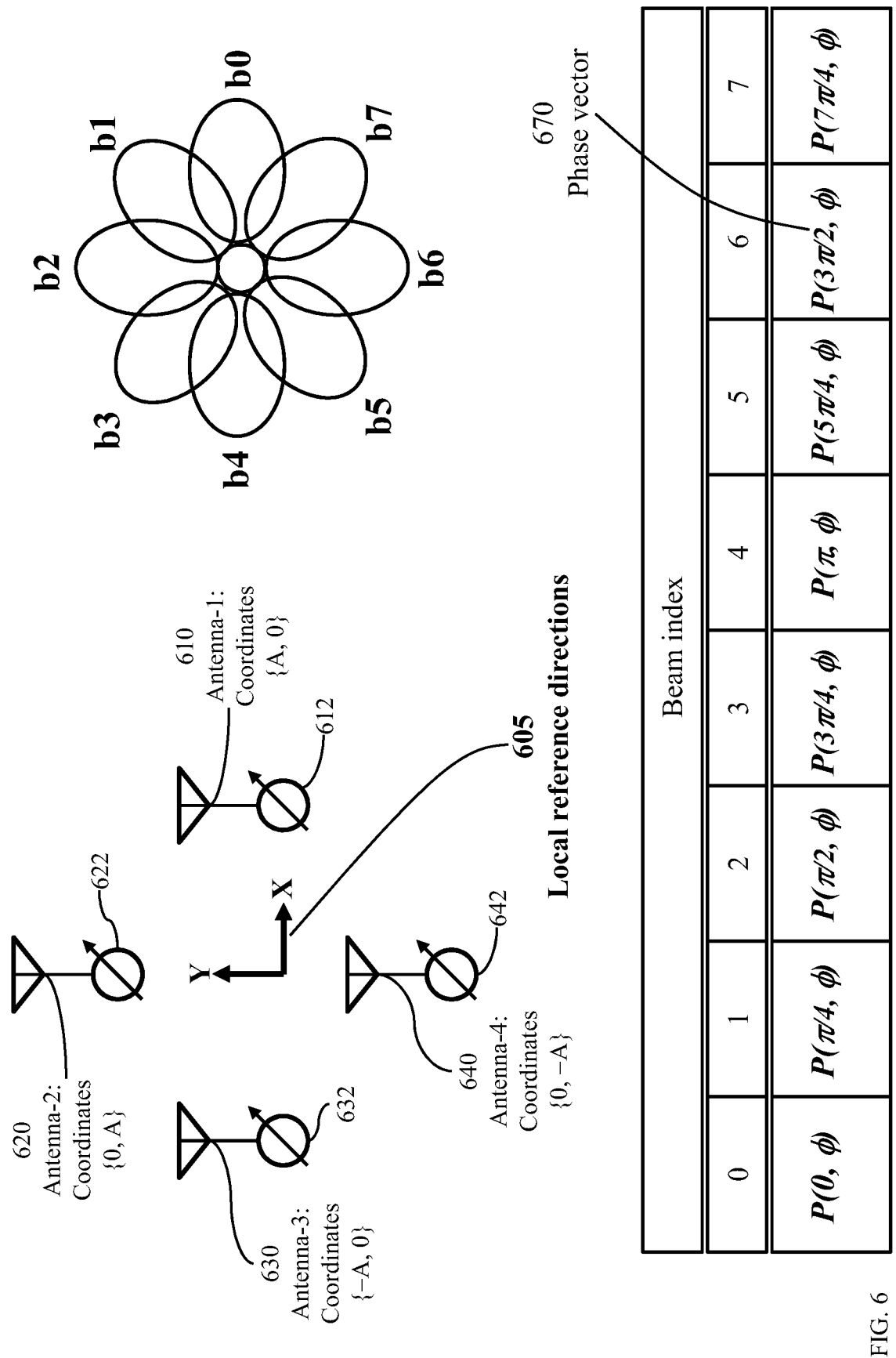
FIG. 6 illustrates beam orientation with respect to a compass-determined reference direction for an exemplary phased-array antenna, in accordance with an embodiment of the present invention.

FIG. 6 illustrates exemplary predetermined beam orientation with respect to a reference direction of a node 120, in accordance with an embodiment of the present invention. A phased-array antenna comprises four individual antennas 610, 620, 630, and 640 placed at relative coordinates {A, 0}, {0, A}, {−A, 0}, and {0, −A} with respect to node-specific reference directions 605 indicated as an X-axis and a Y-axis. Each antenna is coupled to a respective phase shifter; phase shifters 612, 622, 632, and 642, are coupled to antennas 610, 620, 630, and 640, respectively. The orientation of an aggregate beam transmitted from the phased-array antenna or a combination of beams received at the four antennas is determined according to individual phase shifts applied at the individual antennas. The set of phase-shift values is represented as phase-shift vector P(Θ, φ), where Θ is the desired orientation of the aggregate beam with respect to the node-specific reference directions and φ is the beam width. In the illustrated example, the selected values of Θ are 0, π/4, π/2, 3π/4, π, 5π/4, 3π/2, 7π/4, π being the familiar Archimedes constant 3.14159 . . . .

Figure 7:
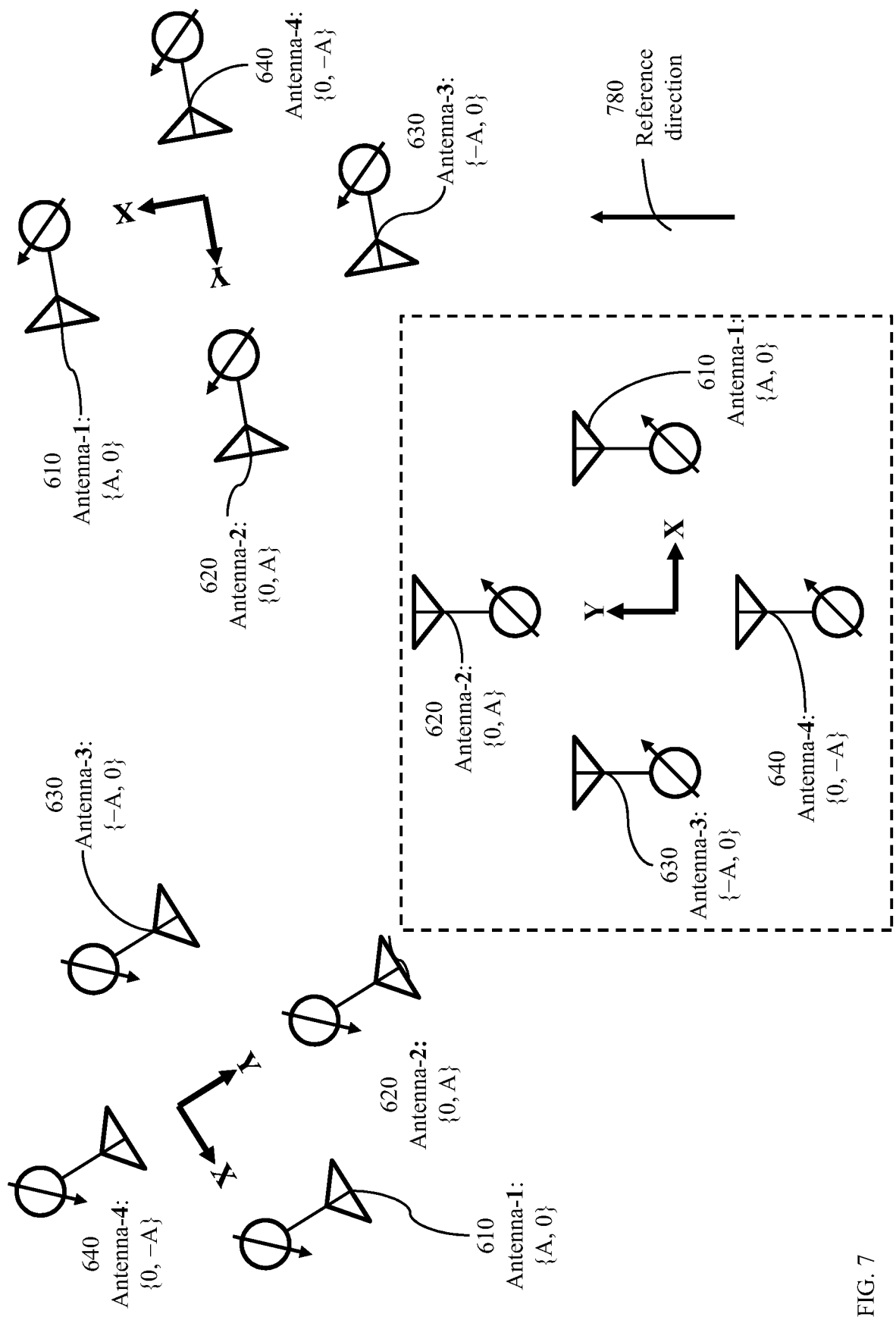
FIG. 7 illustrates changing orientation of a phased-array antenna according to node position.

FIG. 7 illustrates changing orientation of a phased-array antenna comprising four antennas 610, 620, 630, and 640. The phased-array antennas installed in the nodes 120 are preferably identical; though this is not a requirement. The nodes are installed at different locations determined according to availability, feasibility, and administrative restrictions. The nodes may be installed to have identical orientations. However, a node may be repositioned frequently or may be mobile. Thus, in accordance with the present invention, each node 120 is configured to automatically reorient the beam set along directions bearing a fixed relationship to a common reference direction 780, such as Earth's Magnetic North determined from the electronic compass 420.

Figure 8:
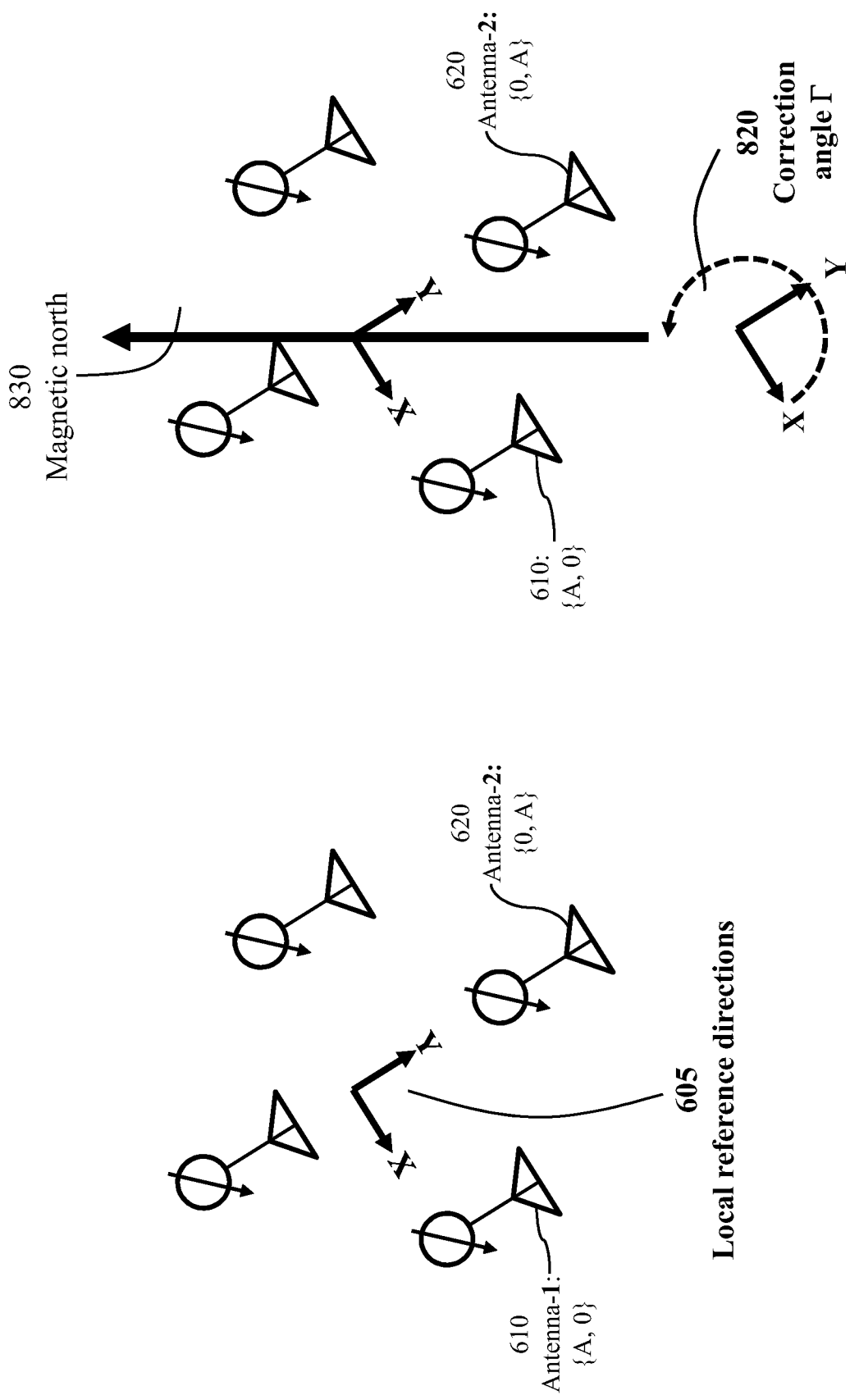
FIG. 8 illustrates determining a correction angle for modifying beam orientation according to a global reference direction, in accordance with an embodiment of the present invention.

FIG. 8 illustrates a correction angle 820, denoted Γ, determined by the electronic compass 420 to be used for modifying the beam orientation so that the beam directions of each node have a one-to-one correspondence to the beam directions of each other node. To realize this condition, beam formation at each node is based on establishing a predetermined directional relationship to the direction 830 if Earth's Magnetic North.

Figure 9:
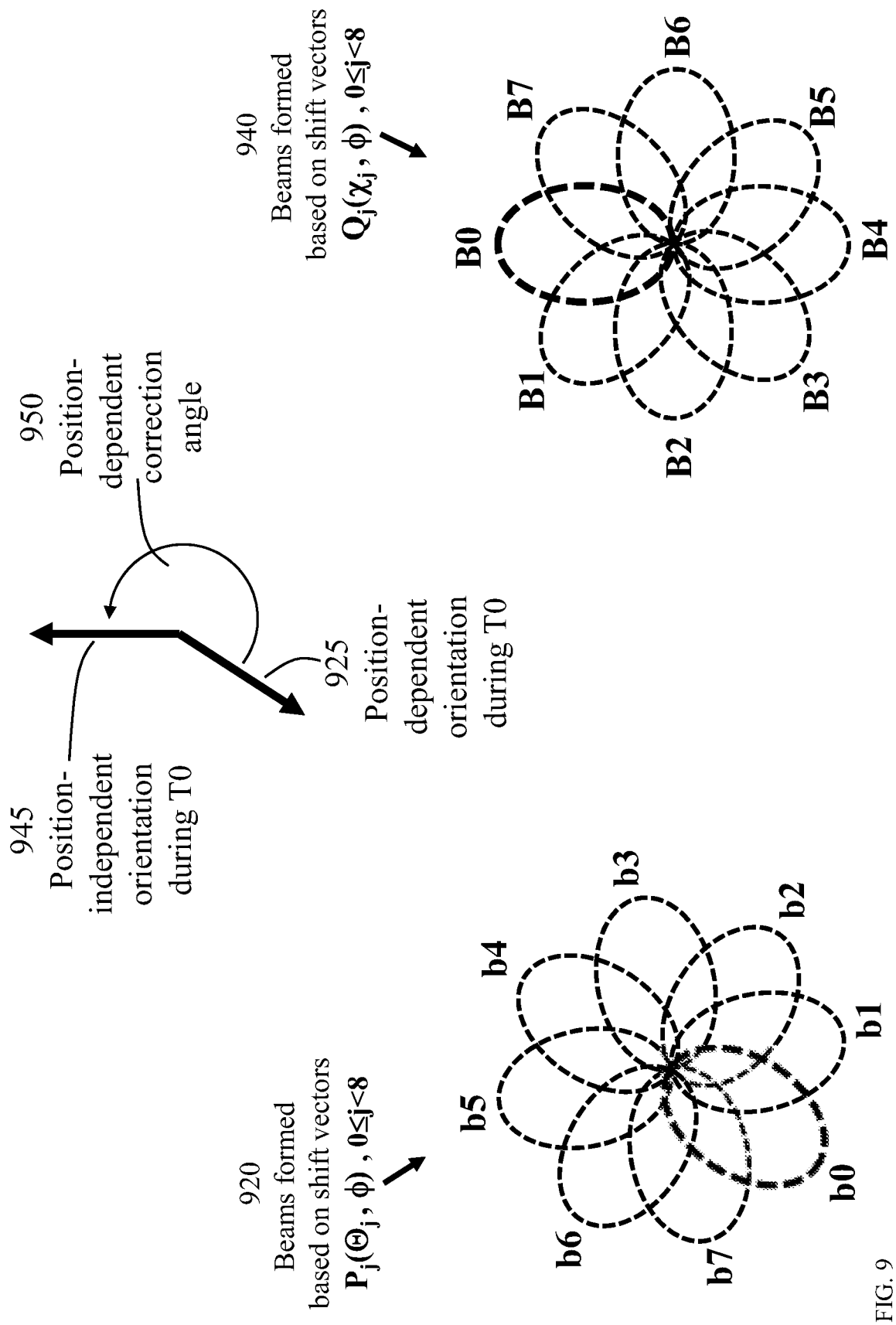
FIG. 9 illustrates the effect of adjustment of beam orientation according to a compass-determined reference direction.

FIG. 9 illustrates the effect of adjustment of beam orientation according to a compass-determined reference direction. The set of beams b0, b1, . . . , b7 is based on setting the phase-shift vectors 920 at the four phase shifters 612, 622, 632, and 642 of the exemplary phased-array of FIG. 6 to values that orient the beams along the directions {0, π/4, π/2, 3π/4, π, 5π/4, 3π/2, 7π/4, π}. Node-position-dependent Beam b0 is oriented along direction 925, which the local X-axis direction, during beam period T0. Node-position-independent direction 945 during beam period T0 is the global reference direction (Magnetic North). The correction angle 950 is determined at the beam-formation assembly 380 (FIG. 3 and FIG. 4).

The set of properly-oriented beams B0, B1, . . . , B7 is based on setting the phase-shift vectors 940 at the four phase shifters 612, 622, 632, and 642 of the exemplary phased-array of FIG. 6 to values that orient the beams along the directions {Γ, (Γ+π/4), (Γ+π/2), (Γ+3π/4), (Γ+π), (Γ+5π/4), (Γ+3π/2), (Γ+7π/4), (Γ+π)}.

The phase-shift values are determined according to (A) placement of each antenna element with respect to the node reference direction, (B) the node orientation, which is the angular displacement of the node reference direction from Earth's magnetic north, and (C) a specified beam direction. A beam direction is specified for each beam duration within the beam cycle. During a beam period of index j, $0 \leq j < N$, within the beam cycle, the specified beam direction is determined as: Γ+2×π×j/N, Γ being the node orientation.

FIG. 10 illustrates phase-shift determination for individual antennas of the exemplary phased-array antenna of FIG. 6. For each properly-oriented beam B0, B1, . . . , or B7, the beam direction Θ is determined as indicated. For each individual antenna 610, 620, 630, and 640, the phase shift is determined according to the physical position of the antenna. With antennas 610, 620, 630, and 640 located at node-specific coordinates {A, 0}, {0, A}, {−A, 0}, and {0, −A}, the phase shifts are determined as h×cos(Θ), h×sin(Θ), −h×cos(Θ), and −h×sin(Θ), where h=2πA/λ, λ being the wavelength of the carrier microwave. With λ=12.5 cm (2.4 Ghz carrier), "A" is selected to equal $8^{1/2}$, and h=0.45255.

Figure 11:
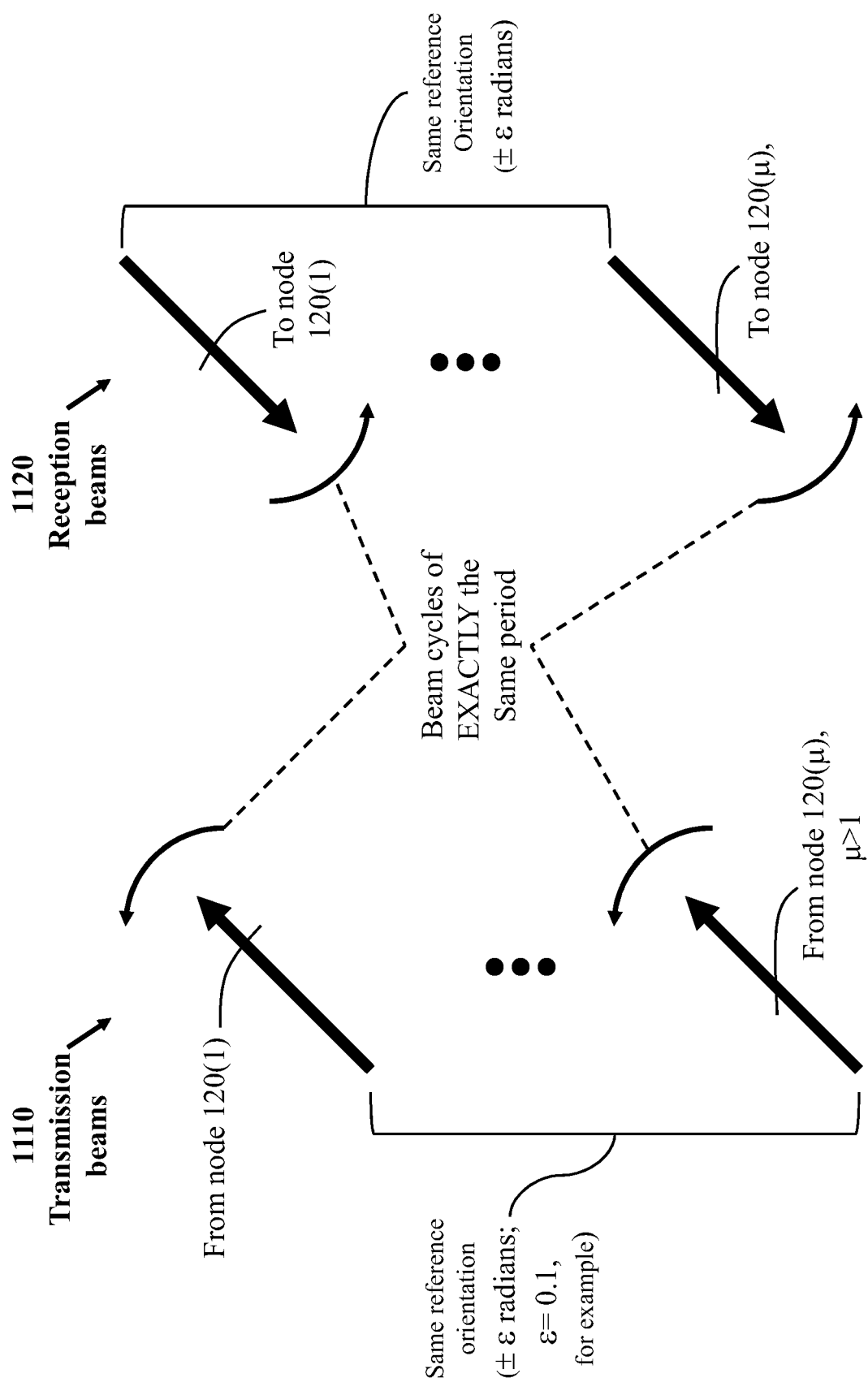
FIG. 11 illustrates basic requirements of beam formation in order to realize spatial and temporal alignments of corresponding transmission and reception beams for each node pair of the plurality of nodes of a wireless sensor network, in accordance with an embodiment of the present invention.

FIG. 11 illustrates basic requirements of beam formation in order to realize spatial and temporal alignments of corresponding transmission and reception beams for each node pair of the plurality of nodes of the wireless sensor network. Each node is configured to transmit a predefined number N, N>1, of beams of different orientations during N beam periods of a beam cycle. Each node is also configured to receive N beams during the beam cycle. The basic requirements are outlined below.

A first requirement is that the central direction of each of the N beams bear a predefined angular displacement from a global reference direction known to all nodes.

The second requirement is that the phased-array antenna be configured to transmit and receive in different directions during any beam period. According to the present implementation, during any beam period, the angular displacement of the central direction of a received beam from the central direction of a transmitted beam is 7C radians. This is realized using a full-duplex phased-array antenna.

The third requirement is that the beam cycles have exactly the same period for each node in the network.

The fourth requirement is that beam widths, in the transmission and reception directions, be oriented to cover N spatial sectors so that each sector is adjacent to a preceding sector and a succeeding sector. It is preferred, however, that the beam widths be selected so that each of the N sectors overlaps a preceding sector and overlaps a succeeding sector, with each beam width exceeding 2π/N, as will be discussed below.

A preferred global reference direction is Earth's Magnetic North. Thus, if the central direction of one beam is selected to coincide with the global reference direction, and if the angle between the central direction of each beam and the central direction of an immediately preceding (or immediately succeeding) beam equals or exceeds 2π/N, then internodal connectivity is guaranteed within a predefined reach of each antenna. The reach of an antenna is determined according to power limitations and administrative regulations.

As illustrated in FIG. 11, the central directions of transmission beams 1110 of all nodes 120(1) to 120(μ), μ>1, are "parallel" (ignoring Earth's curvature since the entire sensor network may be spread over a relatively small geographical area). Likewise, the central directions of reception beams 1120 of all nodes are parallel.

Figure 12:
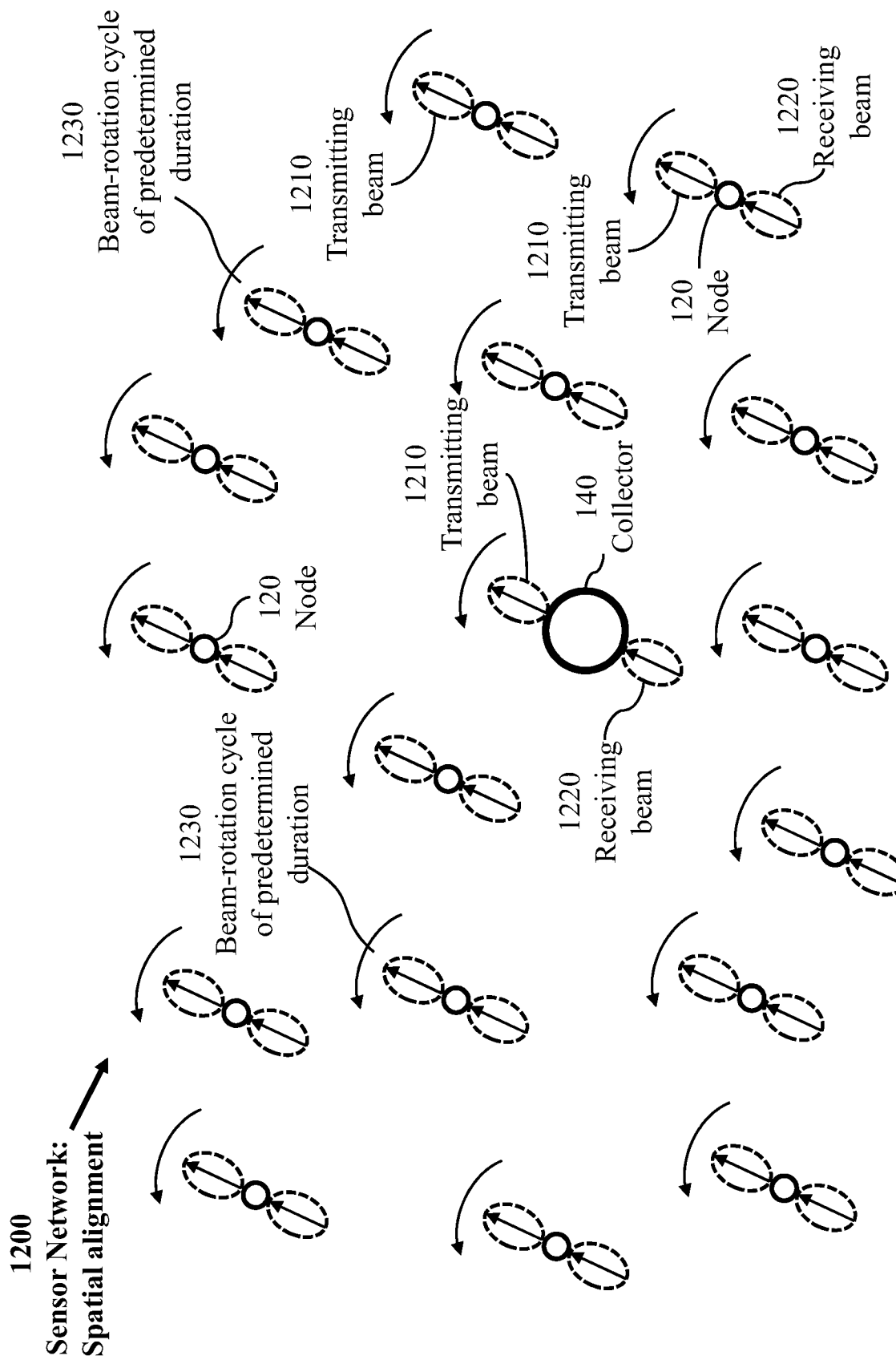
FIG. 12 illustrates requisite spatial alignment of transmission beams and reception beams of phased-array antennas of the sensor network of FIG. 1, in accordance with an embodiment of the present invention.

FIG. 12 illustrates requisite spatial alignment 1200 of transmission beams and reception beams of phased-array antennas of the sensor network of FIG. 1. All transmission beams 1210 are of the same direction during a given beam period. The transmission beam 1210 and reception beam 1220 are of opposite directions during a given beam period. During a beam cycle 1230, the N transmission beams cover all directions and the N reception beams cover all directions.

Figure 13:
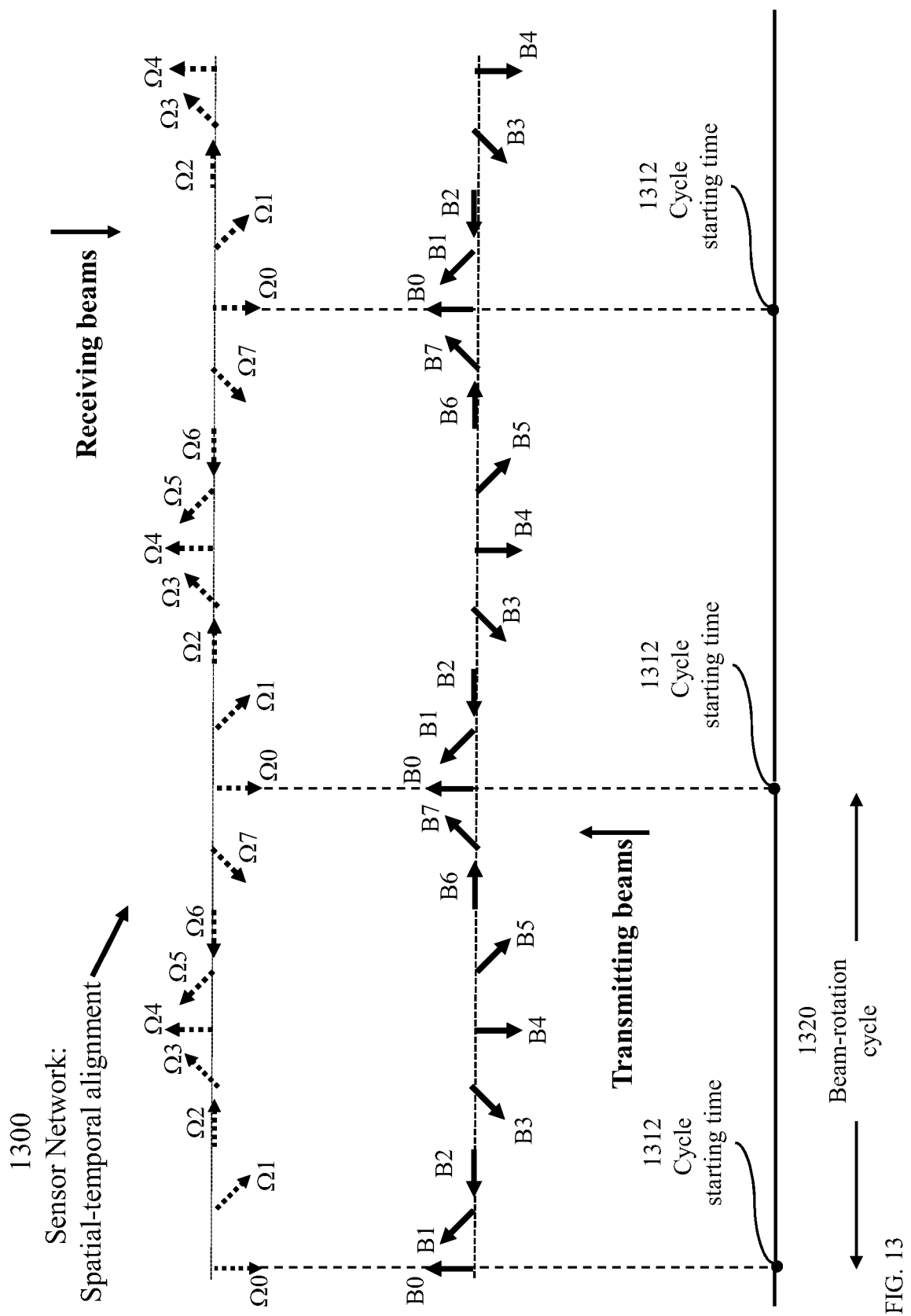
FIG. 13 illustrates requisite orientation of individual transmission beams and reception beams during a beam cycle of eight beams, in accordance with an embodiment of the present invention.

FIG. 13 illustrates requisite spatial-temporal alignment 1300 indicating orientation of individual transmission beams and reception beams of an antenna during a beam cycle of eight beams. During each beam cycle 1320, eight transmission beams B0, B1, . . . , B7 are formed with central directions of angular displacements 0, π/4, π/2, 3π/4, π, 5π/4, 3π/2, and 7π/4, respectively, with respect to the global reference direction (Earth's Magnetic North). The phased-array antenna may receive corresponding beams Ω0, Ω1, . . . , Ω7 of angular displacements π, 5π/4, 3π/2, 7π/4, 0, π/4, π/2, and 3π/4, respectively. It is noted that angular displacement is conventionally measured in the anticlockwise direction. The central direction of beams B0 at the starting time 1312 of each beam cycle is along the global reference direction.

Figure 14:
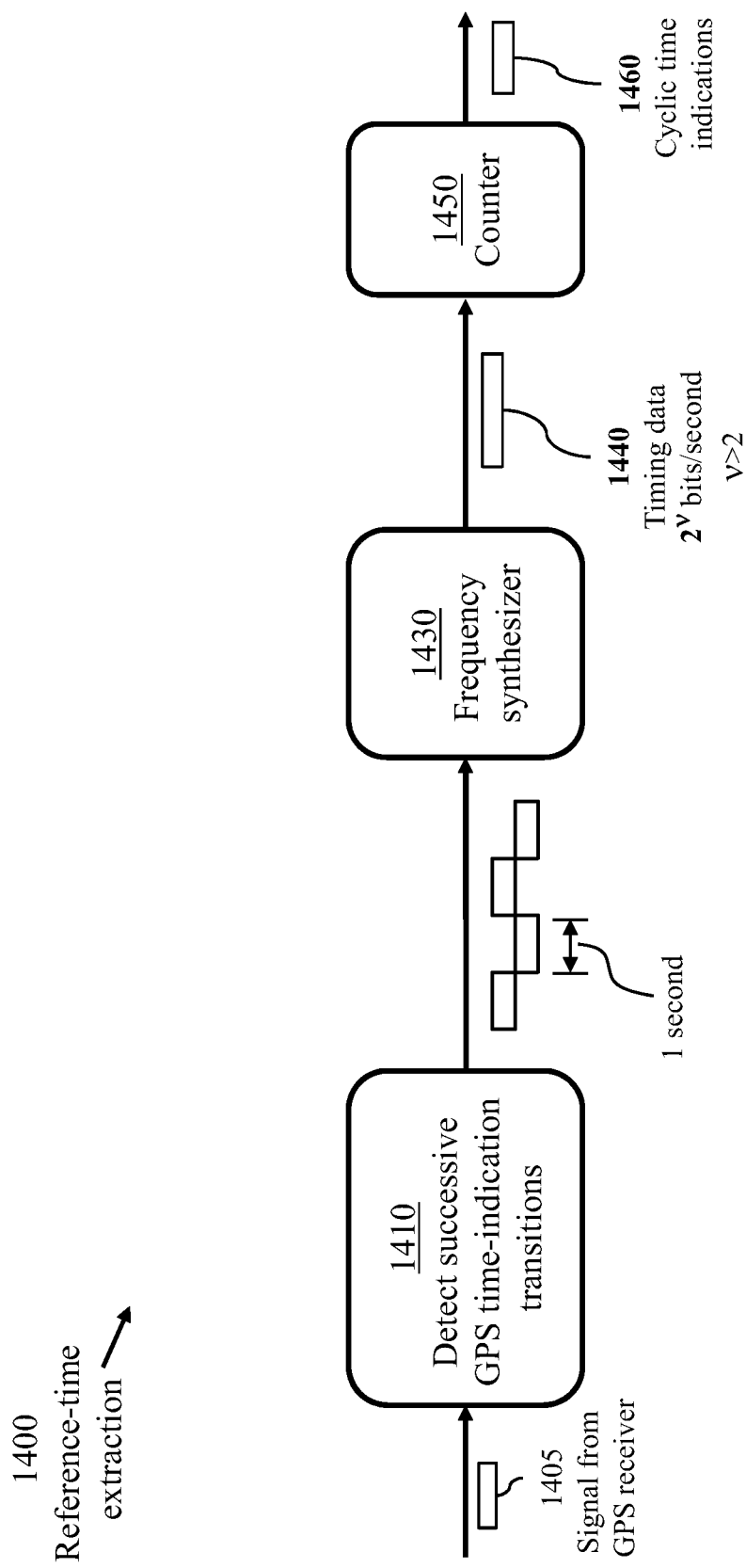
FIG. 14 illustrates frequency synthesis based on a GPS-received signal, in accordance with an embodiment of the present invention.

FIG. 14 illustrates reference-time extraction 1400 employing frequency synthesis based on a GPS-received signal. To realize the beam-formation requirements described above, all nodes are configured to follow a common reference time. Network formation starts with a collector 140. Subsequently, each node 120 attempts to establish a path to the collector. Nodes 120 establish paths to the collector at different times. When all nodes successfully join the network, a common reference time data may be distributed from the collector to the individual nodes. However, this is not feasible during network formation where some nodes are not connected. In accordance with an embodiment of the present invention, a common reference time may be derived from (Global Positioning System (GPS) data. A module 1410 may detect successive time-indication transitions from a GPS signal acquired from GPS receiver 430 (FIG. 4) once ever second. If the beam duration is selected to be an integer multiple of one second, the one-second-apart time indications may be used as a common reference time. However, while a beam period of one second, or an integer number of seconds, may be suitable during network formation, a much shorter beam period is preferred for ongoing operation of communicating sensor data to avoid excessive delays.

The successive time indications determined from the GPS signal 1405 may be supplied to a frequency synthesizer 1430; well known in the art. The output signal of the frequency synthesizer may be of the form of timing pulses 1440 separated by equal time divisions. The timing pulses may then trigger a cyclic counter 1450. With a frequency of the output signal of the frequency synthesizer of $2^v$ pulses per second, v>>1, the beam period may be selected as a multiple of $2^{-v}$ seconds. For example, selecting v to be 10, the smallest time division would be slightly less than one millisecond. The nodes 120 join the network at different times (different days or months). In order to time-align the beams in all nodes, all beam cycles need be set to start at instants of time separated by exactly N times a beam period. A simple way to realize this condition is to select the beam period to be a power of 2 number of time divisions. Selecting the beam duration to be $2^\alpha$ time divisions, α≥0, the duration of the beam cycle would be $2^\beta$, β=N×α, with each node (120 or 140) forming N beams per beam cycle, N>1. Thus, a beam cycle starts when each of the least-significant β bits is "0" and a beam period start when each of the least-significant α bits is a "0". For example, with α=2, the beam duration is $2^\alpha$, i.e., 4, time divisions. A beam cycle starts at the instant of transition to β=α+$\log_2$N=5. Thus, beam cycle starts when each of the five least significant bits of the output of the counter 1140 is "0". Consequently, the word length of the cyclic counter is preferably selected to be an integer multiple of β.

Thus, the reference-time circuit comprises (i) a circuit for detecting time-indication transitions of timing data acquired from the Global-Positioning-System receiver and identifying pivotal reference time indications, (ii) a frequency synthesizer for detecting time-indication transitions at a basic rate from the Global-Positioning-System receiver and producing pulses at an integer multiple of the basic rate, and (iii) a cyclic counter of the pulses for generating a saw-tooth signal defining duration of the beam cycle.

Figure 15:
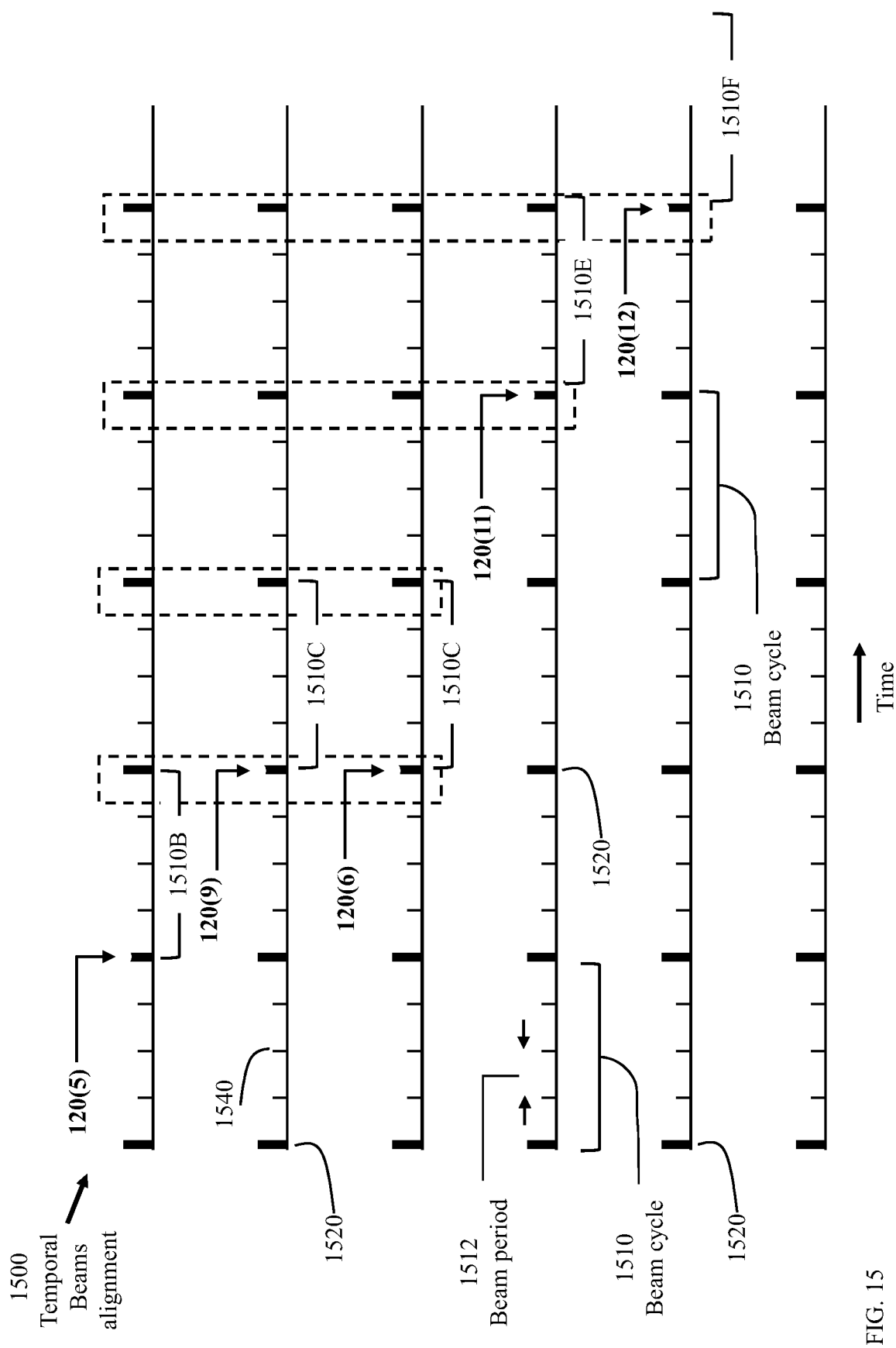
FIG. 15 illustrates temporal beams alignments for a set of five nodes, in accordance with an embodiment of the present invention.

FIG. 15 illustrates temporal beams alignment 1500 for a set of five nodes 120(5), 120(9), 120(6). 120(11), and 120(12) of network 100 of FIG. 1 with a beam cycle of four beams (N=4). The Beam cycles, 1510A, 1510B, etc., start at instants 1520. The first beam of a beam cycle starts at an instant 1520 with the succeeding beams of the beam cycle starting at instants 1540. In the illustrated example, node 120(5) is the first node to connect to the collector 140. The appropriate transmission beam from node 120(5) is determined before the start of a beam cycle 1510B. Thus, connection of node 120(5) to the collector 140 starts during a subsequent beam cycle 1510B. An appropriate transmission beam from node 120(9) to the collector is determined before the start of a beam cycle 1510C and the connection of node 120(9) starts during beam cycle 1510C. Likewise, connections of nodes 120(6), 120(11), and 120(12) to the network start during beam cycles C, E, and F, respectively. As illustrated in FIG. 1, nodes 120(5), 120(9), and 120(6) connect directly to the collector 140 while node 120(11) connects to the collector 140 through node 120(5) and node 120(12) connects to the collector 140 through node 120(9). The beam cycle during which an outer node establishes a path to an inner node en route to the collector 140 is independent of the relative location of the inner node with respect to the outer node. The beam period during which data may be transferred once the path is established depends on the relative location.

Figure 16:
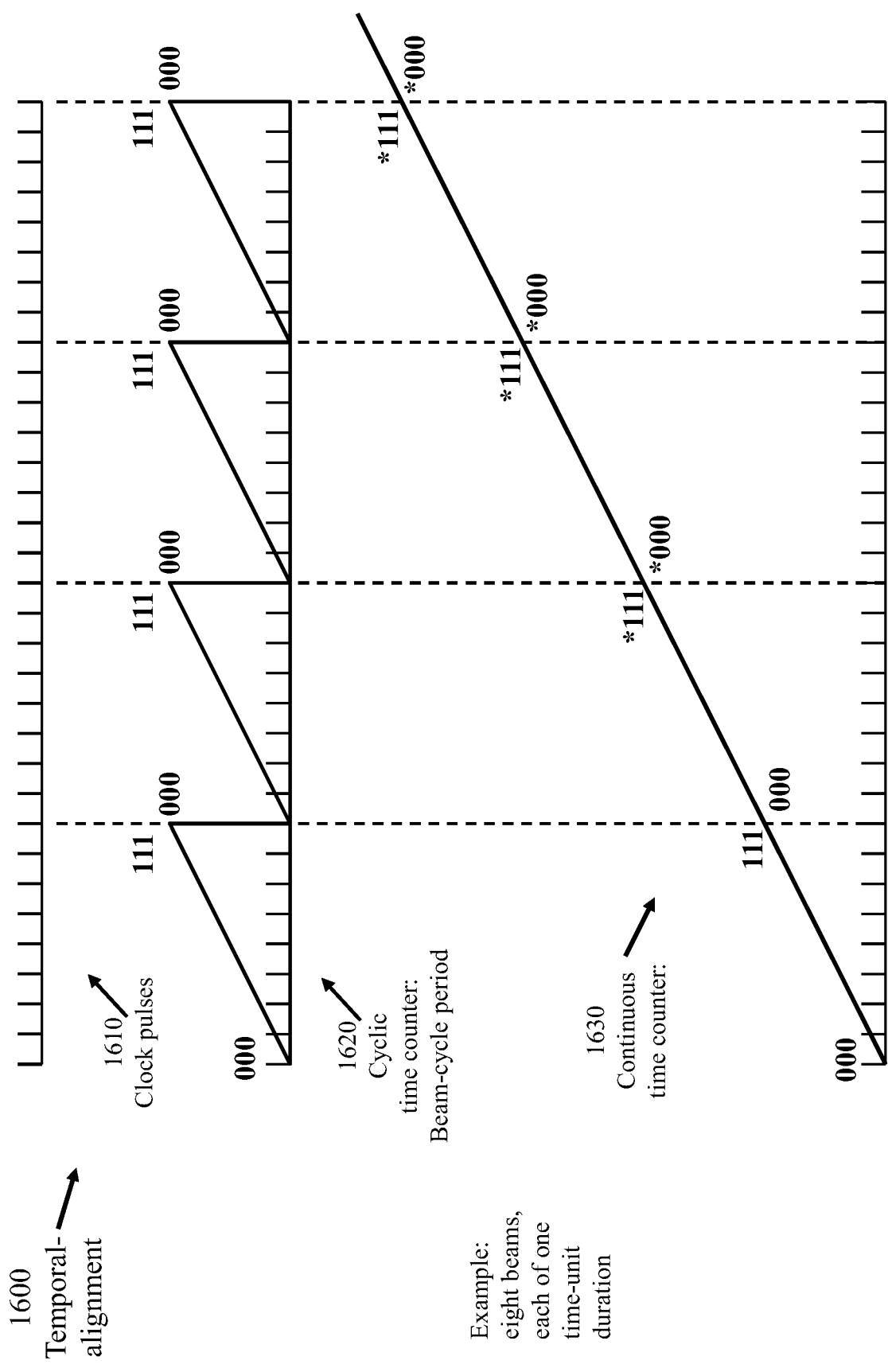
FIG. 16 illustrates a scheme of temporal beams alignment based on examining least significant bits of a time indicator.

FIG. 16 illustrates a scheme 1600 of temporal beams alignment based on examining least significant bits of a time indicator. Timing pulses 1610 are either derived directly from a GPS receiver (at a rate of one pulse per second) or derived from frequency synthesizer 1430 at a higher rate. In the example of FIG. 16, the beam period is one time division and a saw-tooth signal 1620, of a cyclic period of eight time divisions, at the output of a counter 1450 triggers the start of each beam cycle of eight beams. If the time pulses are derived directly from the GPS receiver, as the time instants at which the time indication changes, then each beam cycle starts when the three least-significant bits of the GPS time indication are zeros.

Figure 17:
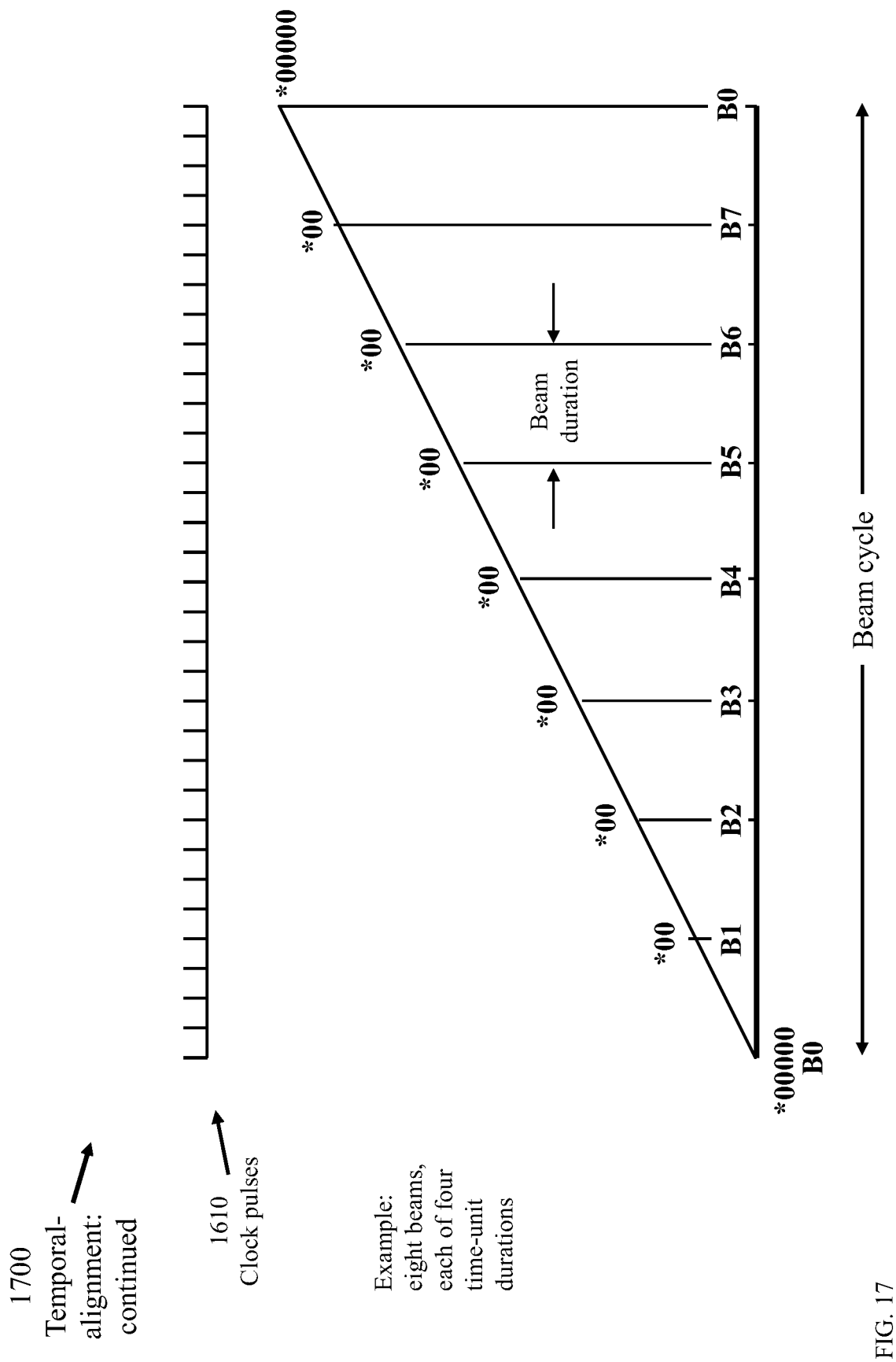
FIG. 17 illustrates temporal beams alignment for a specific beam duration.

FIG. 17 illustrates a scheme 1700 of temporal beams alignment similar to the timing scheme of FIG. 16 where the period of each beam is four time divisions and the beam-cycle duration is 32. If a saw-tooth signal of a period of 32 time divisions is generated, the signal defines a beam cycle with each beam starting at the instant where the least two significant bits are zeros. Otherwise, a string "00000" of the least-significant five bits defines the start of beam cycle (a first beam of the beam cycle) while a string of "00" of the least-significant two bits defines the start of a beam period.

Figure 18:
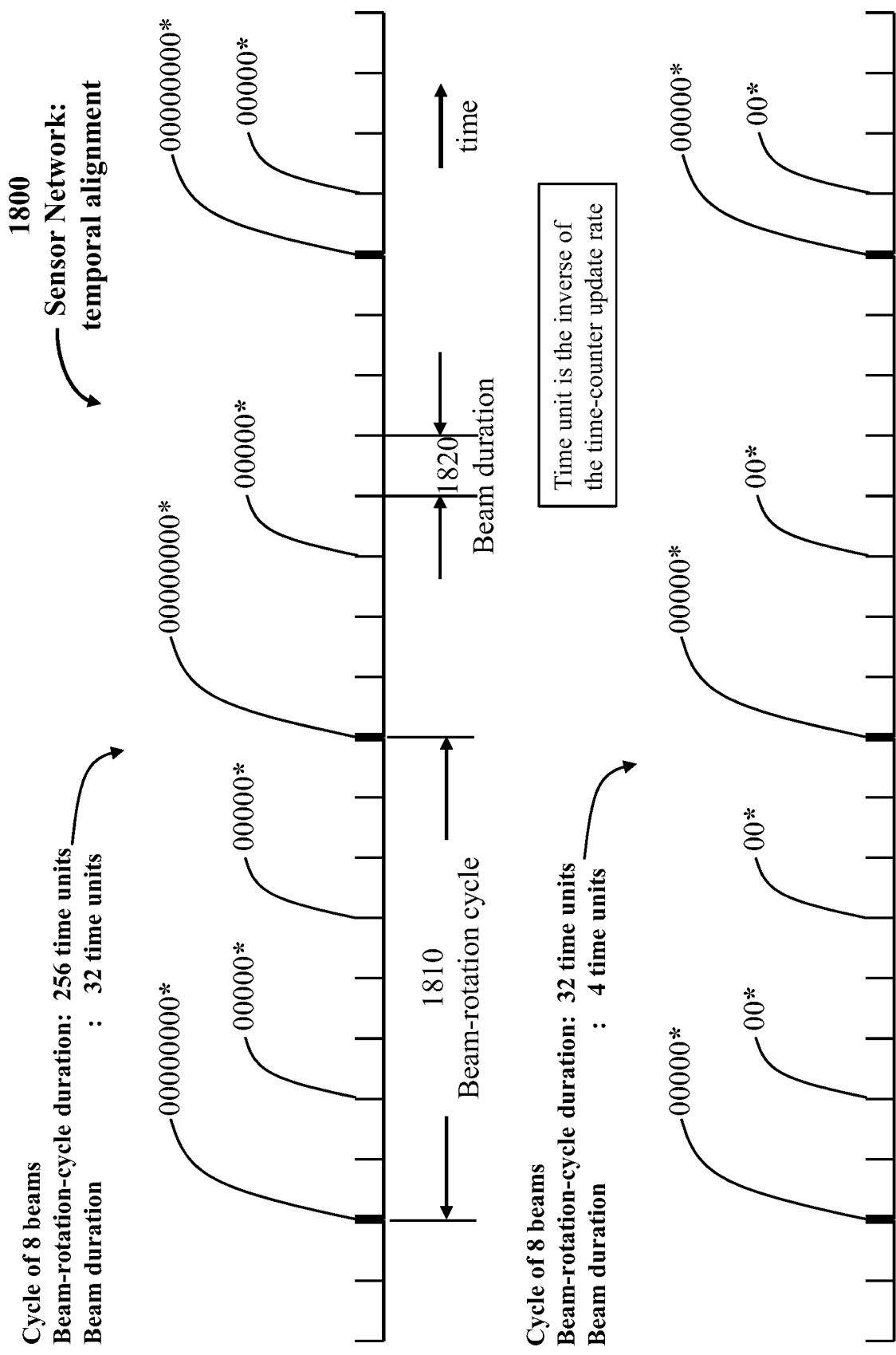
FIG. 18 illustrates determining time windows of a beam cycle of eight beams and individual beam periods from a stream of reference timing data, in accordance with an embodiment of the present invention.

FIG. 18 illustrates a scheme 1800 of temporal alignment based on determining time windows of a beam cycle of eight beams and individual beam periods from a stream of reference timing data where the beam period is 32 time divisions, hence the beam-cycle duration is 256 time divisions.

Figure 19:
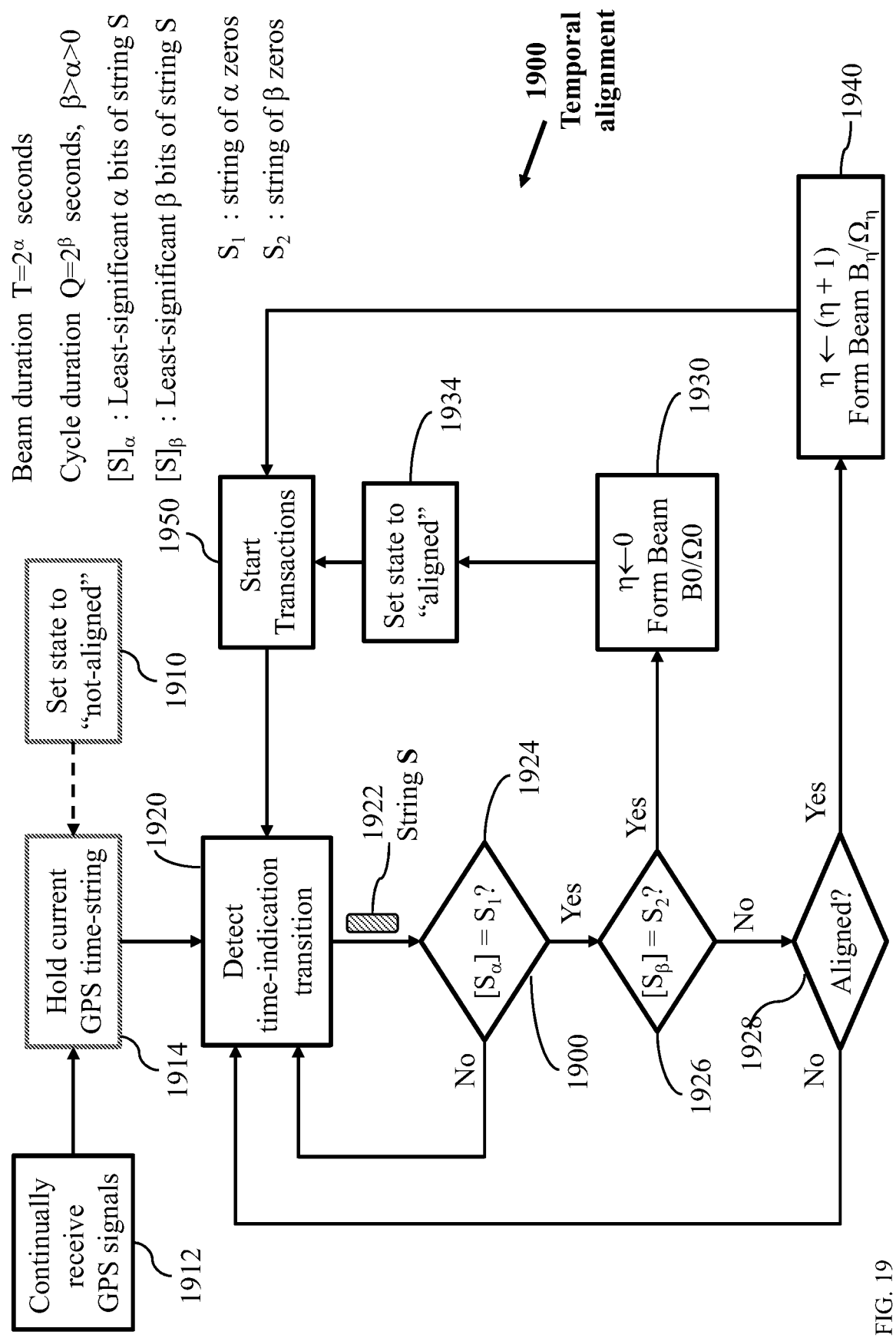
FIG. 19 illustrates a method of temporal alignment according to an embodiment of the present invention.

FIG. 19 illustrates a method 1900 of temporal alignment according to an embodiment of the present invention. The process of time-aligning the central direction of the first beam of a beam cycle to the common reference direction starts with setting the state of the node as "non-aligned" (Process 1910). The GPS receiver 430 continually receives a GPS signal (process 1912) which includes a timing string and hold a current GPS signal in a buffer (process 1914). Each instant of time-indication transition, where the rightmost (least significant) bit of a timing string changes from a value of "1" to a value of "0", or vice versa, is detected (process 1920). Process 1924 compares a string $[S_\alpha]$, defined as a string containing a least-significant (rightmost) bits, α>0, with a string $S_1$ defined as a string of α zeros. If string $[S_\alpha]$ is not equal to string $S_1$, process 1920 is revisited since inequality is indicative of a time instant within a beam period and not the start of a beam period. Otherwise, equality of string $[S_\alpha]$ to string $S_1$ is indicative of a potential start of a beam period.

Process 1926 compares a string $[S_\beta]$, β>α>0, defined as a string containing β least-significant (rightmost) bits, with a string $S_2$ defined as a string of β zeros. If string $[S_\beta]$ equals string $S_2$, process 1930 is activated to form a first transmission beam B0 and first reception beam Ω0 of a beam cycle and set a bean index η as 0. Process 1932 forms a corresponding receiving beam Ω0 of opposite direction of B0. Process 1934 changes the state of the node as "aligned" and process 1950 starts transactions, if any.

If string $[S_\beta]$ is not equal to string $S_2$, process 1928 is activated to determine whether the node has been previously aligned. If the node has not yet been aligned, i.e., the start of a beam cycle has not yet been reached, process 1920 is revisited. If the node has been previously aligned, process 1940 increases the beam index η by 1 and forms transmission beam $B_\eta$ and reception beam $\Omega_\eta$ of opposite direction to transmission beam $B_\eta$. Process 1950 is then activated to start transmission (beam $B_\eta$) or reception (beam $\Omega_\eta$) if any.

Figure 20:
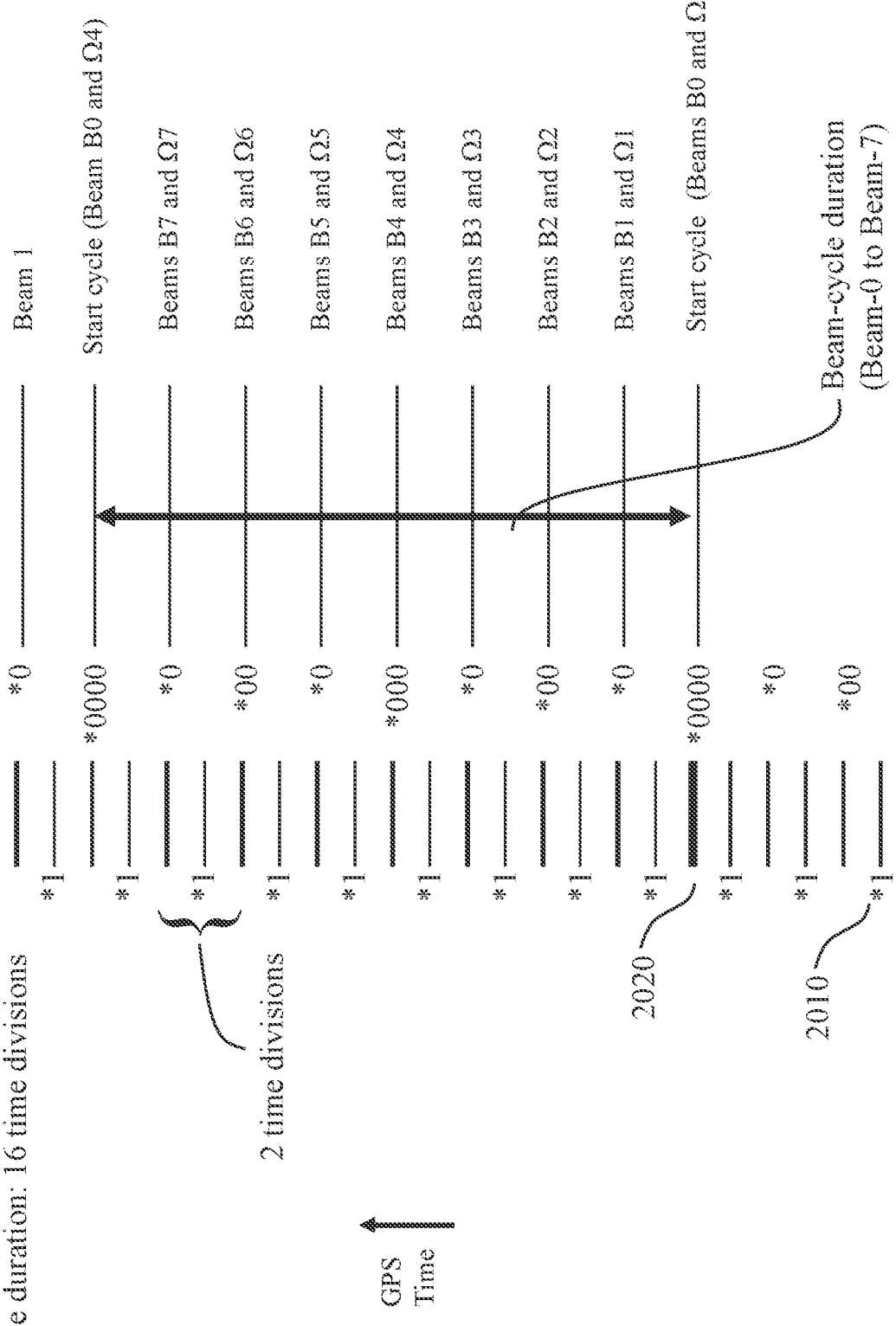
FIG. 20 illustrates an exemplary implementation of the method of FIG. 19 of beam temporal alignment at a node for a case of eight beams per beam cycle with a beam period of two time divisions.

FIG. 20 illustrates an exemplary implementation of the method of FIG. 19 of beam temporal alignment at a node for a case of eight beams per beam cycle with a beam period of two time divisions. Initially, the state of the node is set to "not-aligned" (process 1910). GPS time indications extracted from continually received GPS data (process 1912) at GPS receiver 430 are either used directly or supplied to frequency synthesizer 1430 the output 1440 of which drives counter 1450 which produces time-indications 1460 of finer granularity. Time-indication transitions would be detected every one second if GPS data is used directly or every time division of a fraction of a second (e.g., 1/1024 of a second) if time indications derived from the output 1460 of counter 1450 is used. A current time indication is held in a buffer (process 1914) and supplied to process 1920 which produces a bit string 1922, denoted S, representing detected a new time indication.

Process 1924 looks for a string with a least-significant (rightmost) bit of value "0" (α=1), which occurs every two time divisions (every 2 seconds if GPS data is used directly, approximately every 2 milliseconds if the frequency synthesizer produces 1024 pulses per one GPS time division, or approximately every 2 microseconds if the frequency synthesizer produces pulses at a rate of $2^{20}$ per GPS time division). Process 1924 determines that the rightmost (least significant) bit of initially detected string S is "*1" as indicated in FIG. 20, reference numeral 2010, where the symbol "*" denotes a "don't care" substring of characters of any number of bits of either value (0 or 1). Thus. Process 1920 is revisited awaiting a new time indication. A new string S is found to have a "0" least-significant bit. Thus, the new string may indicate the start of a beam period.

Process 1926 looks for a string with four least-significant (rightmost) bits each of value "0", (β=4), i.e., a string of value "*0000", which occurs every 16 time divisions after a first encounter.

Process 1926 determines that the four rightmost (least significant) bits of the newly detected string S ("*00") is not "0000". Since the node is still in state "not-aligned", Process 1928 leads to process 1920 to wait for a new time indication. The procedure continues in this fashion until process 1920 detects string "*0000" at instant 2020. When string "*0000"

is detected, process 1924 finds that the string may correspond to the start of a beam period and subsequent process 1926 determines that the string may also correspond to the start of a beam cycle. Thus, process 1930 forms a first transmission beam B0/reception beam Ω0 of the first recognizable beam cycle and sets the beam index within the first beam cycle to equal 0 (η←0). Process 1934 changes the state of the node to "aligned" and process 1950 starts data transmission if sensor data or control data is ready for transmission.

Figure 21:
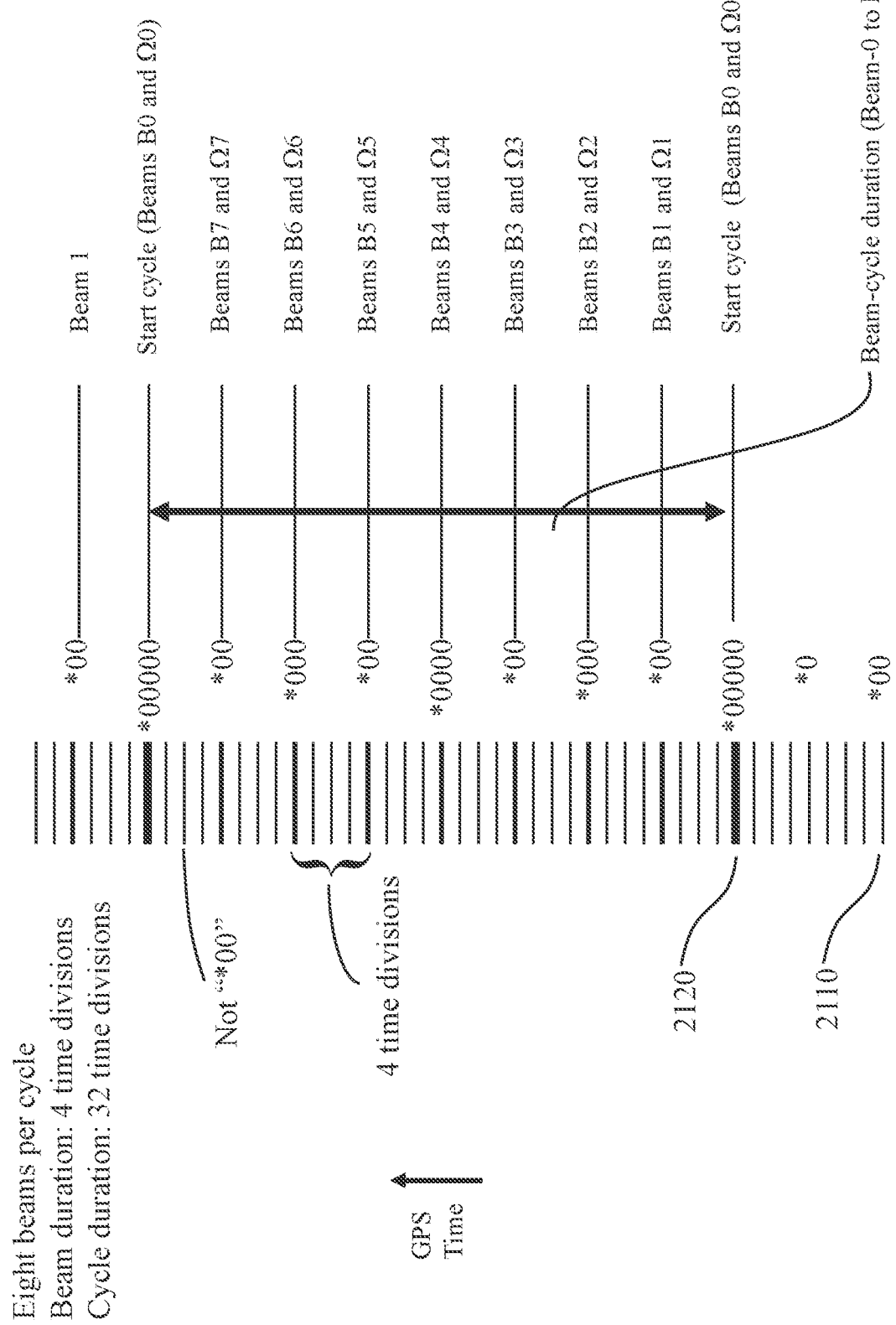
FIG. 21 illustrates another exemplary implementation of the method of FIG. 19 of beam temporal alignment at a node for a case of eight beams per beam cycle with a beam period of four time divisions, hence a beam cycle of 32 time divisions.

FIG. 21 illustrates another exemplary implementation of the method of FIG. 19 of beam temporal alignment at a node for a case of eight beams per beam cycle with a beam period of four time divisions, hence a beam cycle of 32 time divisions. Initially, the state of the node is set to "not-aligned" (process 1910). A current time indication is held in a buffer (process 1914) and supplied to process 1920 which produces a bit string 1922, denoted S, representing detected a new time indication.

Process 1924 looks for a string "*00" (α=2), which occurs every four time divisions. Process 1924 determines that the two rightmost (least significant) bits of initially detected string S are zeros, i.e. S="*00" as indicated in FIG. 21, reference numeral 2110.

Process 1926 looks for a string "*00000" (β=5), which occurs every 32 time divisions after a first encounter. Process 1926 determines that the five rightmost (least significant) bits of the detected string is not "00000". However, a string "*00" may correspond to the start of a beam period. Since the node is still in state "not-aligned", process 1928 leads to process 1920 to wait for a new time indication.

The procedure continues in this fashion until process 1920 detects string "*00000" at instant 2120. When string "*00000" is detected, process 1924 finds that the string may correspond to the start of a beam period and subsequent process 1926 determines that the string may also correspond to the start of a beam cycle. Thus, process 1930 forms a first transmission beam B0/reception beam Ω0 of the first recognizable beam cycle and sets the beam index within the first beam cycle to equal 0 (η←0). Process 1934 changes the state of the node to "aligned" and process 1950 starts data transmission if sensor data or control data is ready for transmission.

Thus, the invention provides a method of forming a wireless network. The method comprises providing a plurality of directional antennas and forming at each directional antenna N transmission beams of different directions and corresponding N reception beams during a beam cycle of N beam periods, N>1. Each transmission beam, and each reception beam, is formed according to a specified beam width. Each directional antenna is coupled to a respective node of a plurality of nodes. The beams are formed to ensure that during each beam period of each beam cycle, transmission beams and reception beams of all directional antennas of the entire network are spatially aligned. Additionally, the transmission beams formed during each beam cycle at each directional antenna are spatially distributed to cover a planar angle of $2\pi$ radians. Consequently, the reception beams formed during each beam cycle at each directional antenna are spatially distributed to cover a planar angle of $2\pi$ radians.

To realize spatial alignment of transmission beams of all directional antennas during a beam period, the N transmission beams are formed during each beam cycle to bear predefined angular displacements from a global reference direction which is acquired from an electronic compass. The transmission beam and reception beam formed during a beam period are of the same direction.

To enable temporal alignment of beam cycles at all directional antennas, each beam cycle starts at an instant of time determined from a global cyclic saw-tooth time indicator derived by recognizing onset of repetitive patterns of time indications acquired from a Global-Positioning-System receiver.

More specifically, one way to realize temporal alignment is to start beam cycles at instants of time determined as onset times of a repetitive pattern of time indications acquired from a Global-Positioning-System receiver. Within the duration of the repetitive pattern, multiple cyclic saw-tooth time indicators are generated. The starting times of the beam cycles are the starting times of the saw-tooth time indicators. The cyclic saw-tooth time indicators are generated by supplying time indications acquired from a Global-Positioning-System receiver to a frequency synthesizer. The output signal of the frequency synthesizer may be of the form of timing pulses, separated by equal time divisions, which trigger a cyclic counter of a period equal to a predefined beam-cycle duration. The process of timing the beam cycles is simplified by selecting the repetitive pattern to be a power of 2,
selecting each beam cycle to be a power of 2 of time divisions;
selecting the number N of beam periods per beam cycle to be a power of 2; and
selecting each beam period as $2^\alpha$ of time divisions, $\alpha \geq 0$;
determining a start time of each beam to correspond to a cyclic saw-tooth time indicator
where each of a least-significant bits is a zero.

Arbitrary Number of Beams Per Beam Cycle

Figure 22:
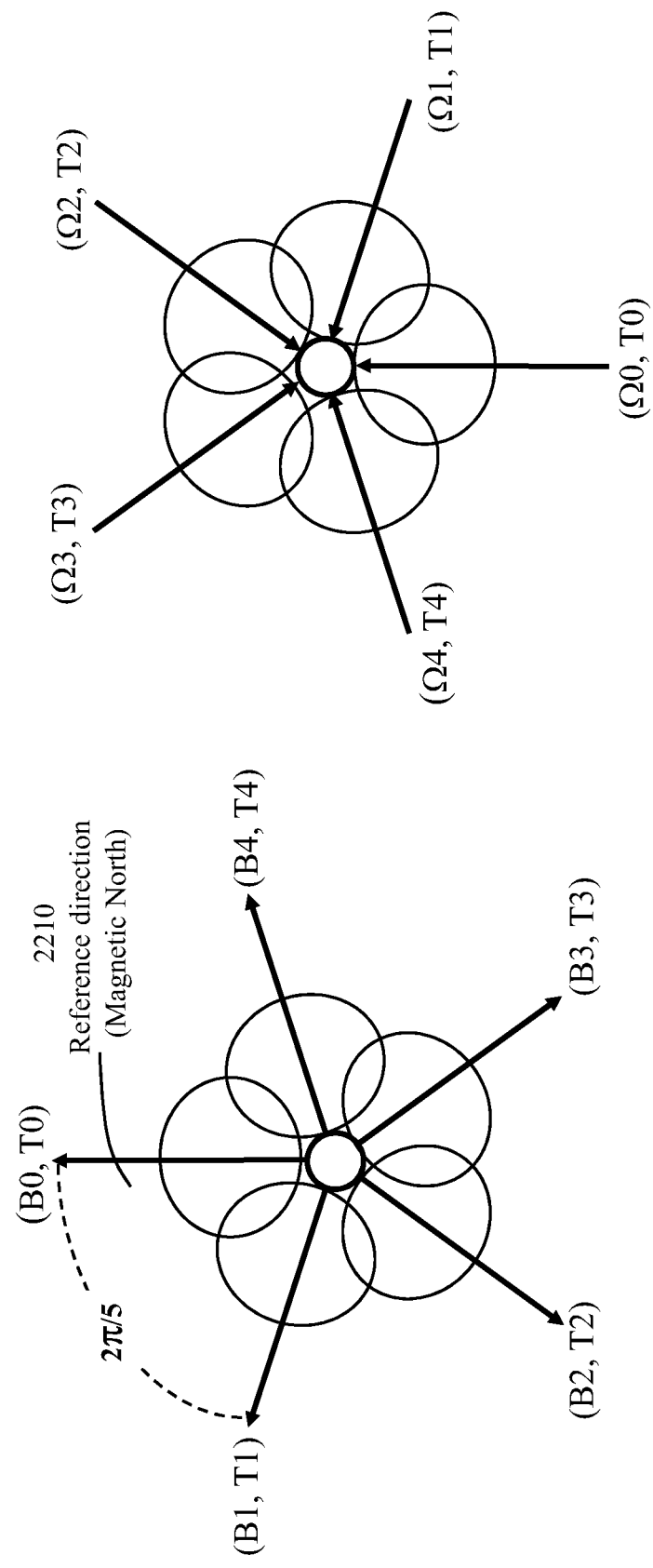
FIG. 22 illustrates exemplary transmission-beams orientation and reception-beams orientation for a beam cycle of five beams, in accordance with an embodiment of the present invention.

FIG. 22 illustrates an exemplary transmission beam orientation and reception beam orientation 2200 for a beam cycle of five beams. The transmission beams during beam periods T0, T1, T2, T3, and T4 are denoted B0, B1, B2, B3, and B4, respectively. Likewise, the corresponding reception beams are denoted Ω0, Ω1, Ω2, Ω3, and Ω4. The central direction of transmission beam B0 is aligned to Earth's Magnetic North as described earlier. The angular displacement of the central direction of a beam with respect to the angular displacement of an immediately preceding (or immediately succeeding) beam is $2\pi/5$. The beam width (of half-power boundaries) is selected to be slightly larger than $2\pi/5$ to ensure complete spatial coverage.

Figure 23:
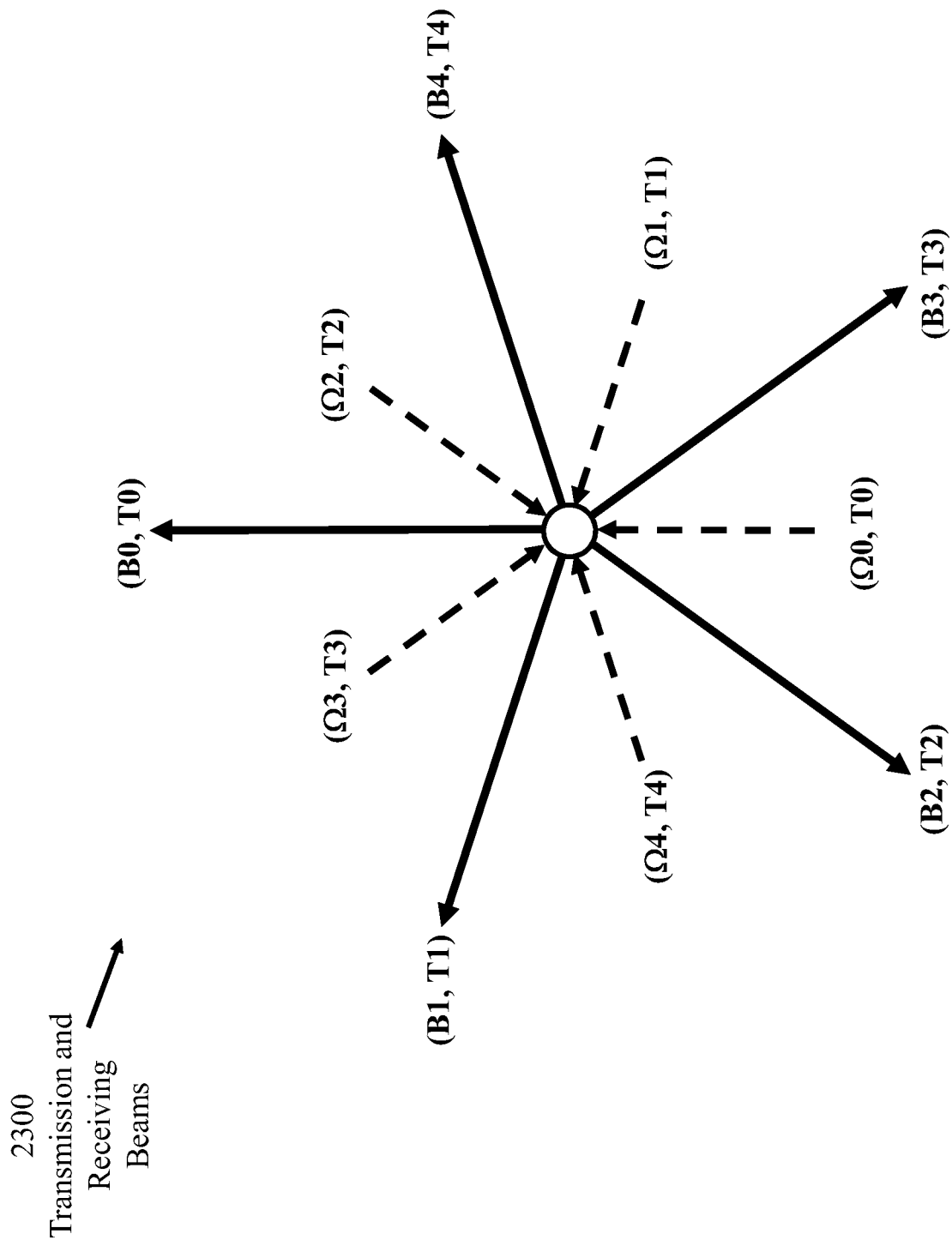
FIG. 23 illustrates relative orientations of the transmission and reception beams during the beam cycle of FIG. 22.

FIG. 23 illustrates the relative orientations 2300 of the transmission and reception beams during the beam cycle of FIG. 22. Because the number N of beams per beam cycle is an odd number, each of the dual beams starting with transmission beams B1, B2, B3, and B4 has a return path that differs from the forward path. The phased-array antenna may receive either of two neighboring beams. For example, the node may transmit using beam B1 and receive using beam Ω3 or beam Ω4.

Figure 24:
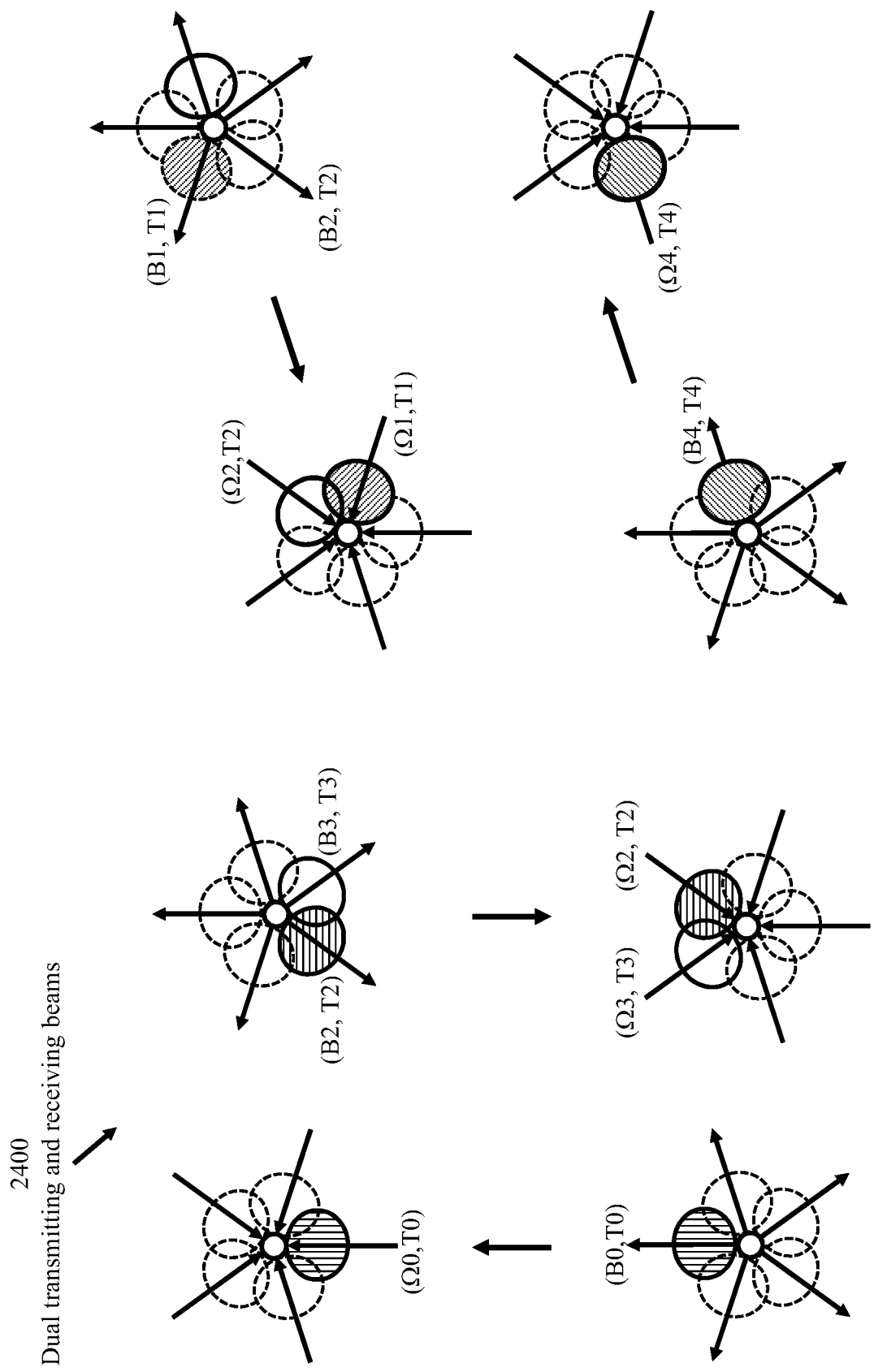
FIG. 24 further illustrates spatial and temporal alignment of selected beams of the beam cycle of FIG. 22.

FIG. 24 further illustrates spatial and temporal alignment 2400 of selected beams of the beam cycle of FIG. 22.

During beam period T0, the central directions of transmission beam B0 and reception beam Ω0 are directed along the global reference direction (Earth's Magnetic North). If a first node transmits to a second node using transmission beam B0, the second node may respond using either transmission beam B2 (to be received at the first node through reception beam Ω2) or transmission beam B3 (to be received at the first node through reception beam Ω3).

During beam period T4, the central directions of transmission beam B4 and reception beam Ω4 have an angular displacement of 8π/5 from the global reference direction. If a first node transmits to a second node using transmission beam B4, the second node may respond using either transmission beam B1 (to be received at the first node through reception beam Ω1) or transmission beam B2 (to be received at the first node through reception beam Ω2).

Figure 25:
FIG. 25 illustrates dual beams of the beam cycle of FIG. 22.

FIG. 25 illustrates dual beams 2500 of the beam cycle of FIG. 22. A dual beam constitutes a beam from a first node to a second node and a beam from the second node to the first node. A dual beam may be defined by a transmission beam and a reception beam starting from either the first node or the second node.

To ensure full spatial coverage of all transmission beams (hence all reception beams) formed at a directional antenna, the central direction of each transmission beam is selected to have an angular displacement of 2π/N radians from the central direction of each immediately neighboring beam and the beam width is determined to equal or exceed 2π/N radians.

Figure 26:
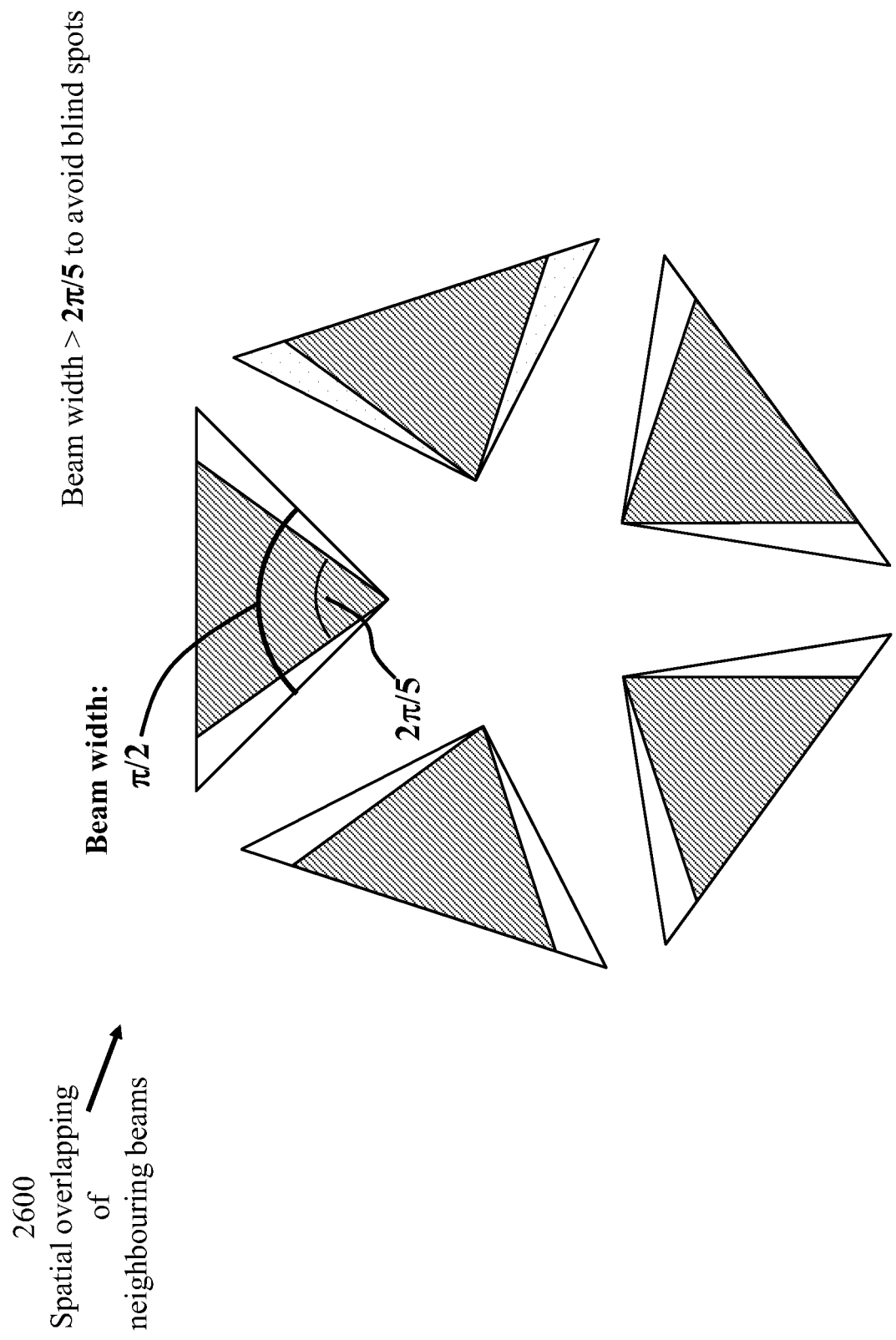
FIG. 26 illustrates requisite overlapping of neighbouring beams to avoid having uncovered directions, in accordance with an embodiment of the present invention.

FIG. 26 illustrates overlapping 2600 of neighbouring beams to preclude having uncovered directions. The half-power beam width is selected as π/2 instead of 2π/5.

Figure 27:
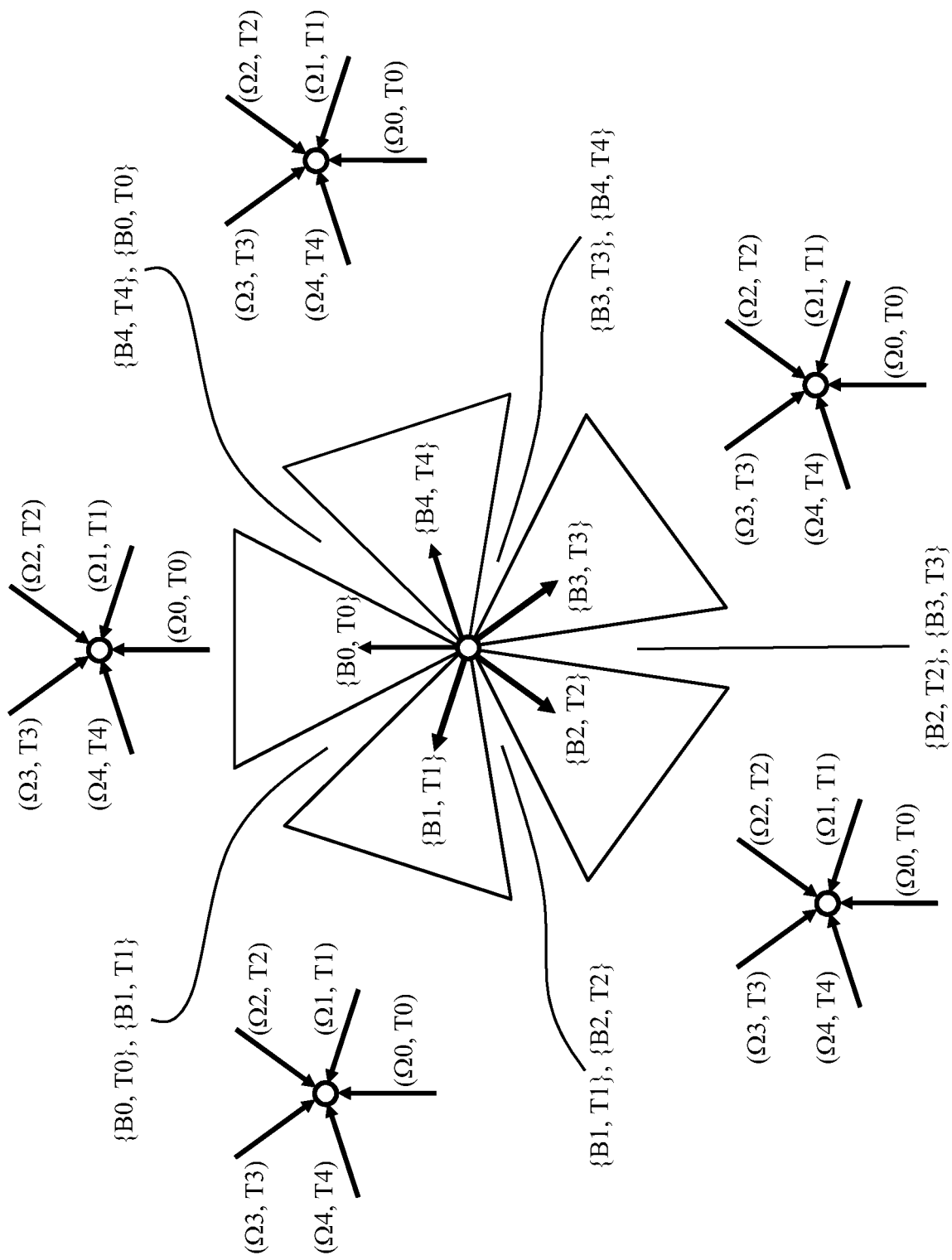
FIG. 27 illustrates spatial-temporal alignment of transmission beams of a transmitting node and reception beams of five receiving nodes of a first spatial distribution with respect to the transmitting node.

FIG. 27 illustrates spatial-temporal alignment of transmission beams of a transmitting node and reception beams of five receiving nodes where the spatial direction of each receiving node with respect to the transmitting node is close to the central direction of a respective beam.

Thus, each receiving node may detect only one transmission beam.

Figure 28:
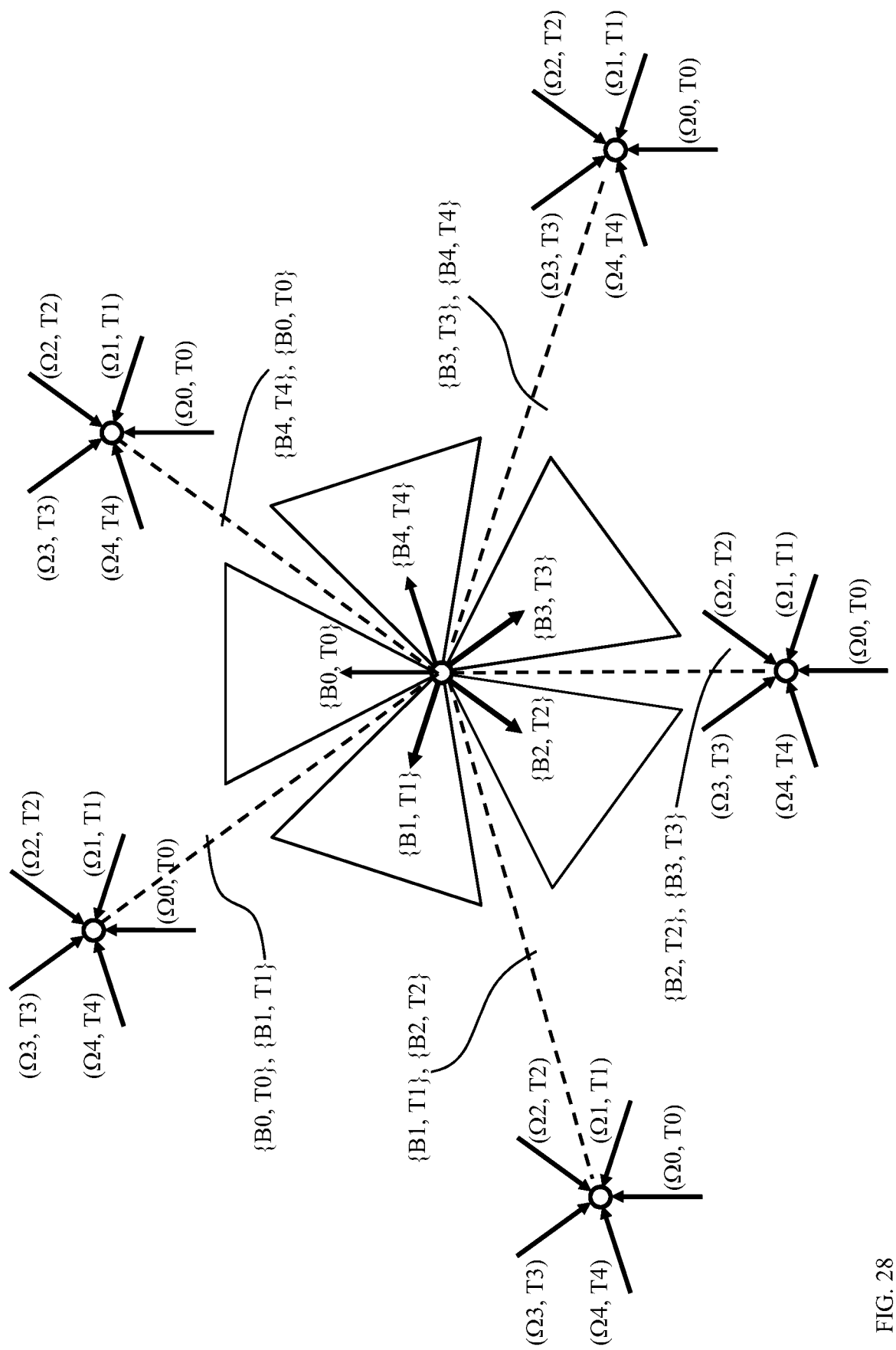
FIG. 28 illustrates spatial-temporal alignment of transmission beams of a transmitting node and reception beams of five receiving nodes of a second spatial distribution with respect to the transmitting node.

FIG. 28 illustrates spatial-temporal alignment of transmission beams of a transmitting node and reception beams of five receiving nodes where the spatial direction of each receiving node with respect to the transmitting node is within an overlap of two beams. Thus, each receiving node may detect two transmission beams.

Figure 29:
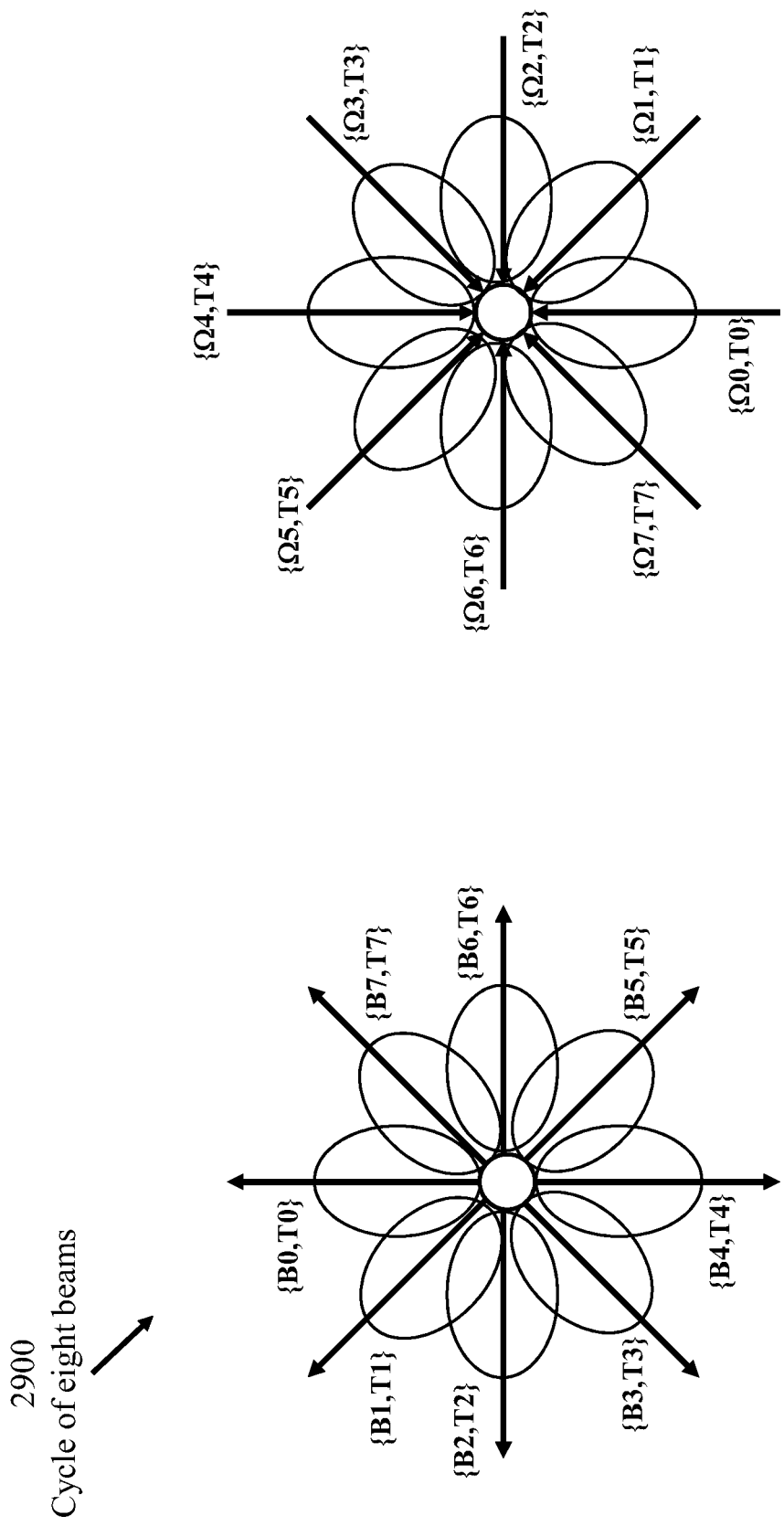
FIG. 29 illustrates exemplary transmission beam orientations and reception beam orientations for a beam cycle of eight beams.

FIG. 29 illustrates an exemplary transmission beam orientation and reception orientation 2900 for a beam cycle of eight beams. During beam periods T0, T1, ..., T7 of a beam cycle a node may form eight transmission beams B0, B1, ..., B7 and receive through eight reception beams Ω0, Ω1, ..., Ω7.

For the beam orientation of FIG. 29, the eight dual beams at a given node 120 (or 140) are:
transmission beam B0 and reception beam Ω4 radiating during beam periods T0 and T4;
transmission beam B1 and reception beam Ω5 radiating during beam periods T1 and T5;
transmission beam B2 and reception beam Ω6 radiating during beam periods T2 and T6;
transmission beam B3 and reception beam Ω7 radiating during beam periods T3 and T7;
transmission beam B4 and reception beam Ω0 radiating during beam periods T4 and T0;
transmission beam B5 and reception beam Ω1 radiating during beam periods T5 and T1;
transmission beam B6 and reception beam Ω2 radiating during beam periods T6 and T2; and
transmission beam B7 and reception beam Ω3 radiating during beam periods T7 and T3.

Figure 30:
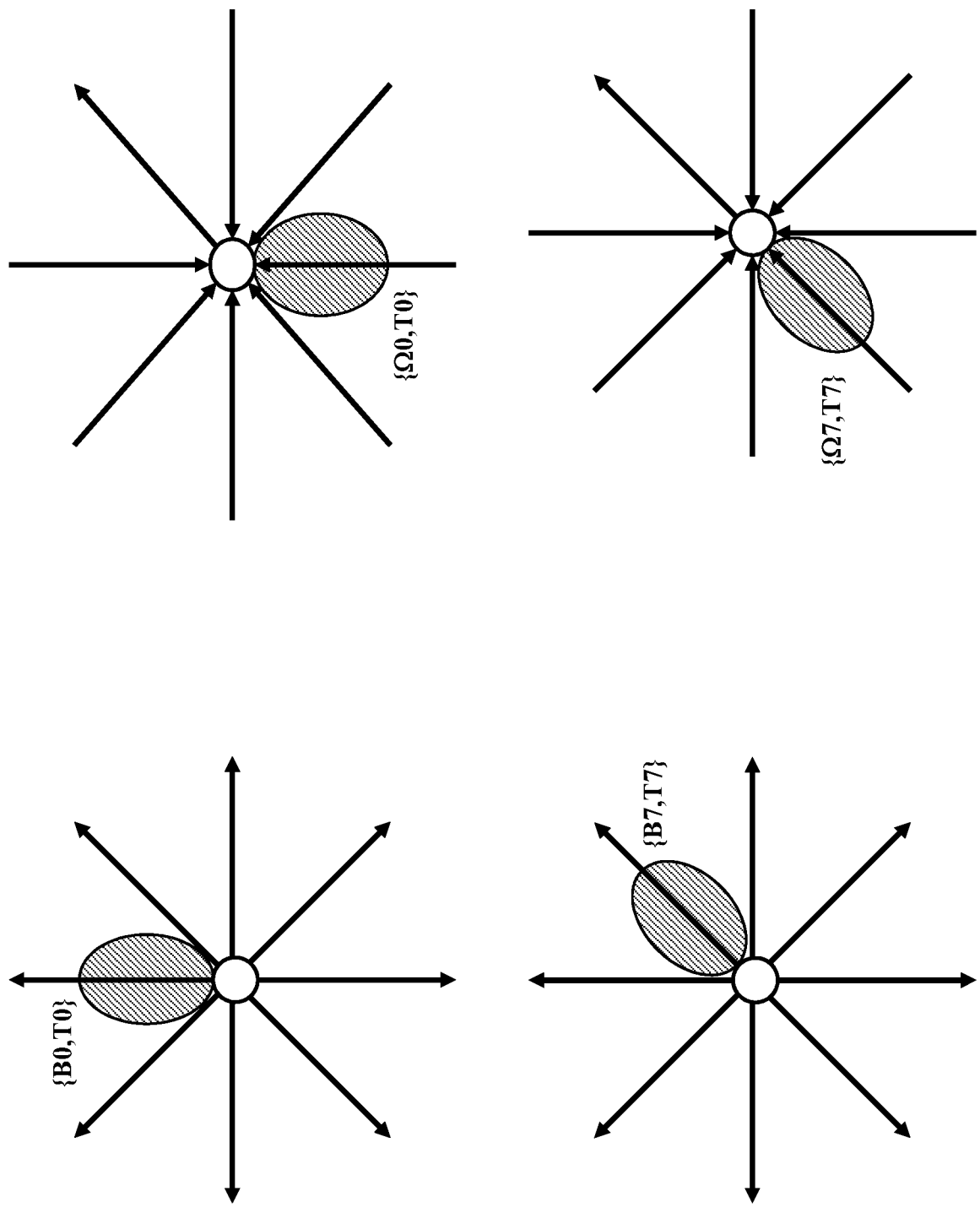
FIG. 30 illustrates spatial and temporal alignment of selected beams of the beam cycle of FIG. 29, in accordance with an embodiment of the present invention.

FIG. 30 illustrates spatial and temporal alignment of selected beams of the beam cycle of FIG. 29.

During beam period T0, the central directions of transmission beam B0 and reception beam Ω0 are directed along the global reference direction (Earth's Magnetic North). If a first node transmits to a second node using transmission beam B0, the second node may respond using its transmission beam B4 (to be received at the first node through reception beam Ω4).

During beam period T7, the central directions of transmission beam B7 and reception beam Ω7 have an angular displacement of 7π/4 from the global reference direction. If a first node transmits to a second node using transmission beam B7, the second node may respond using its transmission beam B3 (to be received at the first node through reception beam Ω3).

Figure 31:
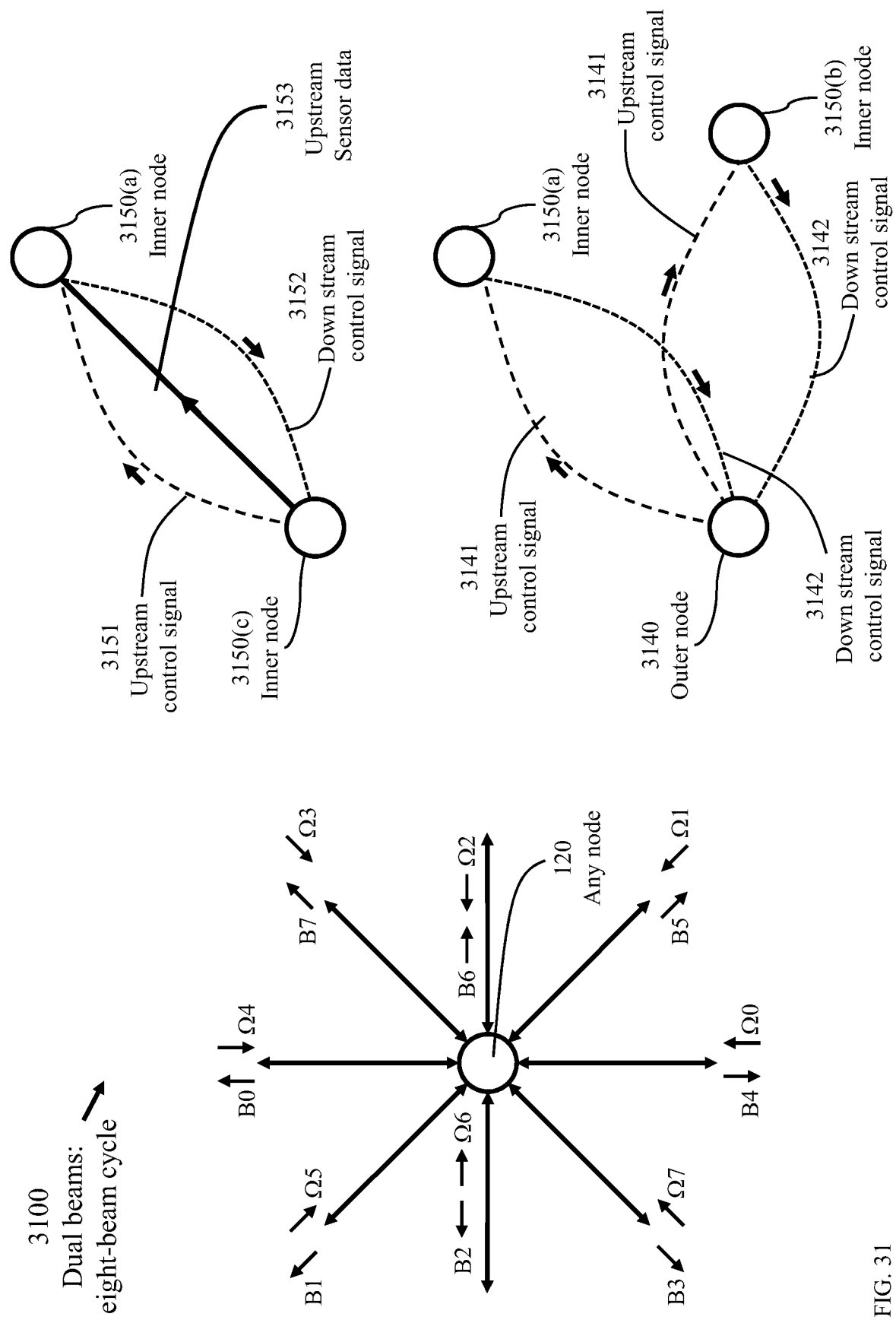
FIG. 31 illustrates dual beams carrying upstream and downstream control signals and upstream sensor data corresponding to the beam cycle of FIG. 29, in accordance with an embodiment of the present invention.

FIG. 31 illustrates dual beams 3100 carrying upstream and downstream control signals and upstream sensor data corresponding to the beam cycle of FIG. 29. The term "upstream" is used herein to denote a direction towards the collector and the term "downstream" denotes an opposite direction of an upstream direction. As defined above, a dual beam constitutes a beam from a first node to a second node and a beam from the second node to the first node. The upstream beam and downstream beam of a dual beam are transmitted during different beam periods.

An upstream beam originating at an outer node carries control signals to an inner node and a downstream beam directed to the outer node carries downstream control signals which may originate at an inner node or originate at the collector node. As illustrated, an outer node 3140 (one of nodes 120) sends an upstream control signal 3141(a) and an upstream control signal 3141(b) to inner nodes 3150(a) and 3150(b), respectively, and receives downstream control signal 3142(a) and 3142(b) from inner nodes 3150(a) and 3150(b), respectively. Inner nodes 3150(a) and 3150(b) are selected nodes of the plurality of nodes 120. An upstream control signal from an outer node may be a connection request, acceptance of an invitation from an inner node, or declining an invitation from an inner node. A downstream control signal to an outer node may be an invitation from an inner node, characterizing information of an inviting inner node, or a node identifier assigned to the outer node An upstream beam originating from an inner node 3150 (c) carries both control signals 3151 to inner node 3150(a), which may be forwarded towards the collector 140, and aggregate sensor data 3153 generated locally from a node's sensor or forwarded from subordinate inner nodes. Inner node 3150(a) is one of nodes 120. The aggregate sensor data is forwarded towards the collector 140. The downstream beam carries downstream control signals 3152 which may originate at inner node 3150(a) or originate from the collector 140. Thus, inner node 3150(c) sends an upstream control signal 3151 and upstream sensor data 3153 to inner node 3150(a) and receives downstream control signal 3152 from inner node 3150(a).

Figure 32:
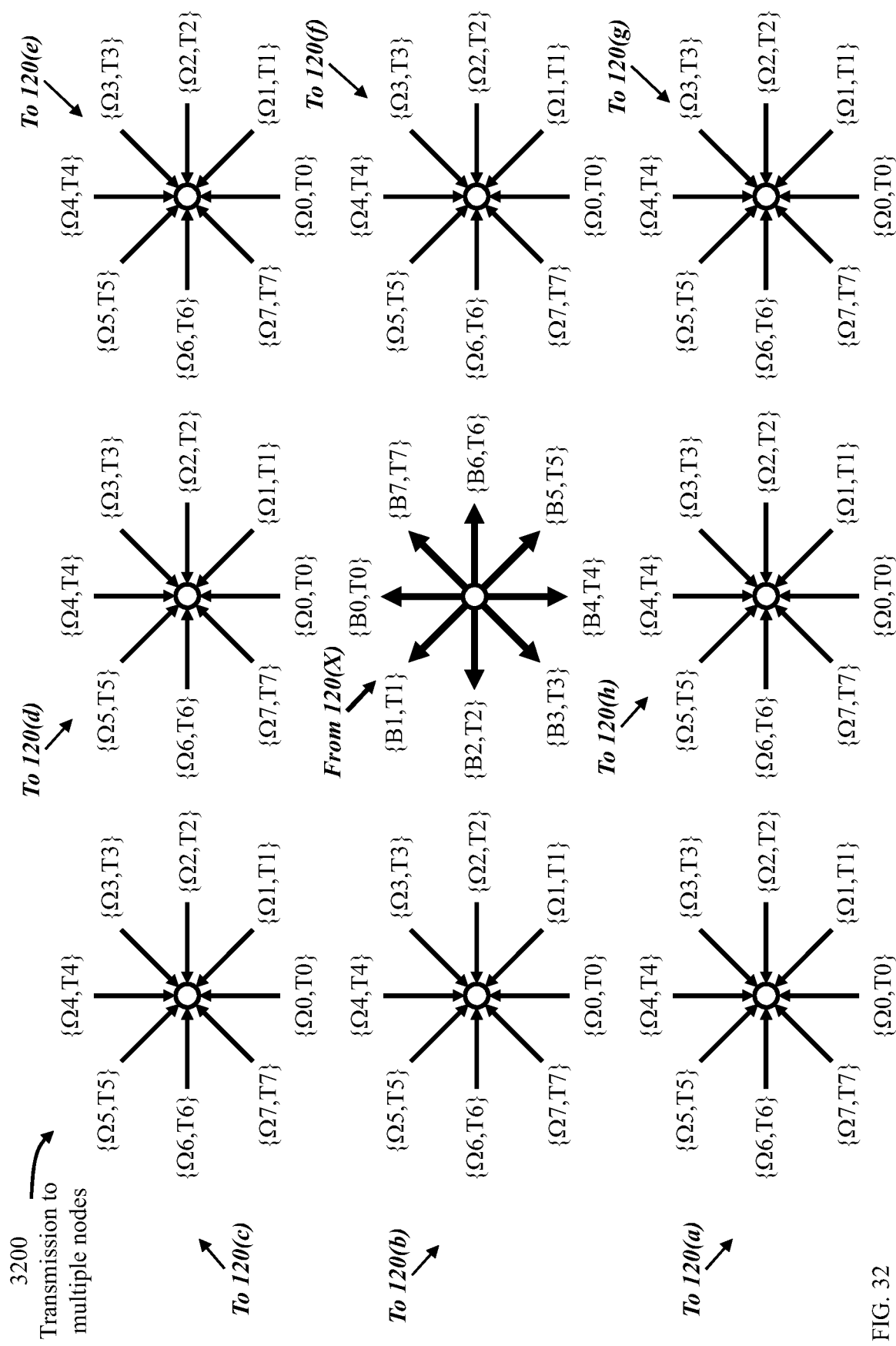
FIG. 32 illustrates spatial-temporal alignment of transmission beams of a specific node and reception beams of eight neighboring nodes, in accordance with an embodiment of the present invention.

FIG. 32 illustrates spatial-temporal alignment 3200 of transmission beams of a transmitting node and reception beams of eight receiving nodes. During beam-periods T0, T1, ..., T7 of a beam cycle, a node 120(X) may activate eight transmission beams B0, B1, ..., B7 having central directions of angular displacements 0, π/4, π/2, 3π/4, π, 5π/4, 3π/2, 7π/4, with respect to the global direction. A neighboring node may acquire a beam according to the relative position with respect to the transmitting node 120 (X). For example:
node 120(a) may detect beam B3 during beam-period T3 of a beam cycle;
node 120(b) may detect beam B2 during beam-period T2;
node 120(c) may detect beam B1 during beam-period T1;
node 120(d) may detect beam B0 during beam-period T0;
node 120(e) may detect beam B7 during beam-period T7;
node 120(f) may detect beam B6 during beam-period T6;

node 120(*g*) may detect beam B5 during beam-period T5; and node 120(*h*) may detect beam B4 during beam-period T4.

Figure 33:
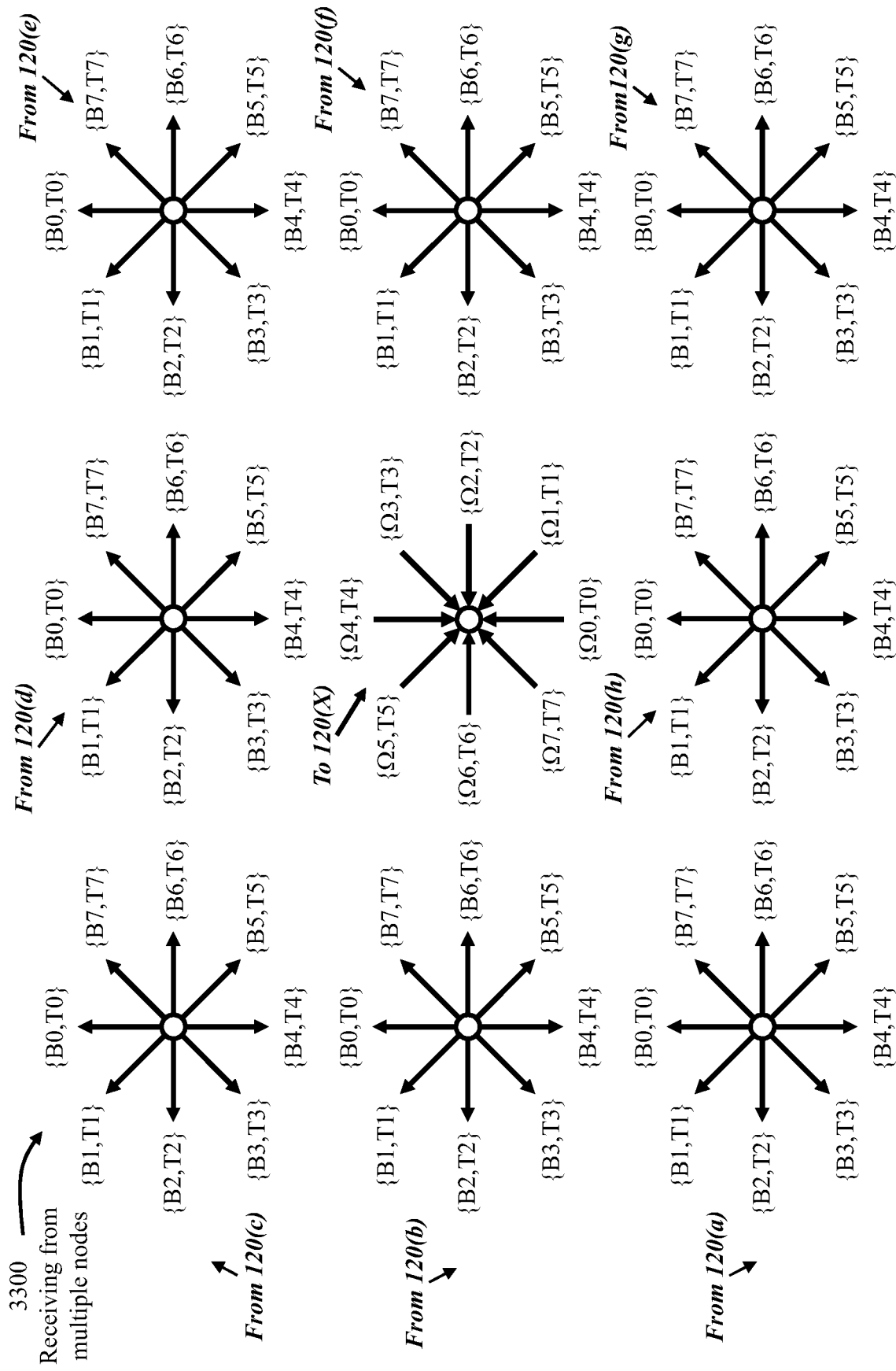
FIG. 33 illustrates spatial-temporal alignment of reception beams at a specific node and transmission beams of eight neighboring nodes, in accordance with an embodiment of the present invention.

FIG. 33 illustrates spatial-temporal alignment 3300 of reception beams at node 120(X) and transmission beams of neighboring nodes 120(*a*) to 120(*h*). Node 120(X) may acquire beams transmitted from neighbouring nodes as follow:

beam B7 transmitted from node 120(*a*) during beam-period T7 of a beam cycle;

beam B6 transmitted from node 120(*b*) during beam-period T6;

beam B5 transmitted from node 120(*c*) during beam-period T5;

beam B4 transmitted from node 120(*d*) during beam-period T4;

beam B3 transmitted from node 120(*e*) during beam-period T3;

beam B2 transmitted from node 120(*f*) during beam-period T2;

beam B1 transmitted from node 120(*g*) during beam-period T1; and beam B0 transmitted from node 120(*h*) during beam-period T0.

Thus, round-trip communications initiated from node 120(X) to nodes 120(*a*), 120(*b*), 120(*c*), 120(*d*), 120(*e*), 120(*f*), 120(*g*), and 120(*h*) are effected using dual beams {B3, $\Omega$7}, {B2, $\Omega$6}, {B1, $\Omega$5}, {B0, $\Omega$4}, {B7, $\Omega$3}, {B6, $\Omega$2}, {B5, $\Omega$1}, and {B4, $\Omega$0} of node 120(X), respectively.

Round-trip communications initiated from nodes 120(*a*), 120(*b*), 120(*c*), 120(*d*), 120(*e*), 120(*f*), 120(*g*), and 120(*h*) to node 120(X) are effected using dual beams {B7, $\Omega$3}, {B6, $\Omega$2}, {B5, $\Omega$1}, {B4, $\Omega$0}, {B3, $\Omega$7}, {B2, $\Omega$6}, {B1, $\Omega$5}, and {B0, $\Omega$4}, respectively, of the initiating nodes.

Figure 34:
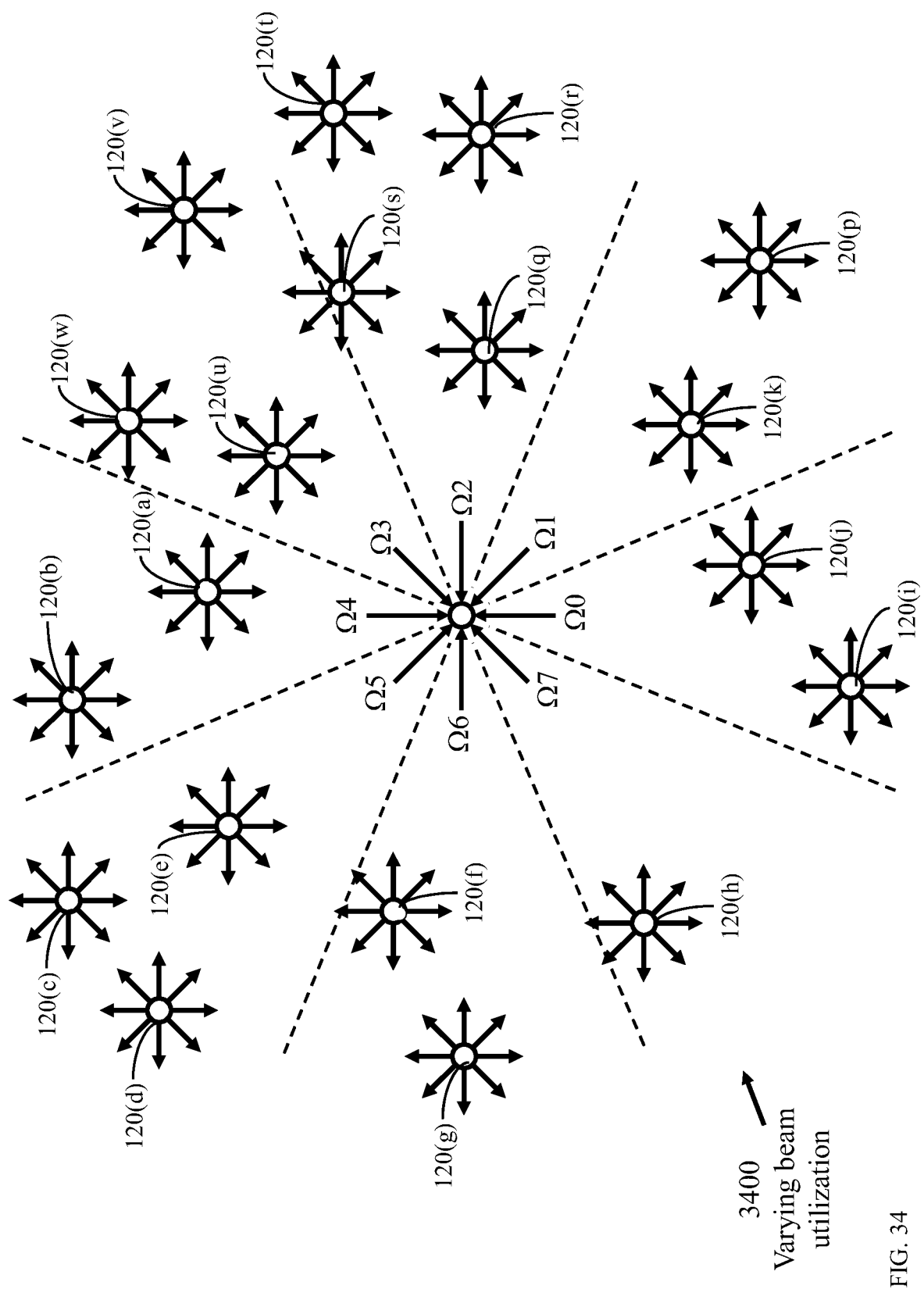
FIG. 34 illustrates multiple nodes sharing a common transmission or reception beam within the beam cycle of FIG. 29.

FIG. 34 illustrates varying beam utilization 3400 where multiple nodes share a common transmission or reception beam within the beam cycle of FIG. 29. The reception beams $\Omega$0, $\Omega$1, ..., $\Omega$7 at a node 120(X) carry control signals as well as sensor data generated at other nodes 120(*a*) to 120(*k*), and 120(*p*) to 120(*w*). Reception beam $\Omega$7 carries signals from one node while reception beam $\Omega$2 carries signals from four nodes. The beams' loads may be balanced during network formation so that an outer node that has an invitation from more than one inner node may select the invitation according to the topological radii and/or current upstream utilization measures of the inviting inner nodes.

Figure 35:
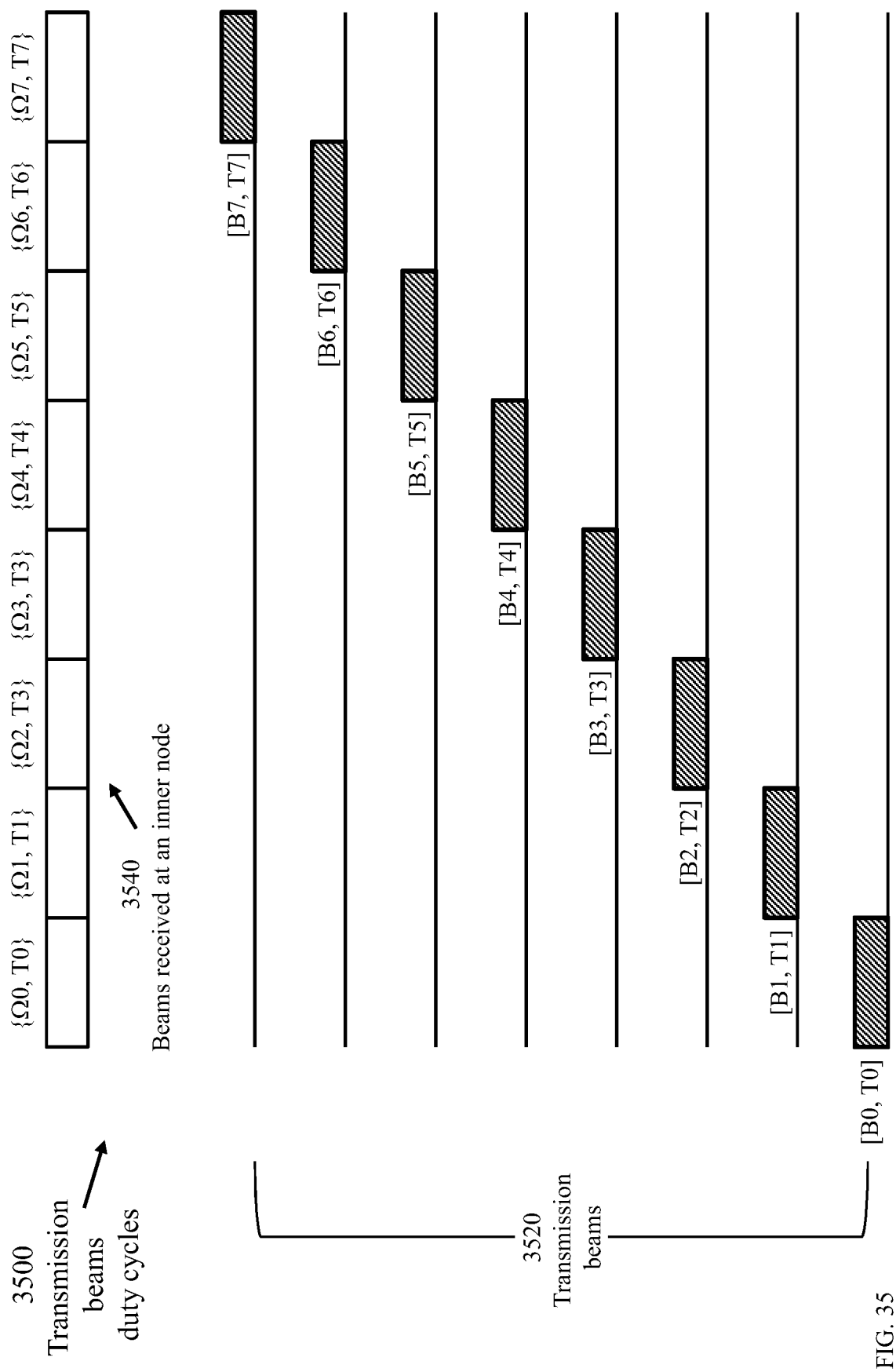
FIG. 35 illustrates transmission duty cycles during the beam cycle of FIG. 29.

FIG. 35 illustrates transmission duty cycles 3500 during the beam cycle of FIG. 29.

Figure 36:
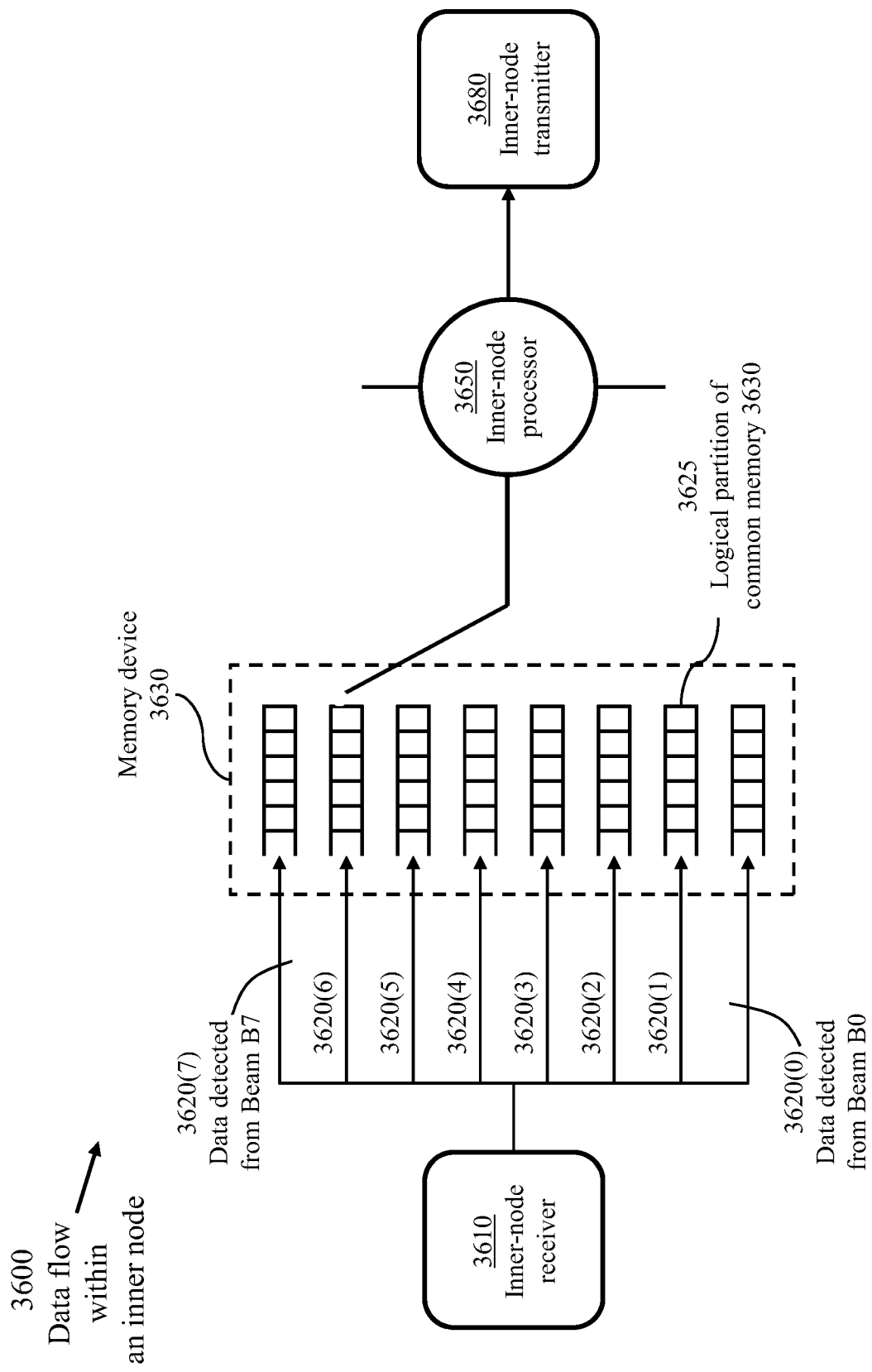
FIG. 36 illustrates control data and sensor data organization within an inner node, in accordance with an embodiment of the present invention.

FIG. 36 illustrates data flow 3600 within an inner node indicating organization of buffered control data and sensor data within the inner node. Data may be detected at inner-node receiver 3610 from incoming beams. An inner node may receive control signals and sensor data through multiple reception beams. Some control signals terminate at the inner node while the sensor data and the remaining control signals may be forwarded towards the controller 140. Data 3620(*j*) detected from a beam $\Omega$j, $0 \leq j < N$, N=8, is held in a respective buffer 3625. Buffers 3625 may be separate devices or partitions of a memory device 3630. Inner-node processor 3650 processes the buffered data and supplies aggregate data to inner-node transmitter 3680. At the transmitter 3680, the aggregate data modulate a selected transmission beam directed to a respective destination.

Thus, the invention provides a system for wireless communication. The system comprises a plurality of nodes with each node comprising (1) a plurality of antenna elements, (2) a plurality of phase shifters, (3) an electronic compass, (4) a GPS (Global Positioning System) receiver, (5) a reference-time circuit, (6) a beam-orientation circuit, (7) a phased-array controller, (8) a node transmitter, (9) a node receiver, and (10) a node controller.

Each phase shifter is coupled to an antenna element. The electronic compass determines node orientation as an angular displacement of a node reference direction from Earth's magnetic north. The reference time circuit generates periodic sawtooth signals defining beam cycles aligned according to pivotal reference time indications acquired from a Global-Positioning-System receiver. The beam-orientation circuit determines phase-shift values supplied to the plurality of phase shifters according to the node orientation and requisite beam directions. The phased-array controller cyclically updates the phase-shift values during each beam period of a beam cycle comprising N beam periods, N>1. The node controller comprises a hardware processor and a memory device storing computer-executable instructions causing the processor to simultaneously activate the phased-array controller, the node transmitter, and the node receiver.

Figure 37:
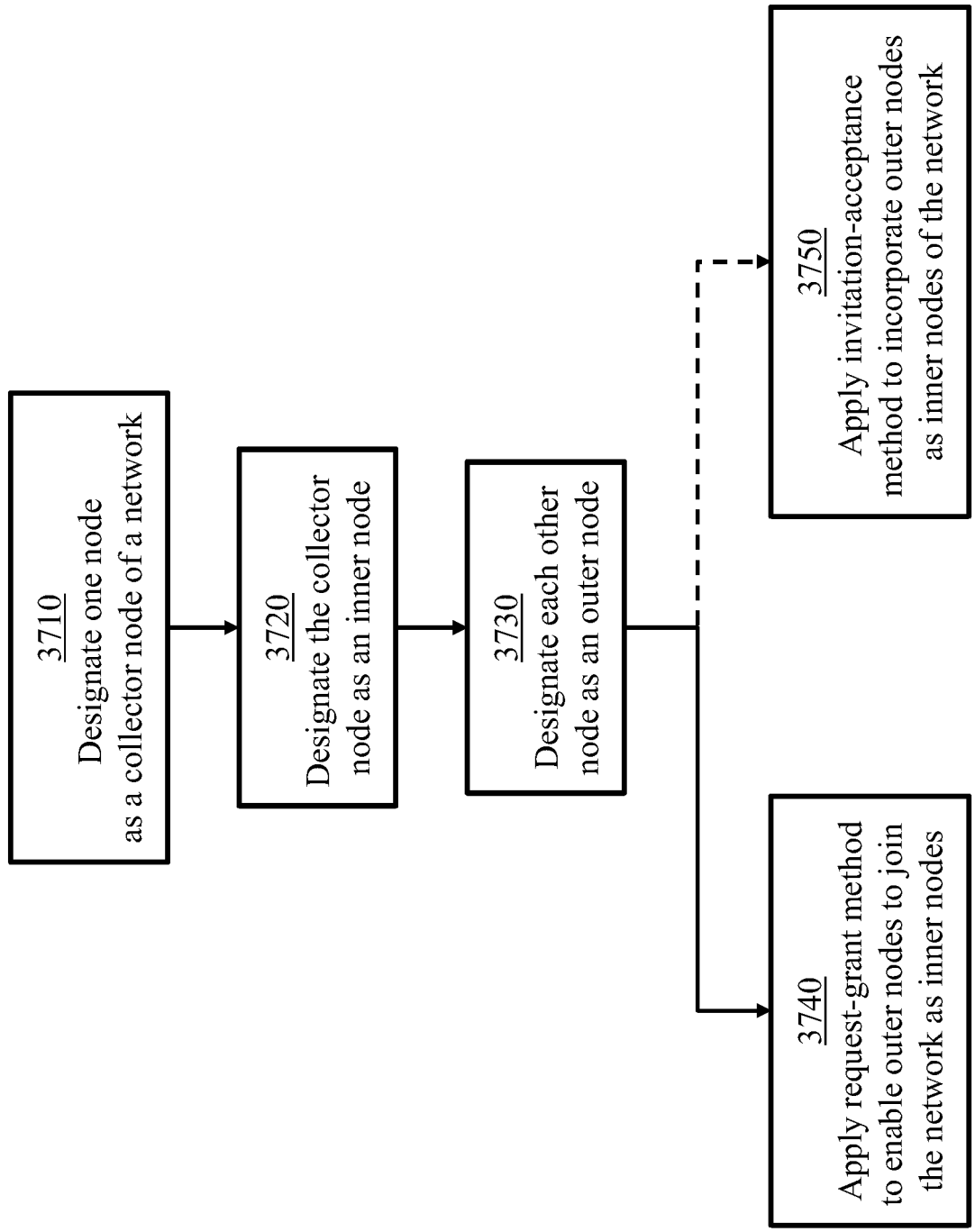
FIG. 37 illustrates two sensor-network formation methods, one based on request-grant processes and the other based on invitation-acceptance processes, in accordance with an embodiment of the present invention.

FIG. 37 illustrates sensor-network formation. To start, one of the nodes (node 140 of FIG. 1) is designated as a collector node (process 3710). The selection of a collector node may be influenced by physical or administrative considerations. The collector node is designated as an inner node (process 3720) while each other node is designated as an outer node (process 3730). The designation of a node as an outer node or an inner node is included in the node-characterization data 370 of the node. The objective of the network-formation procedure is to transform each outer node to an inner node. Network formation may be realized using either a request-grant method 3740 or an invitation-acceptance method 3750. Implementation of the two methods will be described below.

Figure 39:
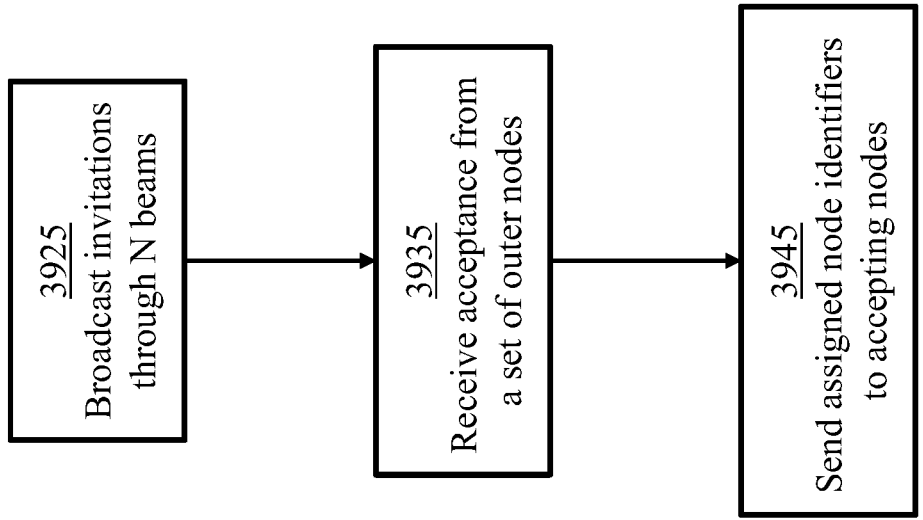
FIG. 39 illustrates processes performed at the collector node according to the request-grant method and processes performed at the collector node according to the invitation-acceptance method, in accordance with an embodiment of the present invention.
Figure 39:
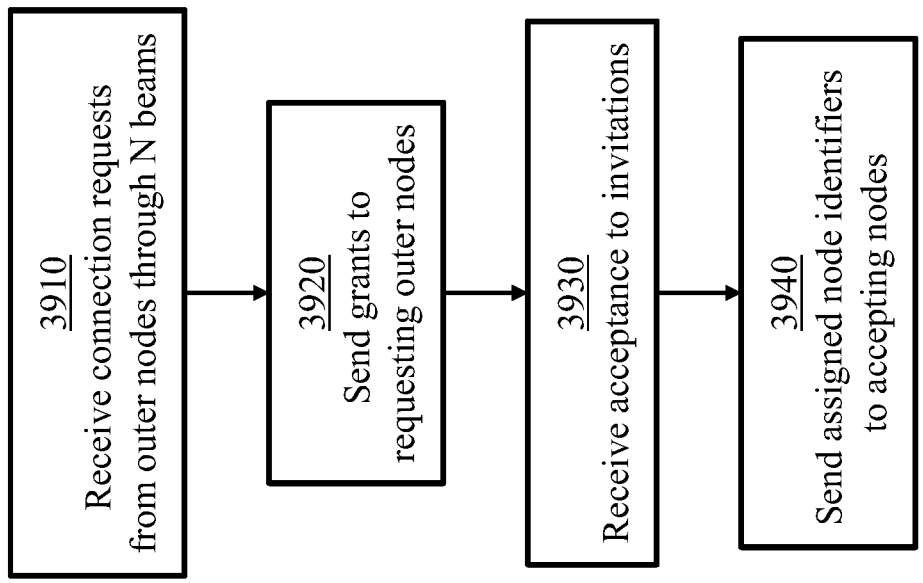
Figure 40:
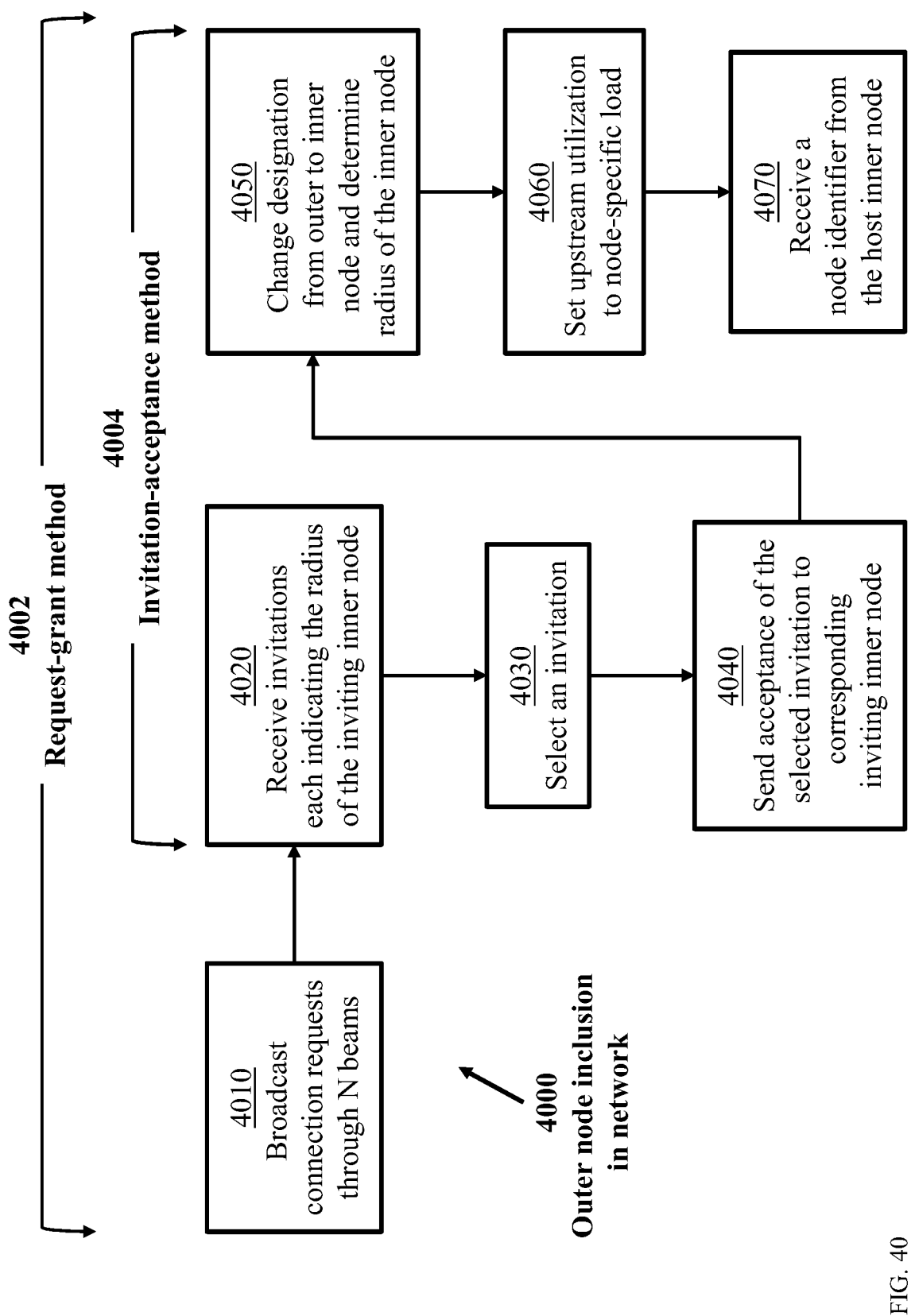
FIG. 40 illustrates processes performed at an outer node according to the request-grant method and processes performed at an outer node according to the invitation-acceptance method, in accordance with an embodiment of the present invention.
Figure 41:
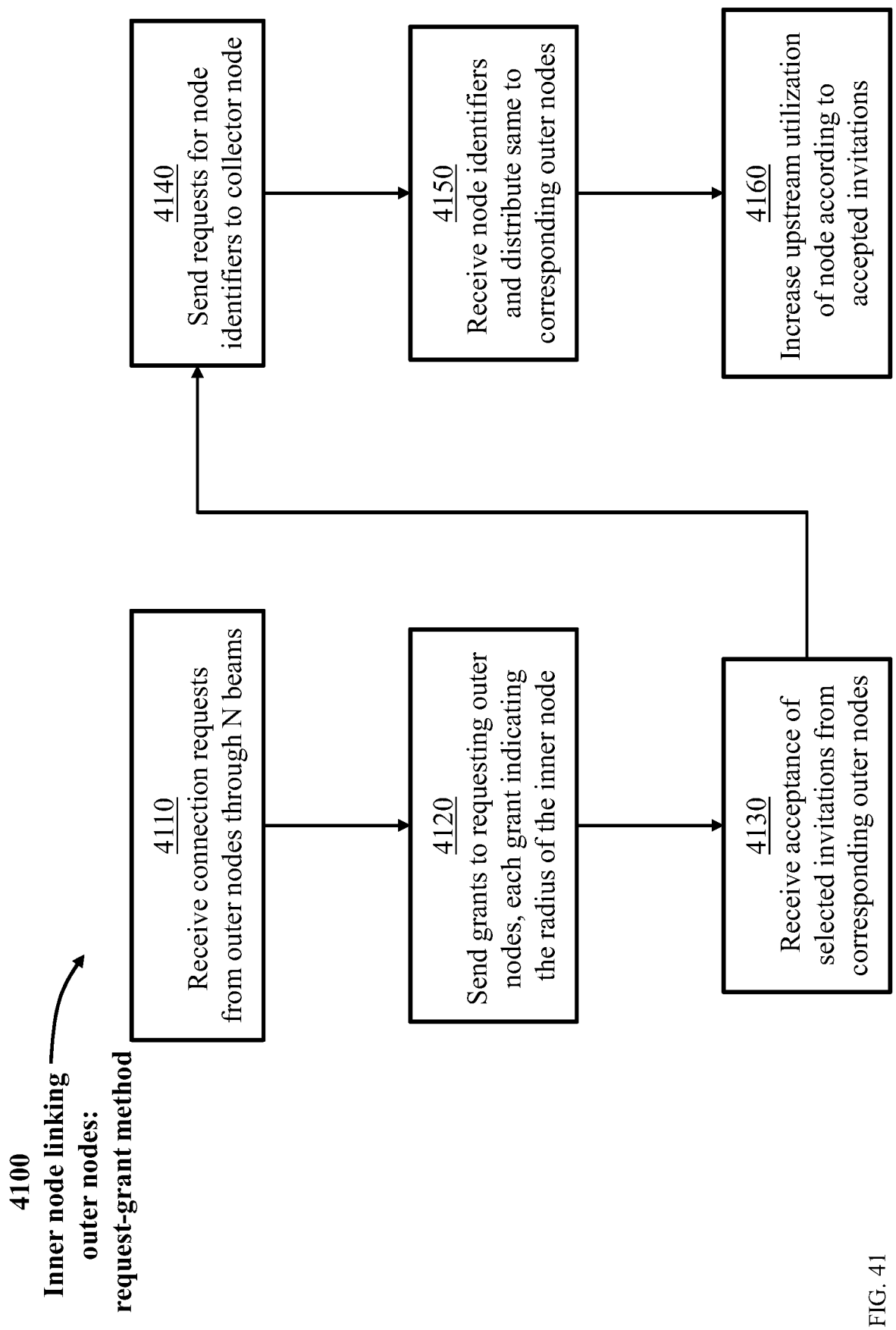
FIG. 41 illustrates processes performed at an inner node, other than the collector node, according to the request-grant method, in accordance with an embodiment of the present invention.

The request-grant method 3740 comprises implementing:
collector-node processes 3910, 3920, 3930, and 3940 of FIG. 39;
outer-node processes 4010 to 4070 of FIG. 40; and
inner-node processes 4110 to 4160 of FIG. 41.

Figure 42:
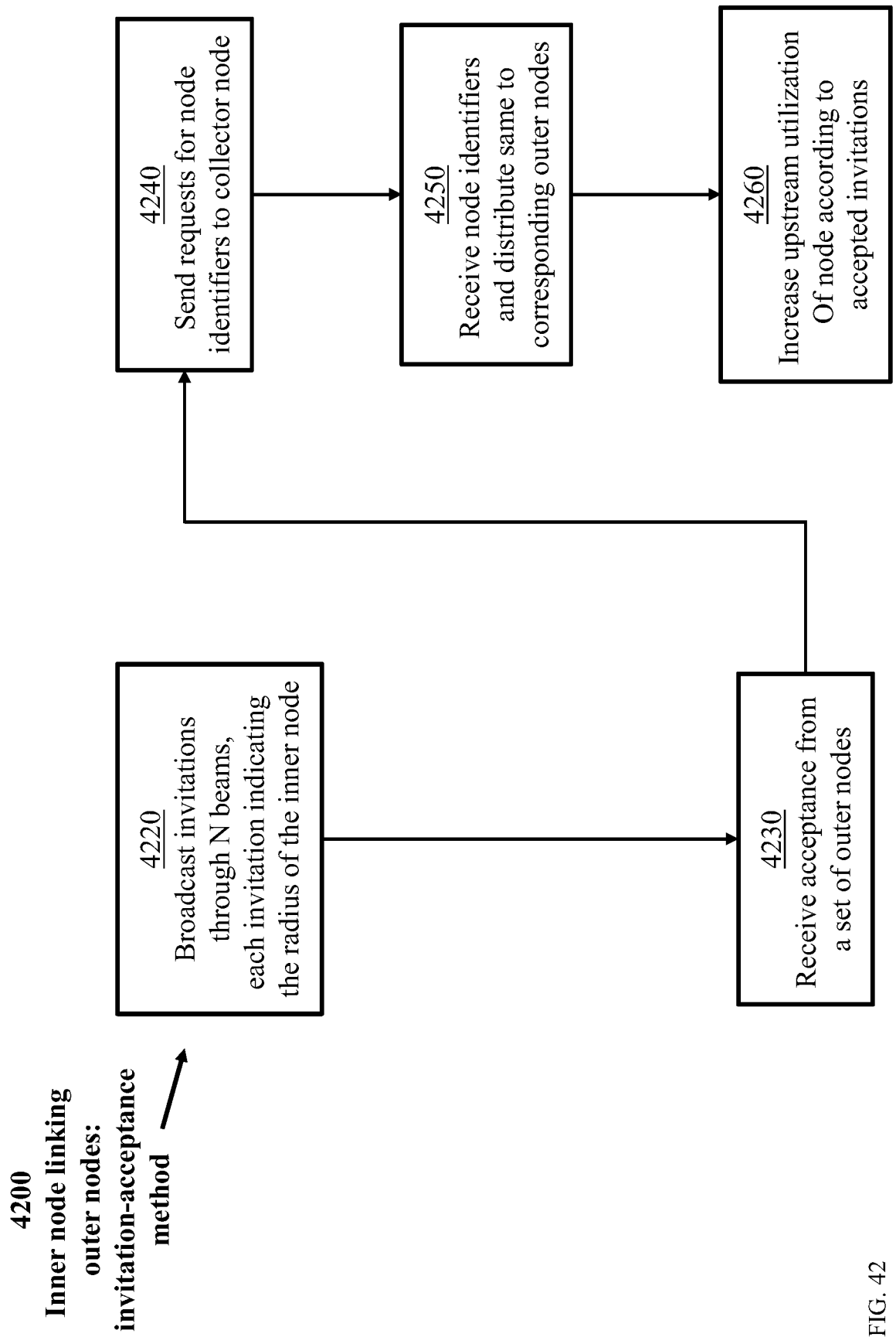
FIG. 42 illustrates processes performed at an inner node, other than the collector node, according to the invitation-acceptance method, in accordance with an embodiment of the present invention.

The invitation-acceptance method 3750 comprises implementing:
collector-node processes 3925, 3935, and 3945 of FIG. 39;
outer-node processes 4020 to 4070 of FIG. 40; and
inner-node processes 4220 to 4260 of FIG. 42.

Figure 38:
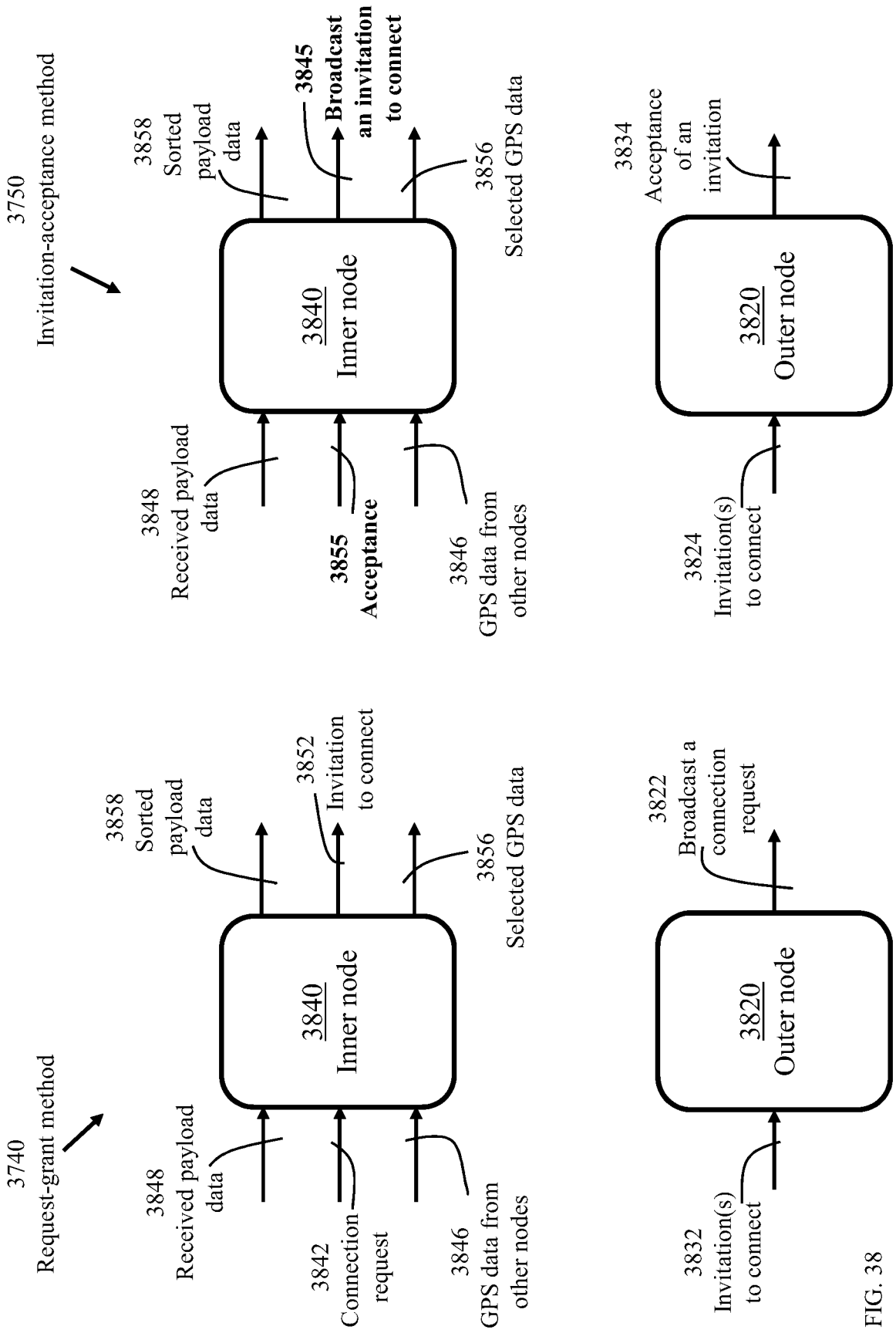
FIG. 38 illustrates inputs and outputs of an outer node, vying to join a sensor network, and an inner node, which has already joined the network.

FIG. 38 illustrates inputs and outputs of an outer node 3820 (one of nodes 120), vying to join a sensor network, and an inner node 3840 (one of nodes 120), which has already joined the network. According to the request-grant method, outer node 3720 may transmit a connection request 3822 and receive invitation 3832. According to the invitation-acceptance method, outer node 3820 may receive multiple invitations 3824 and transmit an acceptance 3834 of one of the invitations.

According to the request-grant method, inner node 3840 may receive a connection request 3842 from an outer node and transmit an invitation 3852. According to the invitation-acceptance method, inner node 3840 may broadcast an invitation 3845 and receive an indication of acceptance from an outer node (or multiple indications of acceptance if several outer nodes are within reach). For both of network-formation methods, an inner node receives sensor data (payload data) 3848 and transmits sorted payload data 3858 as illustrated in FIG. 36. Regardless of the network-formation method used, the inner node 3840 may also receive GPS latitude-longitude data 3846 from joining outer nodes and relay selected latitude-longitude data 3856 to the collector 140 directly or through other inner nodes).

FIG. 39 illustrates processes performed at the collector node according to the request-grant method 3740 and processes performed at the collector node according to the invitation-acceptance method 3750.

According to the request-grant method, the collector node receives connection requests (process 3910) from outer nodes through any of the N reception beams. In response, the collector node may send grants (process 3920) to requesting outer nodes. The transmission beam from the collector node to a requesting node is selected according to the identity of the reception beam at the collector node which carried the request. For each grant, if any, the collector node may receive an acceptance or a rejection. If a response from an invited outer node is not received within a predefined period of time, the invited outer node is considered to have declined. Upon receiving an acceptance from an outer node, the collector assigns a node identifier to the outer node (process 3940) and communicates the node identifier to the outer node (which is now upgraded to an inner node).

According to the invitation-acceptance method, the collector node broadcasts invitations (process 3925) through the N transmission beams. The collector node may receive (process 3935) acceptance from a set of outer nodes. Upon receiving an acceptance from an outer node, the collector assigns, and communicates, a node identifier to the outer node (process 3945).

FIG. 40 illustrates processes 4000 performed at an outer node. Process 4010 applies to the request-grant method. Processes 4020 to 4070 apply to both the request-grant method and the invitation-acceptance method.

According to the request-grant method, an outer node broadcasts (process 4010) connection requests through N transmission beams. Subsequently, the outer node may receive (process 4020) invitations from inner nodes (which may include the collector node). An invitation indicates the topological radius of the inviting inner node, and—as will be described below—the upstream utilization of the inviting node. The topological radius of an inner node is the number of concatenated links connecting the inner node to the collector. Naturally, the radius of the collector node is zero. The outer node selects (process 4030) one of the invitations and declines the rest (if any). The outer node sends (process 4040) an acceptance to the inner node that sent the selected invitation. The outer node may send explicit declinations or simply rely on expiry time of an invitation. The selection of an invitation may be determined according to a single criterion, multiple criteria, or a composite criterion. The most relevant criterion is the radius of the inviting inner node.

Upon establishing a connection to the selected inner node, the outer node changes its status (process 4050) to an inner node and sets its upstream utilization to 1.0 (process 4060); the utilization of an inner node is the number of inner nodes contributing to the data flow along the transmission beam directed to the collector or to another inner node en route to the collector. The newly transformed inner node then receives a node identifier from the collector (process 4070) as described above with reference to process 3940 or process 3945.

Processes 4020 to 4070 also correspond to the invitation-acceptance method. Process 4010 is not needed if the invitation-acceptance method is implemented since the collector and each other inner node broadcast invitations (process 3925 and process 4220).

FIG. 41 illustrates processes 4100 performed at an inner node, other than the collector node, according to the request-grant method. An inner node may receive (process 4110) connection requests from outer nodes through N reception beams. The inner node may then send (process 4120) grants to requesting outer node, each grant indicating the radius of the inner node and upstream-utilization information. The inner node may receive (process 4130) acceptance of some or all of the invitations. The inner node then sends a request to the collector node to provide a node identifier for each of the outer nodes that accepted a respective invitation. The inner node receives (process 4150) the requested node identifiers and distribute them to respective outer nodes, which have now updated their status to "inner nodes". The upstream utilization of the inviting inner node is increased (process 4160) by the number of newly connected inner nodes.

FIG. 42 illustrates processes 4200 performed at an inner node, other than the collector node, according to the invitation-acceptance method. The inner node broadcasts (process 4220) invitations through N transmission beams, each invitation indicating the radius of the inner node and upstream utilization of the inner node. The inner node may receive (process 4230) acceptance from some outer nodes. The inner node sends requests (process 4240) to the collector node to provide a node identifier for each of the accepting outer nodes. The inner node then receives (process 4250) the requested identifiers and distribute them to respective outer nodes (which are now upgraded to inner nodes). The inviting inner node then increases (process 4260) its upstream utilization according to the number of newly accommodated nodes.

Figure 43:
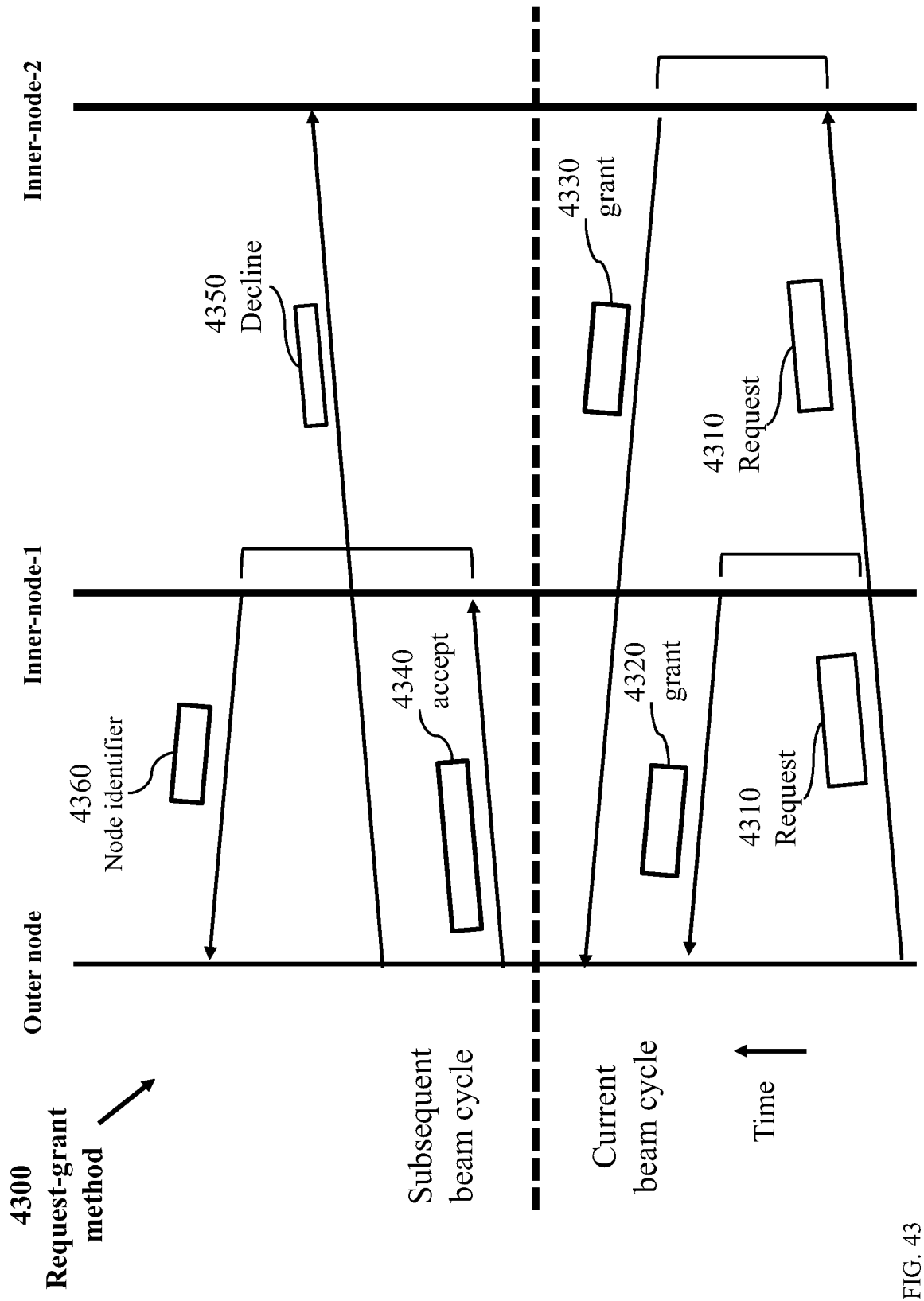
FIG. 43 illustrates a sequence of exchanged data between an outer node and two inner nodes according to the request-grant method, in accordance with an embodiment of the present invention.

FIG. 43 illustrates a sequence 4300 of exchanging data between an outer node and two inner nodes according to the request-grant method. During a current beam cycle, the outer node broadcasts a connection request 4310 (process 4010) which is received at inner-node-1 and inner-node-2. Inner-node-1 responds with a grant 4320 and inner-node-2 responds with a grant 4330. The outer node waits to receive potential grants and select the most suitable grant and during a subsequent beam cycle decides to accept the grant from inner node-1. The outer node sends an acceptance 4340 to inner-node-1 and a rejection 3450 to inner-node-2. The outer node later receives a node identifier 4360 from inner-node-1 which had acquired the node identifier from the collector node.

Figure 44:
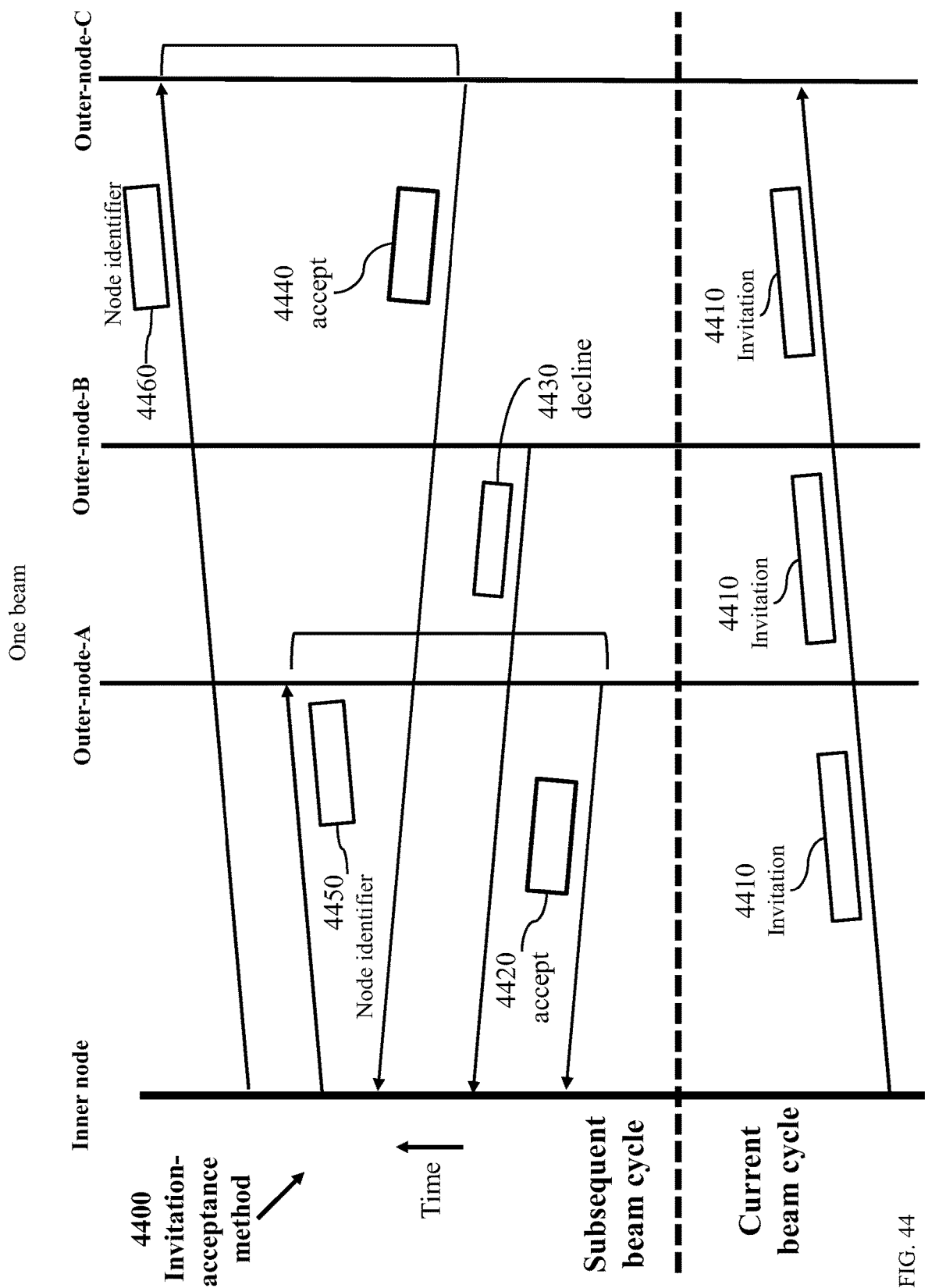
FIG. 44 illustrates a sequence of exchanged data between an inner node and outer nodes according to invitation-acceptance method, in accordance with an embodiment of the present invention.

FIG. 44 illustrates a sequence 4400 of exchanging data between an inner node and outer nodes according to invitation-acceptance method. During a current beam cycle, the inner node broadcasts (process 4220) an invitation 4410 which is captured at outer-node-A, outer-node-B, and outer-node-C. During a subsequent beam cycle, outer-node-A responds with an acceptance 4420, outer-node-C responds with an acceptance 4440. The inner node acquires node identifiers for outer-node-A and outer-node-C. The inner node sends a node identifier 4450 to outer-node-A (which is changing to an inner node) and a node identifier 4460 to outer-node-C.

Figure 45:
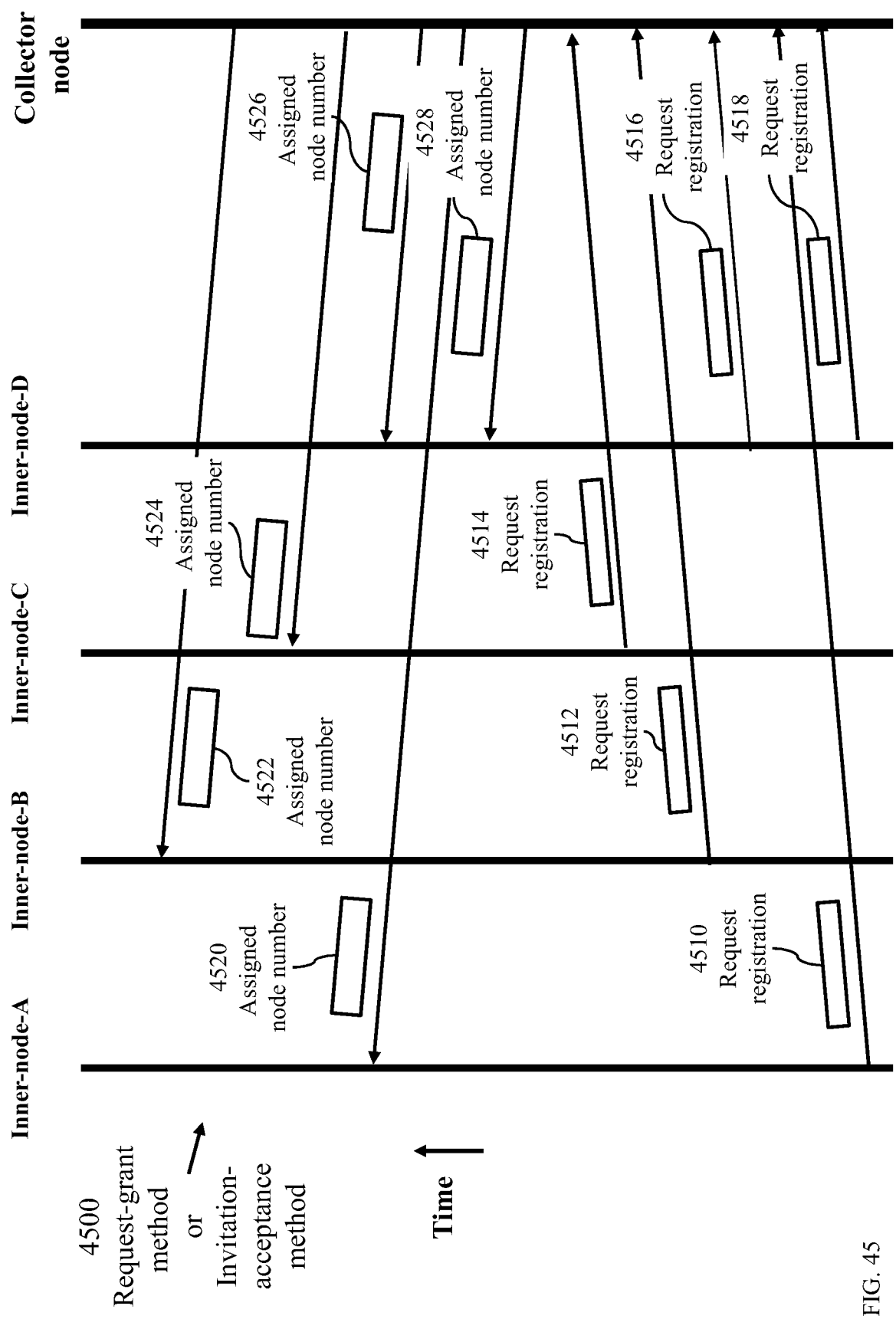
FIG. 45 illustrates a sequence of exchanged data between four inner nodes and the collector to register newly admitted inner nodes, regardless of whether the request-grant method or the invitation-acceptance method is applied, in accordance with an embodiment of the present invention.

FIG. 45 illustrates a sequence 4500 of exchanging data between four inner nodes and the collector to register subordinate inner nodes regardless of whether the request-grant method or the invitation-acceptance method is applied. Inner-node-A sends a registration request 4510, inner-node-B sends a registration request 4512, inner-node-C sends a registration request 4514, and inner-node-D sends two registration requests 4516 and 4518. The collector node responds with corresponding messages 4520, 4522, 4524, 4526, and 4528 each message indicating a respective assigned node number.

Figure 46:
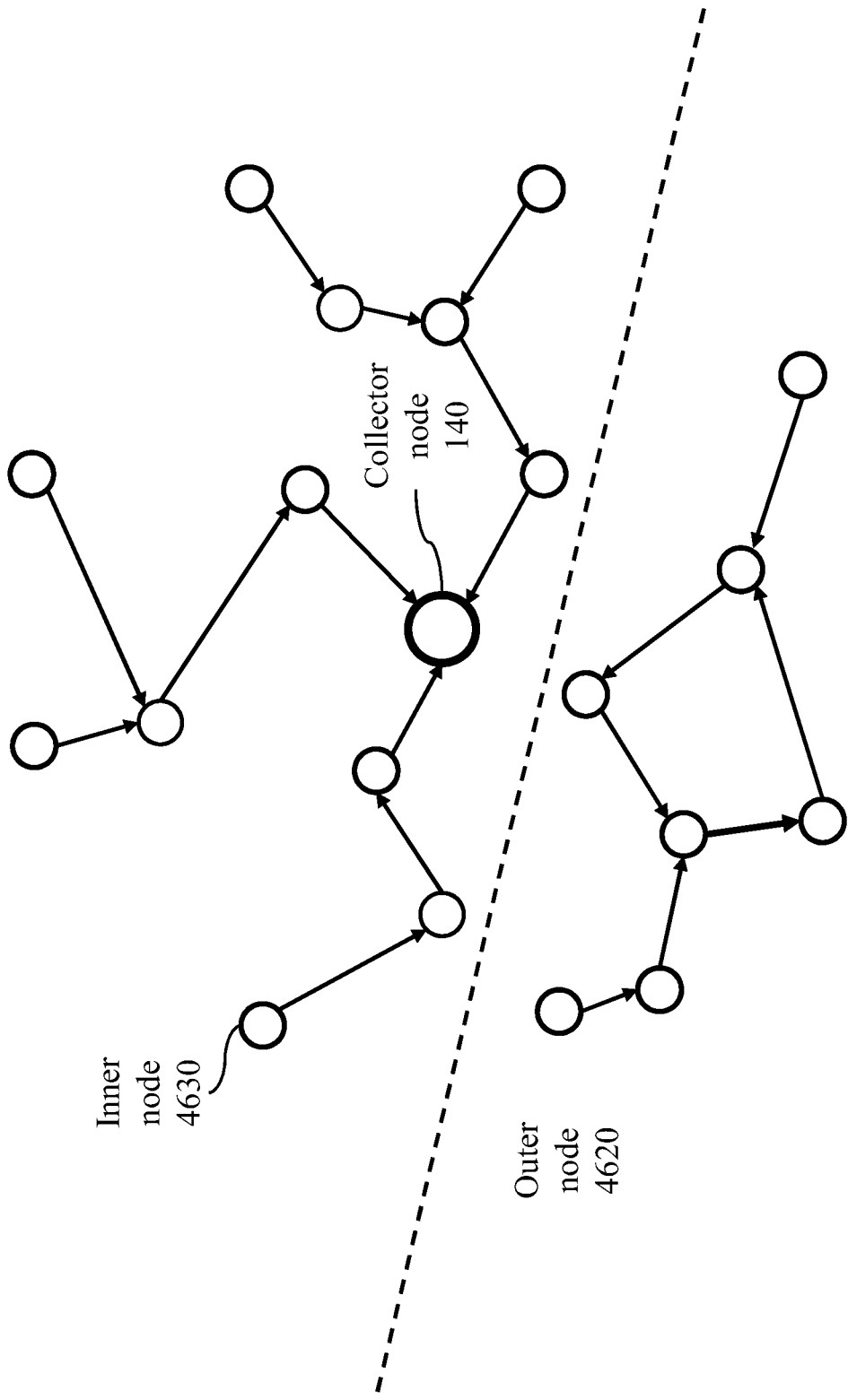
FIG. 46 illustrates potential isolation of nodes that may result from ad hoc network formation.

FIG. 46 illustrates potential isolation of nodes that may result from ad hoc network formation. A set of inner nodes 4630 (of the plurality of nodes 120) may form a network with each inner node having a path to the collector node. However, a set of outer nodes 4620 (of the plurality of nodes 120) may connect to each other, forming an isolated island, as illustrated while none has a path to collector node 140. The request-grant method and invitation-acceptance method described above avoid island formation.

Figure 47:
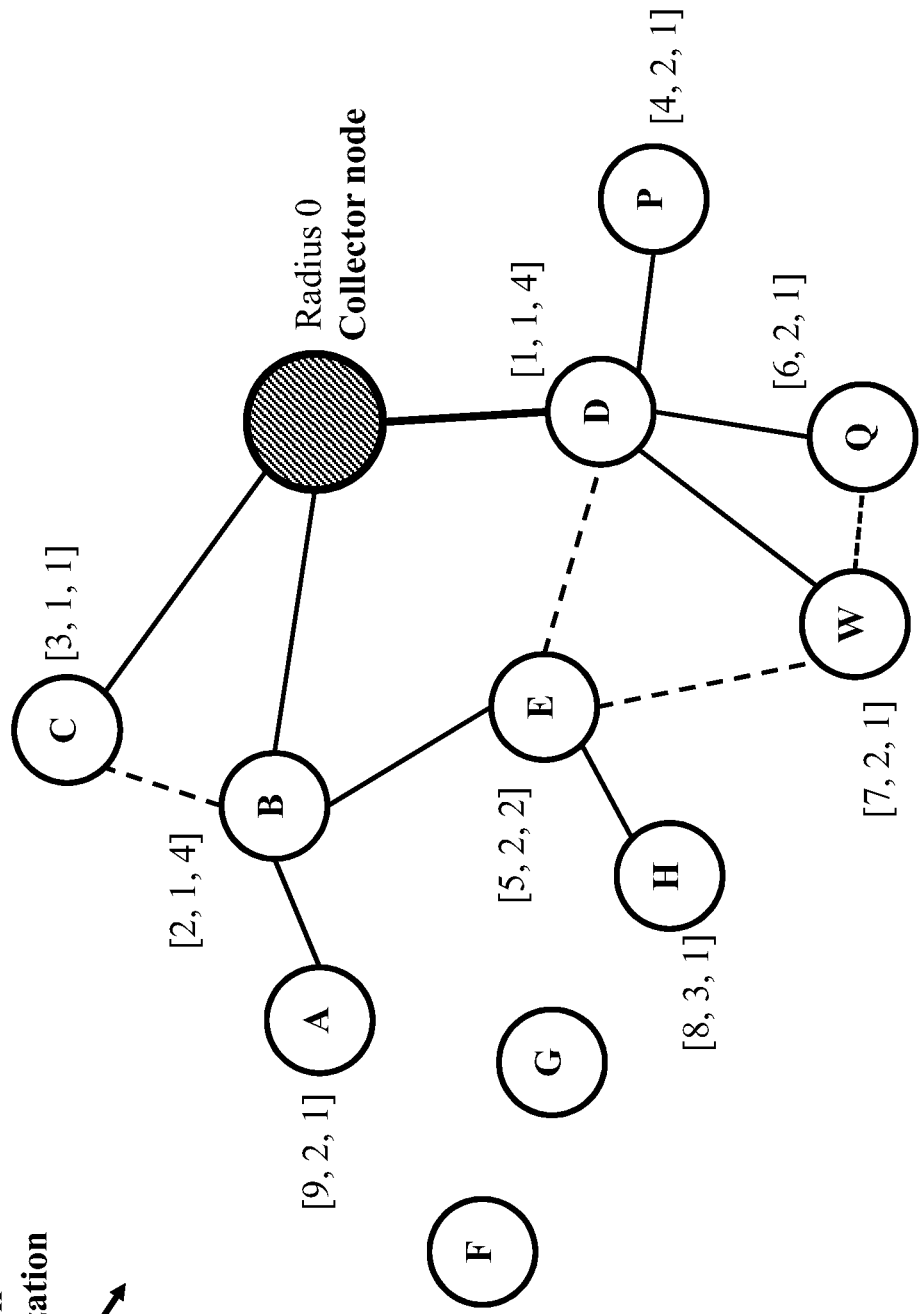
FIG. 47 illustrates tracking network formation to determine an identifier, a topological radius, and upstream utilization for each inner node of an exemplary sensor network, in accordance with an embodiment of the present invention.

FIG. 47 illustrates tracking 4700 network formation to determine an identifier, a topological radius, and utilization for each inner node of an exemplary sensor network. The seed of a sensor network 100 is a collector node which is initialized as an inner node of zero topological radius. A topological radius of a node is the number of concatenated beams connecting the node to the collector. For brevity, the topological radius is herein referenced as "radius". Nodes 120 labeled A, B, C, D, E, F, G, H, P, Q, and W are provided to construct a sensor network. Each node is characterized by a triplet [identifier, radius, utilization]. The nodes are provided at different times.

Node D is the first to connect to the collector. Thus, using either of the two methods of network formation (request-grant or invitation-acceptance), the collector assigns identifier "1" to node D. The radius of node D is 1 since the node connects directly to the collector. At this point, node D has no subordinate nodes. Hence, the upstream utilization of node D is 1. The upstream utilization of a node is the number of nodes sending signals along the upstream beam connecting the node towards the collector. Thus, at this stage, a triplet [1, 1, 1] characterizes node D.

Node B is the second node to join the network. The node is connected directly to the collector. Hence, at this stage, a triplet [2, 1, 1] characterizes node B.

Node C is the third node to join the network. The node is connected directly to the collector. A triplet [3, 1, 1] characterizes node C at this stage.

Node P is the fourth node to join the network through node D. The radius of node D is 1, hence the radius of node P is 2. So far, node P has no subordinate nodes, thus the upstream utilization of node P is 1 and a triplet [4, 2, 1] characterizes node P. The admission of node P increases the upstream utilization of node D. Thus, at this stage a triplet [1, 1, 2] (instead of [1, 1, 1]) characterizes node D.

Node E is the fifth node to join the network through node B. The radius of node B is 1, hence the radius of node E is 2. So far, node E has no subordinate nodes. Thus, the upstream utilization of node E is 1. At this stage, a triplet [5, 2, 1] characterizes node E. The admission of node E increases the upstream utilization of node B. Thus, at this stage, a triplet [2, 1, 2] (instead of [2, 1, 1]) characterizes node B.

Node Q is the sixth node to join the network through node D. The radius of node D is 1, hence the radius of node Q is 2. So far, node Q has no subordinate nodes, Thus, a triplet [6, 2, 1] characterizes node Q. The admission of node Q increases the upstream utilization of node D to 3, thus a triplet [1, 1, 3] (instead if [1, 1, 2]) characterizes node D.

Node W is the seventh node to join the network through node D. The radius of node D is 1, hence the radius of node W is 2 and a triplet [7, 2, 1] characterizes node W. The admission of node W increases the upstream utilization of node D, Thus, a triplet [1, 1, 4] characterizes node D at this stage.

Node H is the eights node to join the network through node E. The radius of node E is 2, hence the radius of node H is three. A triplet [8, 3, 1] characterizes node H. The admission of node H increases the upstream utilization of node E and the upstream utilization of node B. Thus, a triplet [2, 1, 3] characterizes node B at this stage.

Node A is the ninth node to join the network through node B. The radius of node B is 1, hence the radius of node A is 2. A triplet [9, 2, 1] characterizes node A. The admission of node A increases the upstream utilization of node B. Thus, a triplet [2, 1, 4] now characterizes node B.

FIG. 48 illustrates steps 4800 of formation of the exemplary network of FIG. 47 and tracking upstream utilization of each node.

The process of network formation starts with designating one node of the plurality of nodes as a collector with the remaining nodes establishing a path to the collector in a hierarchical fashion where each remaining node within reach of the collector joins the wireless network as a first-stratum node. Due to power limitation and possibly environmental conditions, it may not be feasible for each node to connect to the collector directly over a single beam. Thus, each remaining node within reach of any first-stratum node joins the wireless network as a second-stratum node, and so on with each remaining node within reach of any $m^{th}$-stratum node joining the wireless network as an $(m+1)^{th}$-stratum node, m>1.

Figure 49:
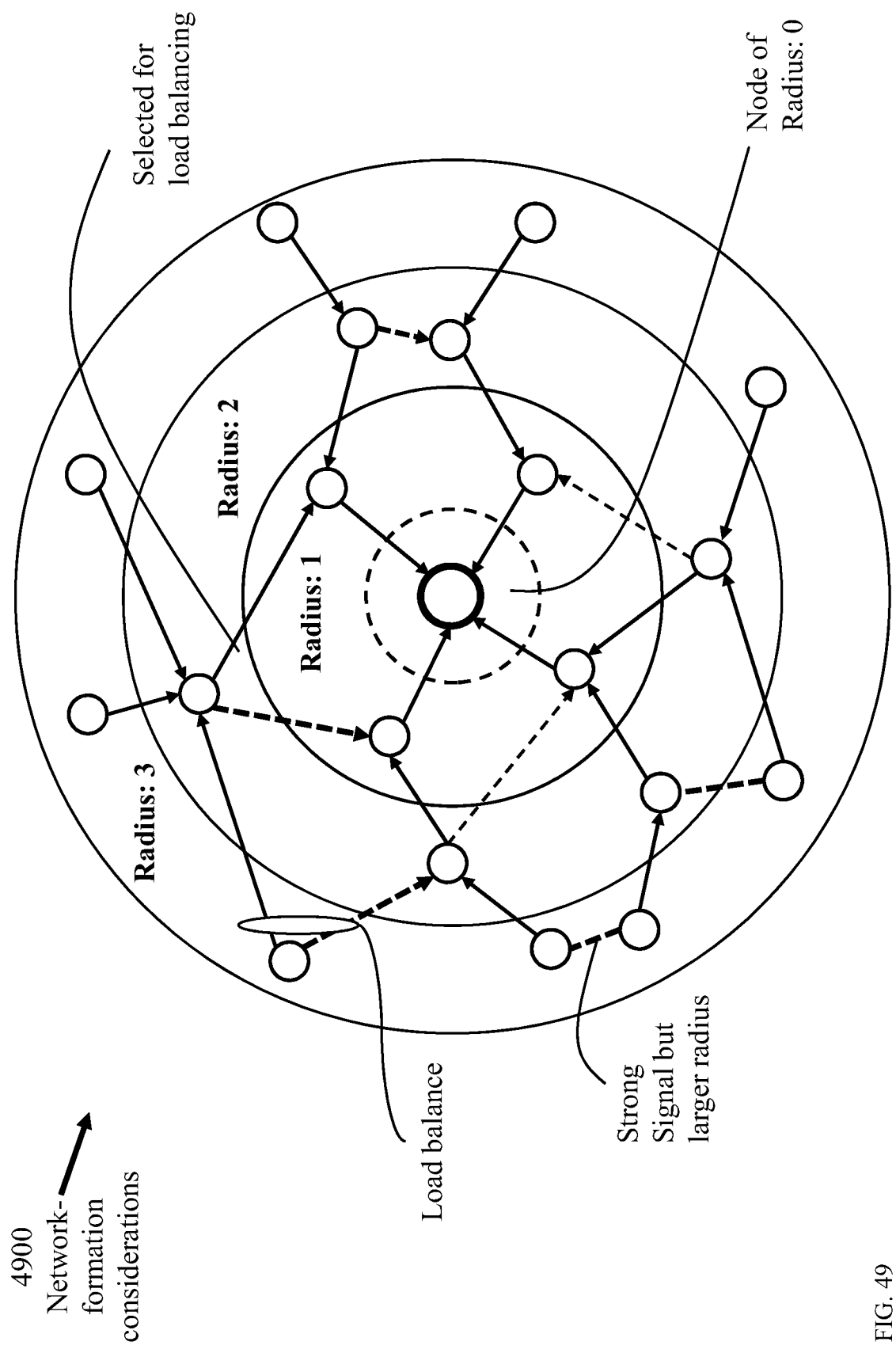
FIG. 49 illustrates hierarchical formation of a wireless sensor network starting with the collector using either of the two network-formation methods, in accordance with an embodiment of the present invention.

FIG. 49 illustrates hierarchical formation 4900 of a network using either of the two network-formation methods starting with the collector (radius 0). Four nodes connect directly to the collector and hence the radius of each of the four nodes is 1. Six nodes connect to the network through the nodes of radius 1; hence the radius of each of the six nodes is 2. Nine nodes connect to the network through the nodes of radius 2; hence the radius of each of the nine nodes is 3. An outer node may have more than one invitation to join the network. The outer node accepts one of the invitation according to some criterion. The dashed lines indicate network connectivity options that were not selected.

Figure 50:
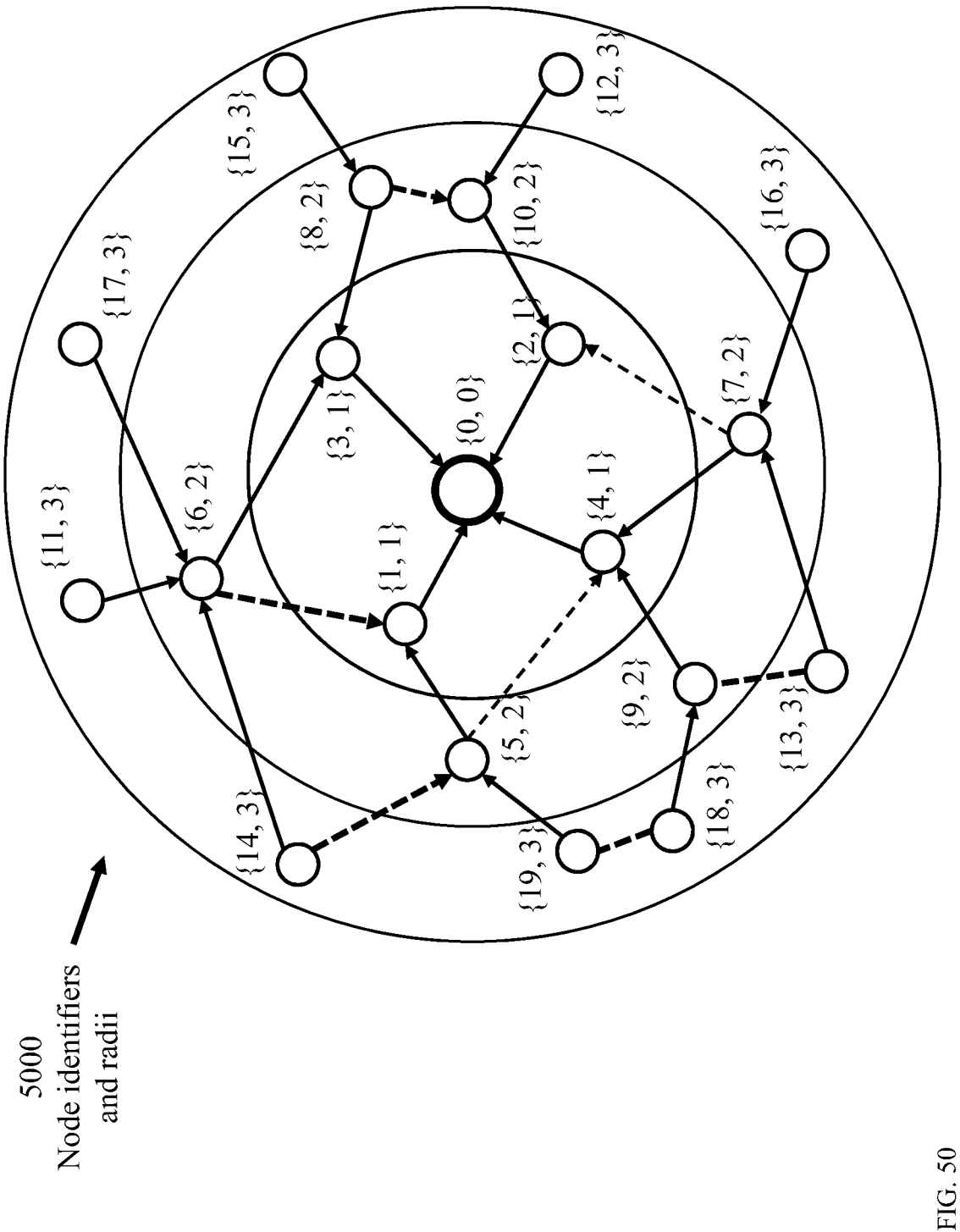
FIG. 50 illustrates the network of FIG. 49 with an identifier and a topological radius indicated for each node.

FIG. 50 illustrates node identifiers and radii 5000 for the network of FIG. 49 indicating for each node an assigned identifier and a radius. The collector has an identifier 0 and a radius 0. An outer node linked to one of candidate inner nodes based on the topological radii of the candidate inner nodes and proximity. For example, Node 5 could connect to the collector through node 1 of radius 1 or node 4 of radius 1. Since the two candidate inner nodes have the same radius, the decision to connect through node 1 is based on proximity. Node 19 could connect to the network through nearby node 18 of radius 3 or node 5 of radius 2. Node 5 is preferred due to its smaller radius.

Figure 51:
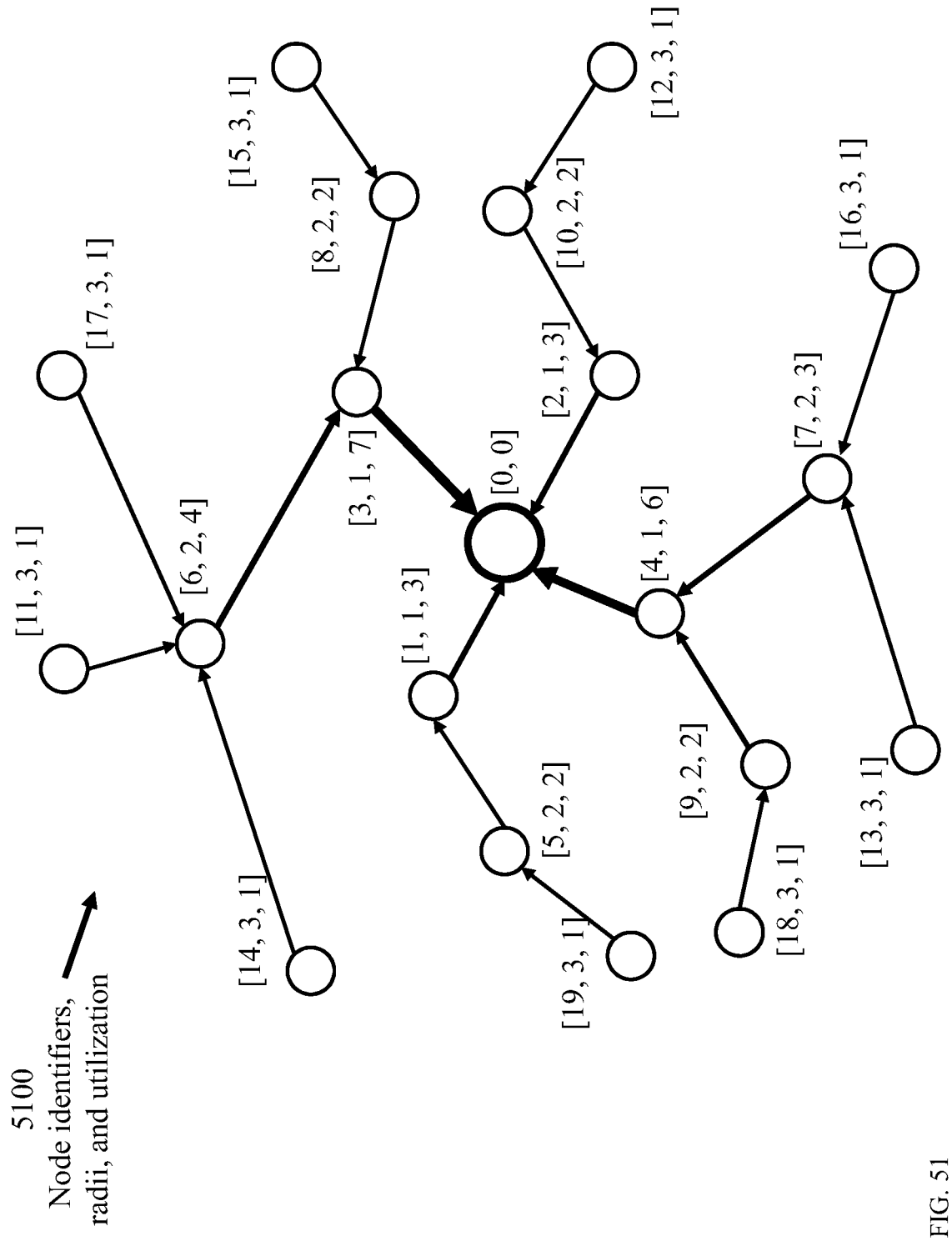
FIG. 51 illustrates a triplet [identifier, radius, upstream utilization] characterizing each node of the network of FIG. 49, in accordance with an embodiment of the present invention.

FIG. 51 illustrates node identifiers, radii, and utilization 5100 for a network formed according to the linking criterion of FIG. 50. A triplet [identifier, radius, utilization] is determined for each node. For example, node 16 connects to the collector though three links (three beams) and has no subordinates. Hence a triplet [16, 3, 1] characterizes the node. Node 3 connects directly to the collector; hence its radius is 1. Node 3 has six subordinate nodes. Thus, the upstream beam from node 3 carries signals from node 3 and from the six subordinate nodes. Thus, the upstream utilization of node 3 is seven and its characterizing triplet is [3, 1, 7].

Figure 52:
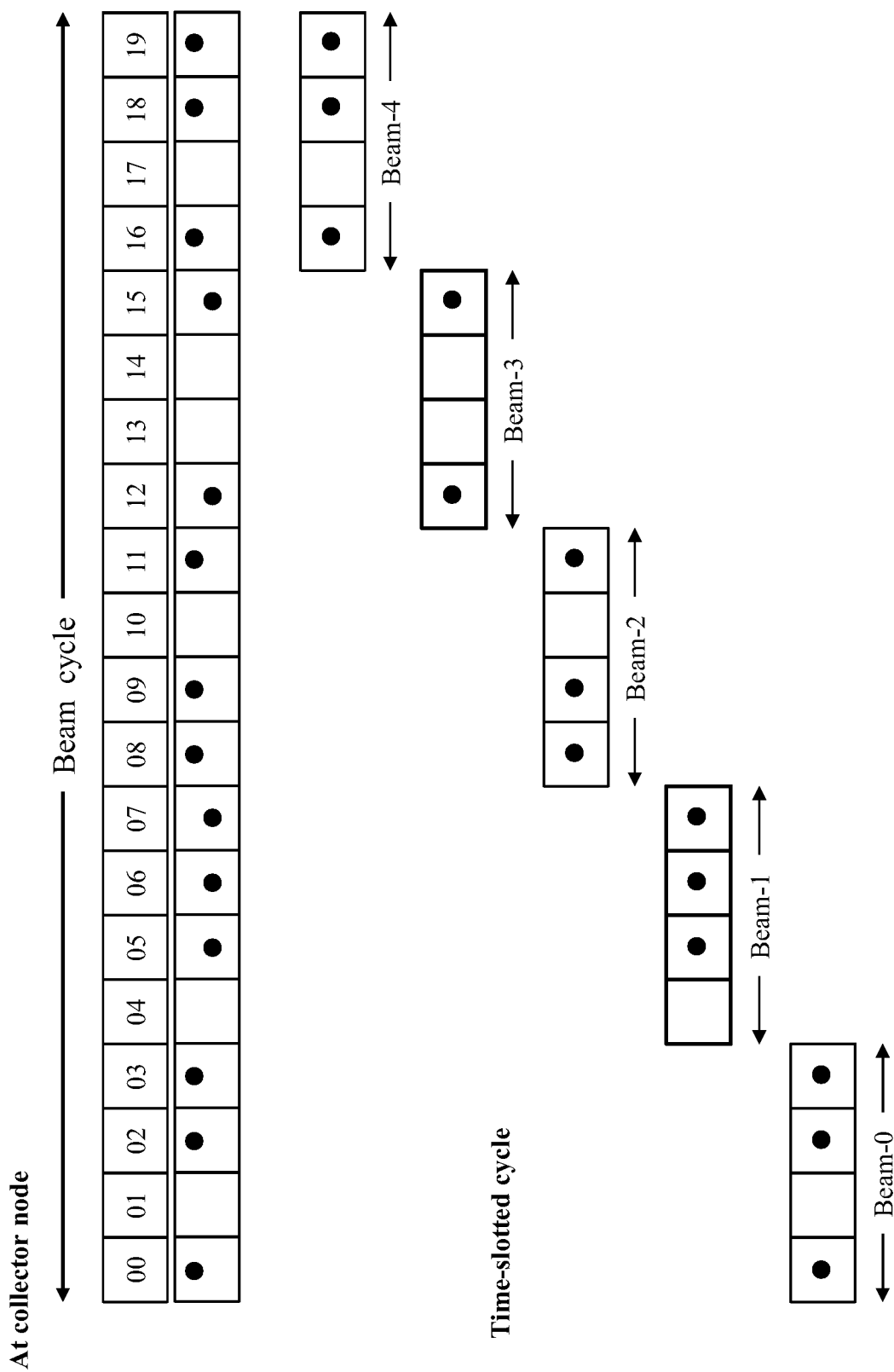
FIG. 52 illustrates beam utilization for an inner node employing an antenna of a beam cycle of five beams.

FIG. 52 illustrates beam utilization for an inner node employing an antenna of a beam cycle of five beams. During a beam cycle, the collector may receive signals during each beam period, i.e., from all directions. The signals received during each beam period may be transmitted from multiple inner nodes. The beam period may be time slotted with each inner node allocated at least one time slot for transmitting upstream signals. With each beam period divided into four slots, for example, the total number of time slots per beam cycles would be twenty, which may be indexed as 0 to 19 as illustrated. For each beam period, one of the time slots may be designated as a registration time slot to be used for path reservation in a manner well known in the art. In order to reduce the variance of beam loading, the upstream utilization may be taken into account when an outer node receives invitations from more that one inner node.

Figure 53:
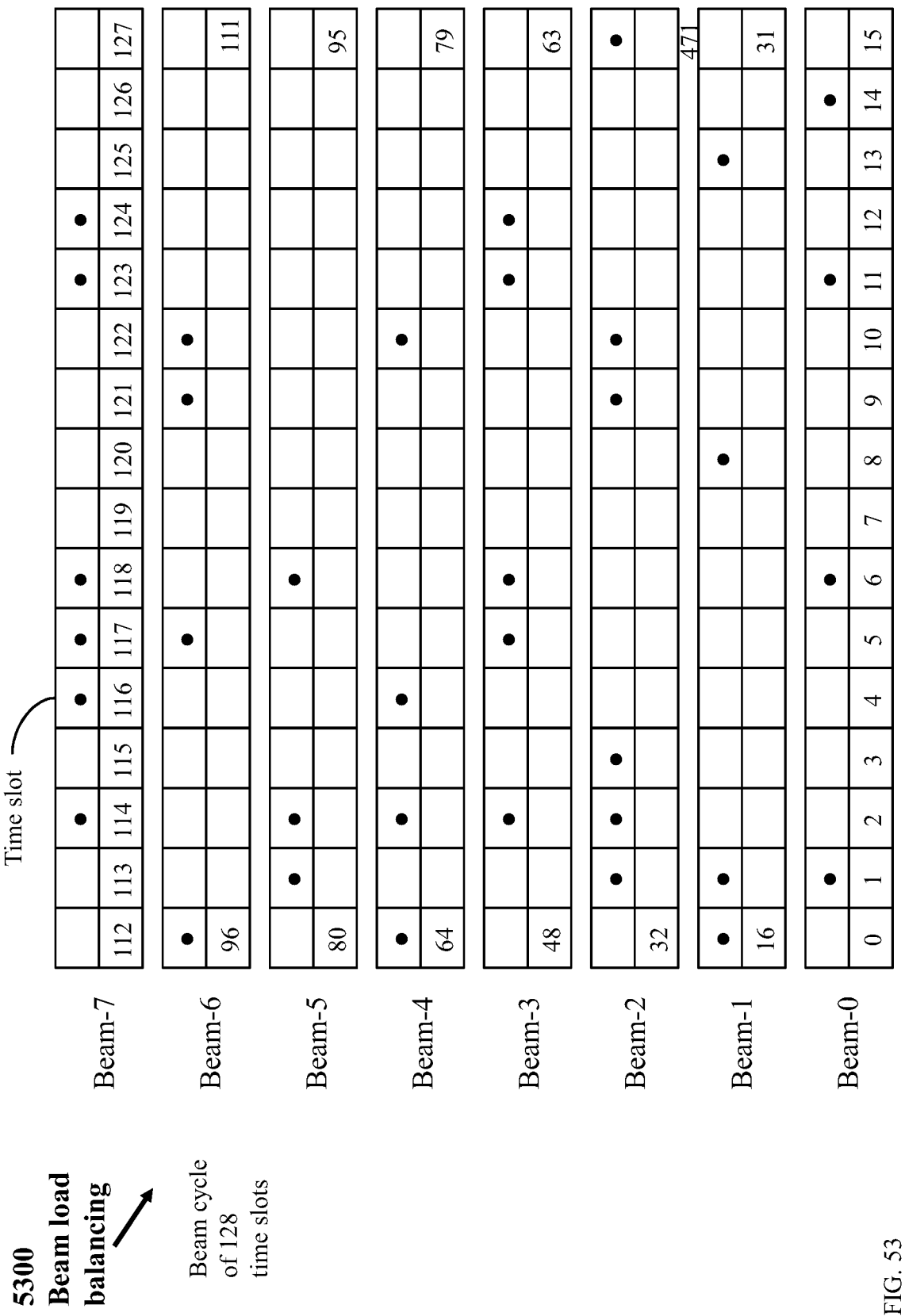
FIG. 53 illustrates beam utilization for an inner node employing an antenna of a beam cycle of eight beams, in accordance with an embodiment of the present invention.

FIG. 53 illustrates beam utilization 5300 for an inner node employing an antenna of a beam cycle of eight beams where each beam period is divided into 16 time slots leading to 128 time slots per beam cycle. The time slots may be indexed as 0 to 127. As illustrated in FIG. 34, for a beam cycle of eight beam periods, the number of inner nodes communicating with the collector through different beams may vary significantly from one beam to another. This also applies to communication between an inner node and subordinate inner nodes. As the node density increases, with well spaced nodes, the number of potential paths from a node to the collector increases which enhances the opportunity of balancing beam loading. The node density is the number on nodes within reach of a reference node.

Figure 54:
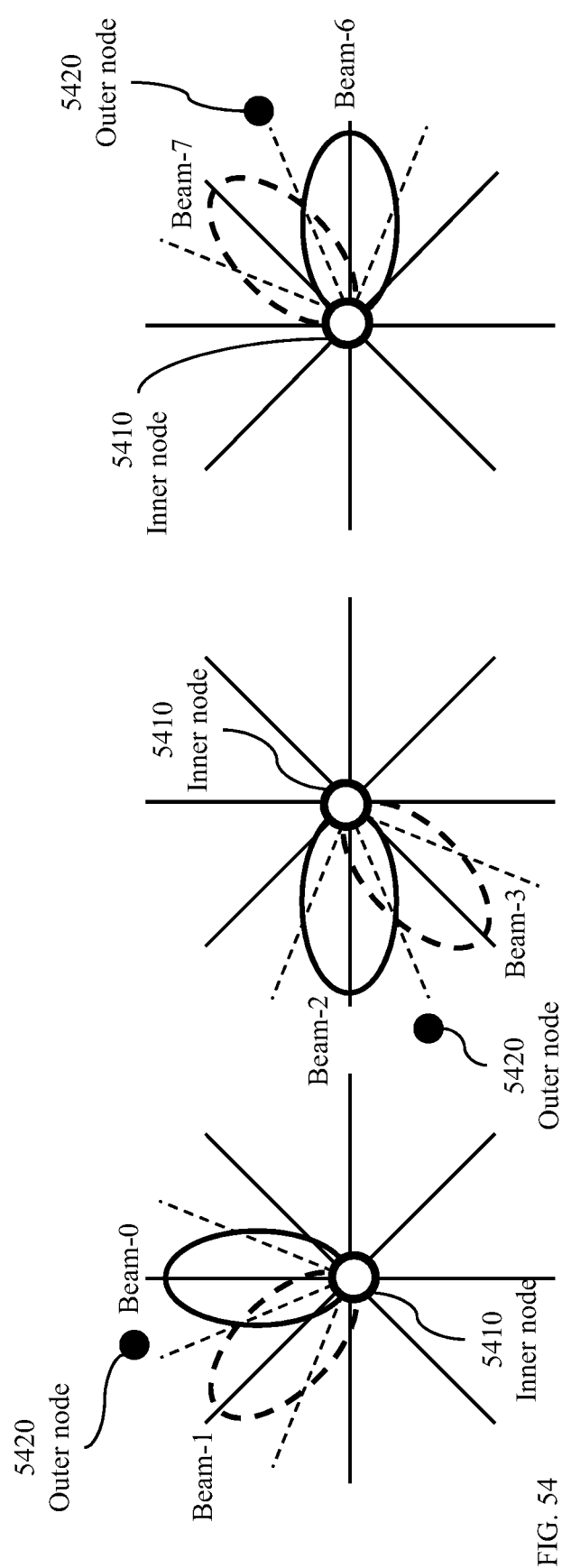
FIG. 54 illustrates an outer node receiving two invitations from a same inner node.

FIG. 54 illustrates an outer node receiving two invitations from a same inner node. An outer node in a position covered by two transmission beams of an inner node may receive two invitations from the same inner node. In the illustrated scenarios, an outer node 120A is at a position covered by beam-0 and beam-1 of inner-node 120X. Thus, regardless of the method of network formation (request-grant or invitation-acceptance), outer node 120 may join the network through either beam-0 or beam-1 which are radiated during different beam periods. Likewise, an outer node 120B is at a position covered by beam-2 and beam-3 of inner-node 120X, and outer node 120C is at a position covered by beam-6 and beam-7 of inner-node 120X

Figure 55:
FIG. 55 illustrates an outer node receiving multiple invitations from multiple inner nodes and selecting a preferred inner node according to a composite selection criterion, in accordance with an embodiment of the present invention.

FIG. 55 illustrates an outer node receiving multiple invitations 5500 from multiple inner nodes and selecting a preferred inner node according to a composite selection criterion. In a network of high node density, an outer node may receive invitations through several beams. In the illustrated example, the outer node receives eleven invitations during five beam periods of a beam cycle: two during T0, one during T1, six during T4, two during T5, and one during T7. Two invitations were received from an inner node of index 11 and two invitations were received from an inner node of index 29. A composite selection criterion may be applied to select one of the eleven invitations. The composite criterion may be a weighted sum of signal strength, radius of an inviting node, and upstream utilization of the inviting node.

Design Options

Each node has a respective controller and the controller of the collector node may function as a central controller. Once a network is created with the help of a GPS receiver and an electronic compass installed at each node, the central controller may control the network. The central controller can precisely control time alignment and the beam-rotation period. This is especially useful during periods of loss of access to the satellites. Additionally, with static nodes or slowly moving nodes, if each node communicates its latitude-longitude coordinates to the central controller, the central controller may reorganize the network based on a global spatial view as well as the rates of data flow.

Figure 56:
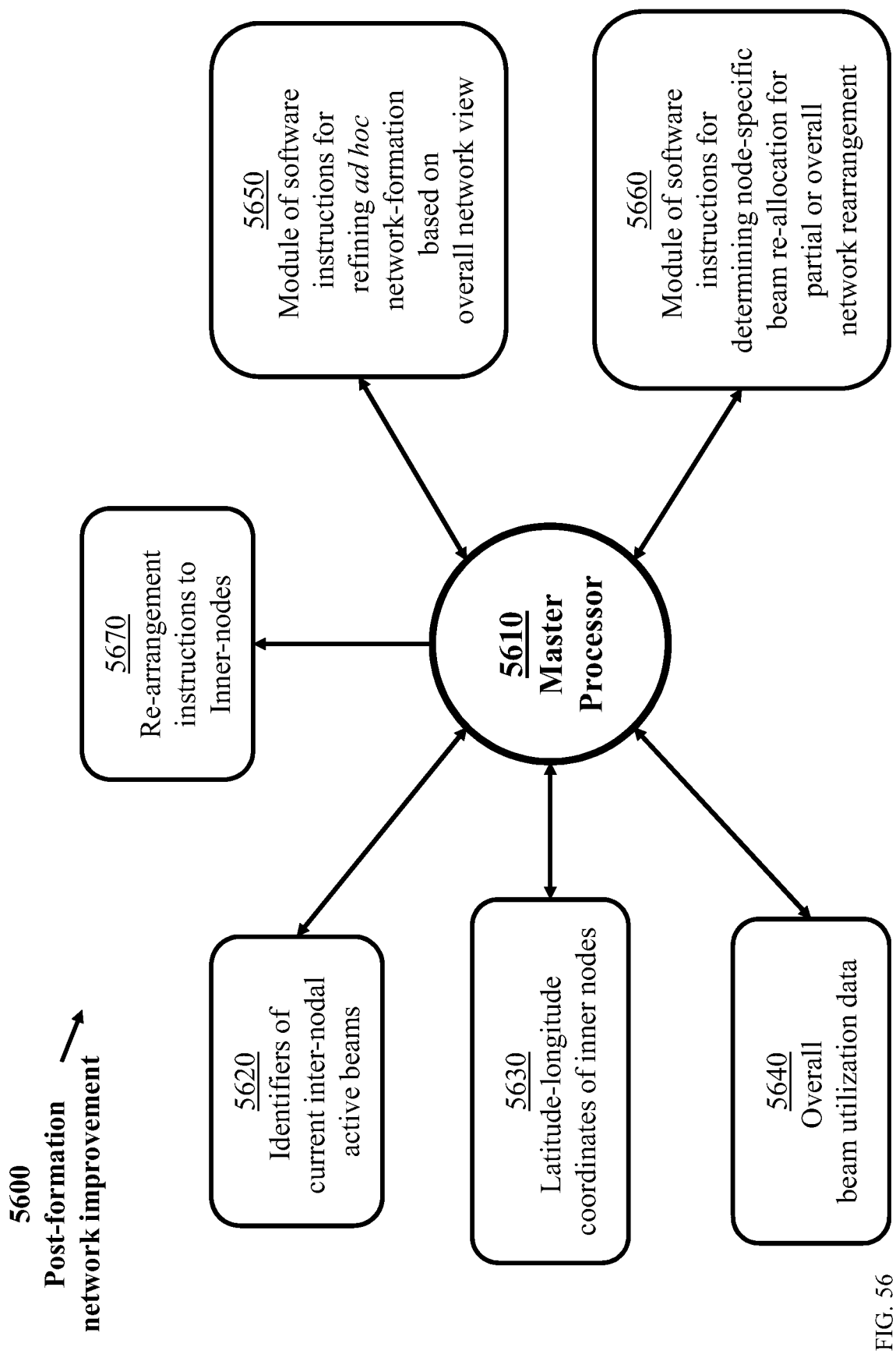
FIG. 56 illustrates a system for post-formation network refinement based on global data acquired at the collector node, in accordance with an embodiment of the present invention.

FIG. 56 illustrates a system 5600 for post-formation network refinement based on global data acquired at the collector node. The controller of the collector may function as a central controller employing a master processor 5610 coupled to a data-storage medium and a program-storage medium.

The data-storage medium comprises: memory device 5620 for storing identifiers of current inter-nodal active beams used for node interconnection; memory device 5630 for storing latitude-longitude coordinates of inner nodes; and memory device 5640 for storing upstream utilization data of each inner node.

The program-storage medium comprises: memory device 5650 storing software instructions for refining the network structure based on information received during node registration; and memory device 5660 storing software instructions for determining node-specific beam re-allocation.

Figure 57:
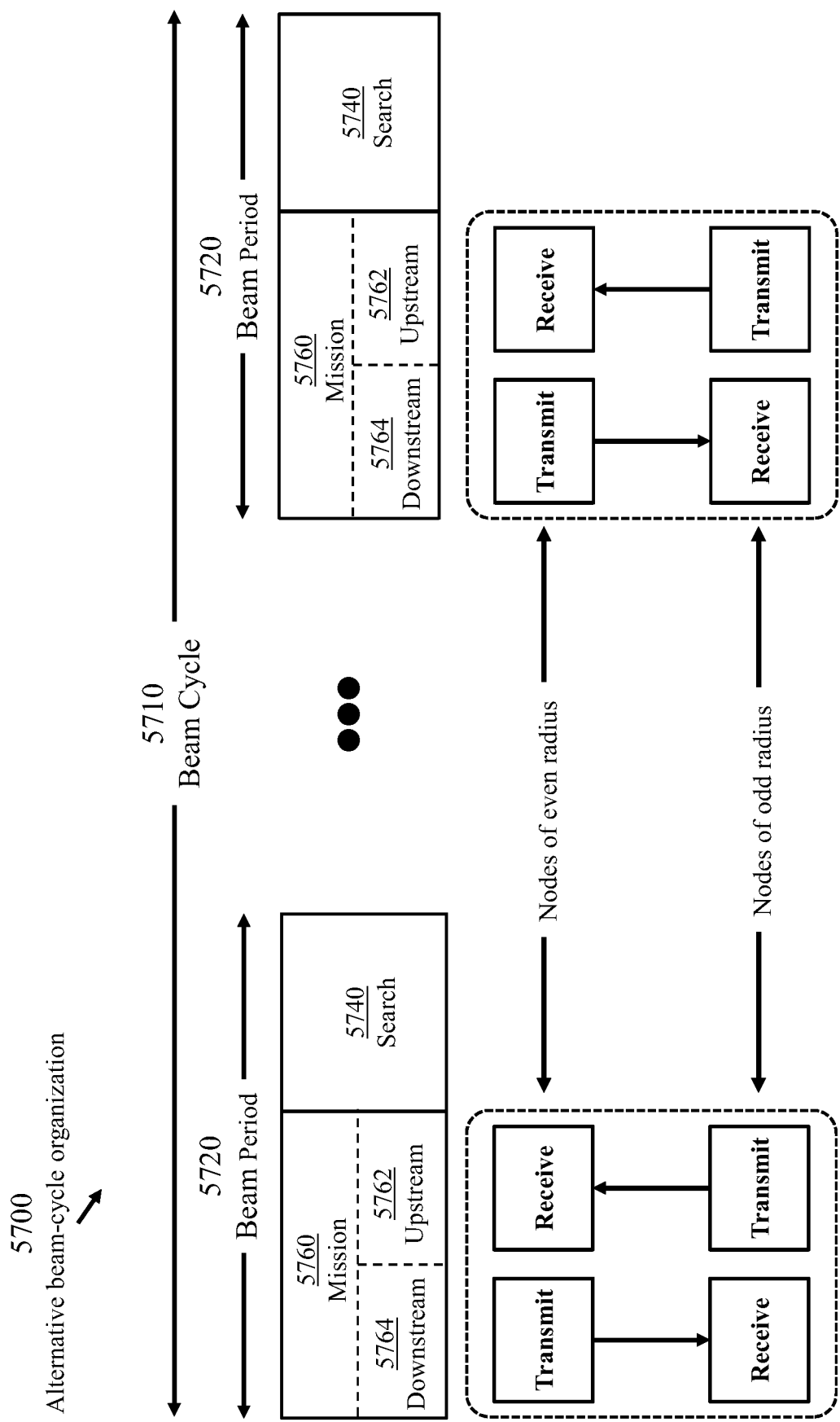
FIG. 57 illustrates an alternate organization of a beam cycle.

FIG. 57 illustrates an alternate scheme 5700 of beam formation and beam-cycle organization according to two modes of operation: a search mode (network-formation mode) and a mission mode. The beam cycle 5710 comprises N beam periods, N>1, as illustrated in FIGS. 29 to 35 for N=8. Each beam period 5720 is divided into a search interval 5740 and a mission interval 5760. During a search interval 5740, an inner node may exchange messages with outer nodes attempting to join the network. During a mission interval 5760 an inner node communicates with the collector, directly or through an intermediate inner node. During a sub-interval 5762, an inner node transmits upstream data including local sensor data, sensor data in transit, and control data to the collector. During a sub-interval 5764, an inner node receives downstream data during a sub-interval 5764.

Thus, an improved method and system for forming a wireless sensor network have been provided.

Systems and apparatus of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A system for wireless communication comprising:
a plurality of nodes, each node comprising:
   a plurality of phase shifters each coupled to a respective antenna element;
   an electronic compass for determining node orientation as an angular displacement of a node reference direction from Earth's magnetic north;
   a reference-time circuit for generating periodic sawtooth signals defining beam cycles aligned according to pivotal reference time indications acquired from a Global-Positioning-System receiver;
   a beam-orientation circuit for determining phase-shift values supplied to said plurality of phase shifters according to requisite beam directions and said node orientation;
   a phased-array controller for cyclically updating said phase-shift values during each beam period of a beam cycle comprising N beam periods, N>1;
   a node transmitter;
   a node receiver; and
   a node controller comprising a processor and a memory device causing the processor to simultaneously activate said phased-array controller, said node transmitter, and said node receiver;
   wherein said reference-time circuit comprises:
      a circuit for detecting time-indication transitions of timing data acquired from the Global-Positioning-System receiver and identifying said pivotal reference time indications:
      a frequency synthesizer for generating pulses at a timing rate determined as a specified integer multiple of a rate of said time-indication transitions; and
      a cyclic counter of said pulses for generating said sawtooth signals.

2. The system of claim 1 wherein said phase-shift values are determined according to:
placement of said each antenna element with respect to said node reference direction;
said node orientation; and
a specified beam direction.

3. The system of claim 1 wherein:
one node of said plurality of nodes is designated as a collector;
each remaining node within reach of said collector joins as a first-stratum node; and
each remaining node within reach of any $m^{th}$-stratum node joins as an $(m+1)^{th}$-stratum node, m>0.

4. The system of claim 1 wherein said reference-time circuit is configured to:
recognize onset times of a repetitive pattern of time indications of said pulses; and
generate starting-time indicators of said periodic saw tooth signals accordingly.

5. The system of claim 4 wherein:
N is a power-of-2 integer;
said specified integer multiple is a power of 2 greater than N; and
said repetitive pattern spans an integer power-of-2 number of time indications at least equal to N;
thereby, the duration of each beam is a power-of-2 multiple of pulse periods, a pulse period being the time between the onset of two successive pulses.

6. The system of claim 1 wherein:
said plurality of phase shifters comprises four phase shifters each coupled to a respective one of four antenna elements placed at relative coordinates $\{A, 0\}$, $\{0, A\}$, $\{-A, 0\}$, and $\{0, -A\}$, with respect to node-specific reference directions; and
said phase-shift values of the phase shifters coupled to said four antenna elements are respectively selected as $h \times \cos(\Phi_j)$, $h \times \sin(\Phi_j)$, $-h \times \cos(\Phi_j)$, and $-h \times \sin(\Phi_j)$, where $h=2\pi A/\lambda$, $\lambda$ being a common wavelength;
thereby forming N beams of directions $\Phi_j=(\Gamma+j\Gamma/4)$, $0 \le j < N$, where N=8.

7. A system for wireless communication comprising:
a plurality of nodes, each node comprising:
   a plurality of phase shifters each coupled to a respective antenna element;
   an electronic compass for determining node orientation as an angular displacement of a node reference direction from Earth's magnetic north;
   a reference-time circuit for generating periodic sawtooth signals defining beam cycles aligned according to pivotal reference time indications acquired from a Global-Positioning-System receiver;
   a beam-orientation circuit for determining phase-shift values supplied to said plurality of phase shifters according to requisite beam directions and said node orientation;
   a phased-array controller for cyclically updating said phase-shift values during each beam period of a beam cycle comprising N beam periods, N>1;
   a node transmitter;
   a node receiver; and
   a node controller comprising a processor and a memory device causing the processor to simultaneously activate said phased-array controller, said node transmitter, and said node receiver;
   wherein during a beam period of index j, $0 j \le N$, within said beam cycle, said specified beam direction is determined as: $\Gamma+2 \times \pi \times j/N$, $\Gamma$ being said node orientation.

8. The system of claim 7 wherein:
one node of said plurality of nodes is designated as a collector;
each remaining node within reach of said collector joins as a first-stratum node; and
each remaining node within reach of any $m^{th}$-stratum node joins as an $(m+1)^{th}$-stratum node, m>0.

9. The system of claim 7 wherein said phase-shift values are determined according to:
placement of said each antenna element with respect to said node reference direction;
said node orientation; and
a specified beam direction.

10. The system of claim 7 wherein said reference-time circuit is configured to generate starting-time indicators of said periodic saw tooth signals according to said pivotal reference time indications.

11. The system of claim 7 wherein:
said plurality of phase shifters comprises four phase shifters each coupled to a respective one of four antenna elements placed at relative coordinates $\{A, 0\}$, {0, A}, {−A, 0}, and {0, −A}, with respect to node-specific reference directions; and said phase-shift values of the phase shifters coupled to said four antenna elements are respectively selected as $h \times \cos(\Phi_j)$, $h \times \sin(\Phi_j)$, $-h \times \cos(\Phi_j)$, and $-h \times \sin(\Phi_j)$, where $h = 2\pi A/\lambda$, $\lambda$ being a common wavelength;

thereby forming N beams of directions $\Phi_j = (\Gamma + j\Gamma/4)$, $0 \leq j < N$, where $N=8$.

12. A method of wireless communication comprising:
at each node of a network of a plurality of nodes:
   providing a plurality of antenna elements and a plurality of phase shifters, each antenna element coupled to a respective phase shifter;
   determining, using an electronic compass, node orientation as an angular displacement of a node reference direction from Earth's magnetic north;
   generating, using a reference-time circuit, periodic sawtooth signals defining beam cycles aligned according to pivotal reference time indications acquired from a Global-Positioning-System receiver;
   determining, using a beam-orientation circuit, phase-shift values supplied to said plurality of phase shifters according to requisite beam directions and said node orientation;
   cyclically updating, using a phased-array controller, said phase-shift values during each beam period of a beam cycle comprising N beam periods, N>1; and
   simultaneously activating said phased-array controller, a node transmitter, and a node receiver;
   said generating comprising:
      detecting time-indication transitions of timing data acquired from the Global-Positioning-System receiver and identifying said pivotal reference time indications;
      producing, using a frequency synthesizer, pulses at a timing rate determined as a specified integer multiple of a rate of said time-indication transitions; and
      forming said sawtooth signals using a cyclic counter of said pulses.

13. The method of claim 12 wherein said phase-shift values are further determined according to placement of said plurality of antenna elements within said each node.

14. The method of claim 12 further comprising:
designating one node of said plurality of nodes as a collector;
linking to said collector each remaining node within reach of said collector as a first-stratum node; and
linking each remaining node within reach of any $m^{th}$-stratum node as an $(m+1)^{th}$-stratum node, $m>0$.

15. The method of claim 12 further comprising:
recognizing onset times of a repetitive pattern of time indications of said pulses; and
generating starting-time indicators of said periodic saw tooth signals accordingly.

16. The method of claim 15 further comprising:
selecting N as a power-of-2 integer, said specified integer multiple being a power of 2 greater than N; and
selecting a number of time indications of said repetitive pattern as a power-of-2 integer at least equal to N;
thereby, rendering the duration of each beam a power-of-2 multiple of pulse periods, a pulse period being the time between the onset of two successive pulses.

17. A method of wireless communication comprising:
at each node of a network of a plurality of nodes:
   providing a plurality of antenna elements and a plurality of phase shifters, each antenna element coupled to a respective phase shifter;
   determining, using an electronic compass, node orientation as an angular displacement of a node reference direction from Earth's magnetic north;
   generating, using a reference-time circuit, periodic sawtooth signals defining beam cycles aligned according to pivotal reference time indications acquired from a Global-Positioning-System receiver;
   determining, using a beam-orientation circuit, phase-shift values supplied to said plurality of phase shifters according to requisite beam directions and said node orientation;
   cyclically updating, using a phased-array controller, said phase-shift values during each beam period of a beam cycle comprising N beam periods, N>1; and
   simultaneously activating said phased-array controller, a node transmitter, and a node receiver;
   wherein during a beam period of index j, $0 \leq j < N$, within said beam cycle, said specified beam direction is determined as: $\Gamma + 2 \times \pi \times j/N$, $\Gamma$ being said node orientation.

18. The method of claim 17 wherein said phase-shift values are further determined according to placement of said plurality of antenna elements within said each node.

19. The method of claim 17 further comprising:
designating one node of said plurality of nodes as a collector;
linking to said collector each remaining node within reach of said collector as a first-stratum node; and
linking each remaining node within reach of any $m^{th}$-stratum node as an $(m+1)^{th}$-stratum node, $m>0$.

20. The method of claim 17 further comprising determining starting-time indicators of said periodic saw tooth signals according to said pivotal reference time indications.

* * * * *